(12) United States Patent
Kuroyanagi et al.

(10) Patent No.: US 11,888,364 B2
(45) Date of Patent: Jan. 30, 2024

(54) STATOR MANUFACTURING METHOD

(71) Applicants: AISIN CORPORATION, Kariya (JP); HAYASHIKOGYOSYO CO., LTD., Nakatsugawa (JP)

(72) Inventors: Toru Kuroyanagi, Okazaki (JP); Takahiko Hobo, Nakatsugawa (JP)

(73) Assignees: AISIN CORPORATION, Kariya (JP); HAYASHI KOGYOSYO CO., LTD., Nakatsugawa (JP)

( * ) Notice: Subject to any disclaimer, the term of this patent is extended or adjusted under 35 U.S.C. 154(b) by 597 days.

(21) Appl. No.: 16/967,783

(22) PCT Filed: Nov. 30, 2018

(86) PCT No.: PCT/JP2018/044237
§ 371 (c)(1),
(2) Date: Aug. 6, 2020

(87) PCT Pub. No.: WO2019/181078
PCT Pub. Date: Sep. 26, 2019

(65) Prior Publication Data
US 2020/0366172 A1 Nov. 19, 2020

(30) Foreign Application Priority Data

Mar. 23, 2018 (JP) ................. 2018-056728

(51) Int. Cl.
*H02K 15/10* (2006.01)
*H02K 3/34* (2006.01)

(52) U.S. Cl.
CPC .............. *H02K 15/10* (2013.01); *H02K 3/34* (2013.01)

(58) Field of Classification Search
CPC ........... H02K 15/10; H02K 3/34; H02K 3/345
See application file for complete search history.

(56) References Cited

U.S. PATENT DOCUMENTS

| 4,247,978 A * | 2/1981 | Smith ................... H02K 15/10 493/405 |
| 5,657,530 A * | 8/1997 | Kawamura ............ H02K 15/10 29/736 |
| 6,242,836 B1 * | 6/2001 | Ishida ................... H02K 3/345 310/201 |

(Continued)

FOREIGN PATENT DOCUMENTS

| JP | 2005-110417 A | 4/2005 |
| JP | 2005-218255 A | 8/2005 |

(Continued)

OTHER PUBLICATIONS

Mar. 5, 2019 International Search Report issued in International Patent Application No. PCT/JP2018/044237.

*Primary Examiner* — Peter Dungba Vo
*Assistant Examiner* — Jose K Abraham
(74) *Attorney, Agent, or Firm* — Oliff PLC

(57) ABSTRACT

The stator manufacturing method includes a step involving, simultaneously with or after a first slot-housed portion placing step, moving a second slot-housed portion of each pair of slot-housed portions radially outward while unfolding an insulating sheet in a direction intersecting a direction of extension of folded portions of the insulating sheet, thus placing each second slot-housed portion.

11 Claims, 42 Drawing Sheets

(56) References Cited

U.S. PATENT DOCUMENTS

| | | | |
|---|---|---|---|
| 2002/0014806 A1* | 2/2002 | Senoo | H02K 15/10 310/215 |
| 2003/0009509 A1 | 1/2003 | Fish | |
| 2005/0168097 A1 | 8/2005 | Takizawa et al. | |
| 2005/0280328 A1* | 12/2005 | Neet | H02K 1/165 310/214 |
| 2007/0222323 A1* | 9/2007 | Neet | H02K 3/345 310/215 |
| 2009/0189476 A1* | 7/2009 | Takizawa | H02K 3/38 310/215 |
| 2010/0295405 A1* | 11/2010 | Shikata | H02K 3/28 310/195 |
| 2011/0204742 A1* | 8/2011 | Nakayama | H02K 3/345 310/215 |
| 2012/0299410 A1* | 11/2012 | Yoshida | H02K 3/522 310/71 |
| 2013/0140935 A1* | 6/2013 | Houle | H02K 15/10 310/215 |
| 2013/0307368 A1* | 11/2013 | Suwazono | H02K 3/34 310/215 |
| 2014/0127055 A1* | 5/2014 | Horiba | F04C 23/02 417/410.5 |
| 2015/0048709 A1* | 2/2015 | Bihari | H02K 3/38 310/215 |
| 2016/0181882 A1* | 6/2016 | Iwaki | H02K 3/345 310/195 |
| 2017/0353075 A1* | 12/2017 | Ishizaki | F04B 39/00 |
| 2018/0175693 A1* | 6/2018 | Mitsui | H02K 3/345 |
| 2019/0006903 A1* | 1/2019 | Kuroyanagi | H02K 3/38 |

FOREIGN PATENT DOCUMENTS

| | | |
|---|---|---|
| JP | 2017-118727 A | 6/2017 |
| JP | 2017118727 A * | 6/2017 |
| WO | 2011/111682 A1 | 9/2011 |

* cited by examiner

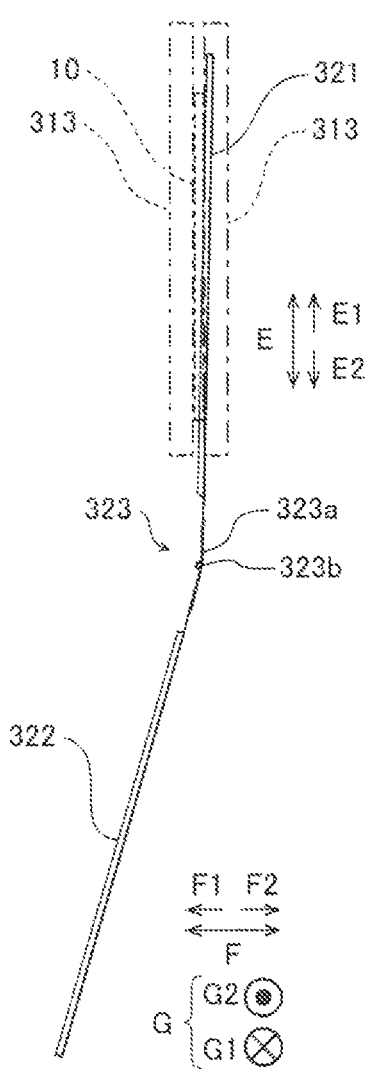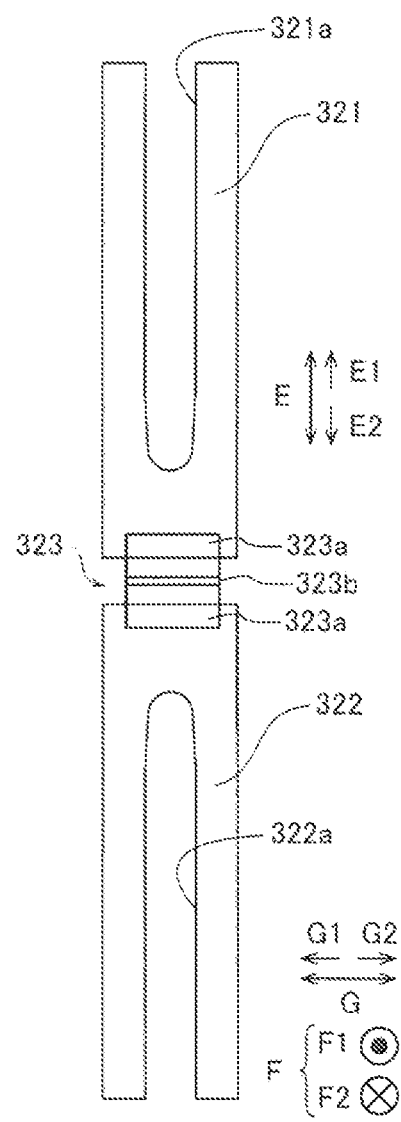

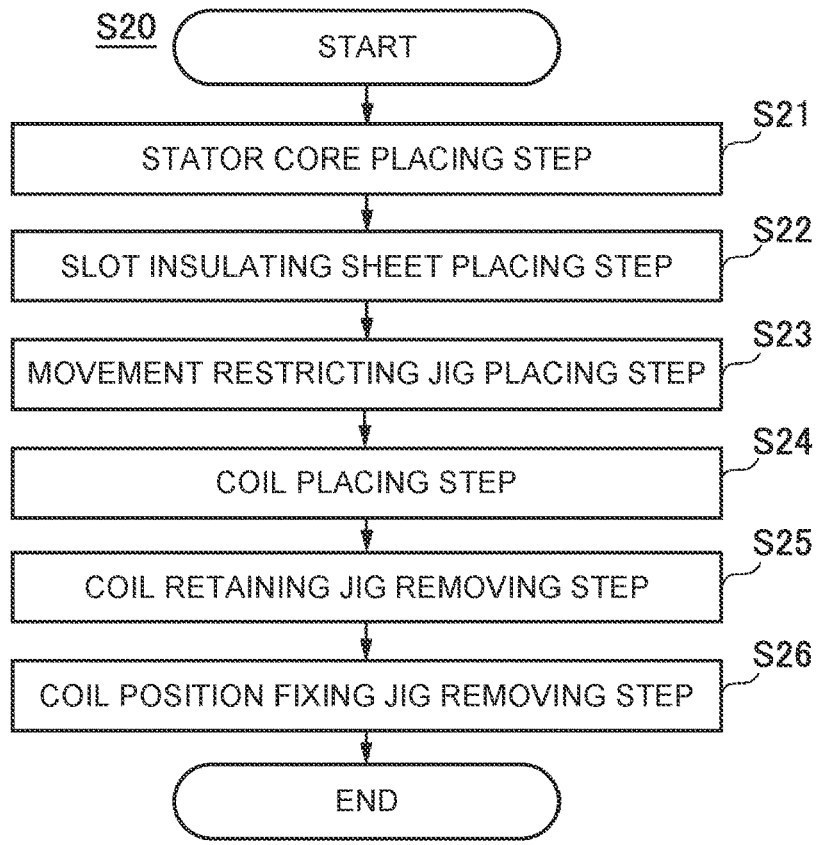
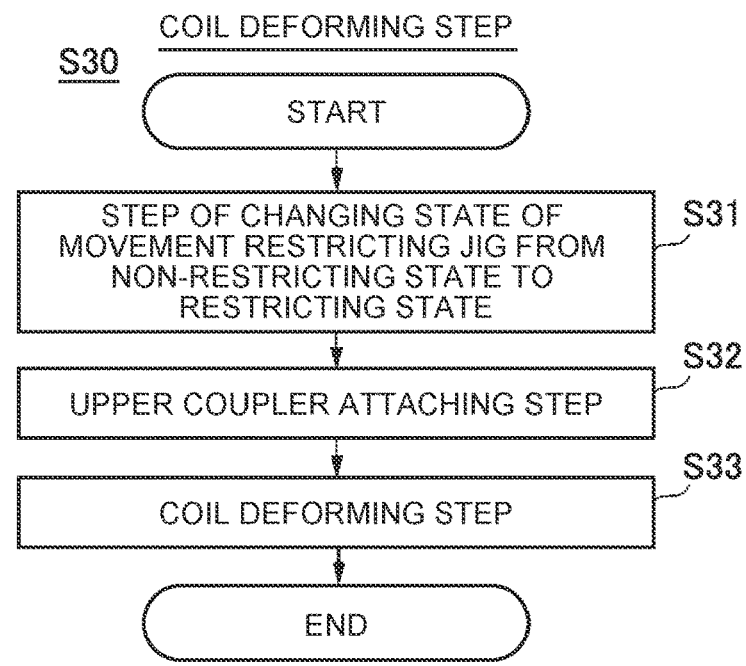

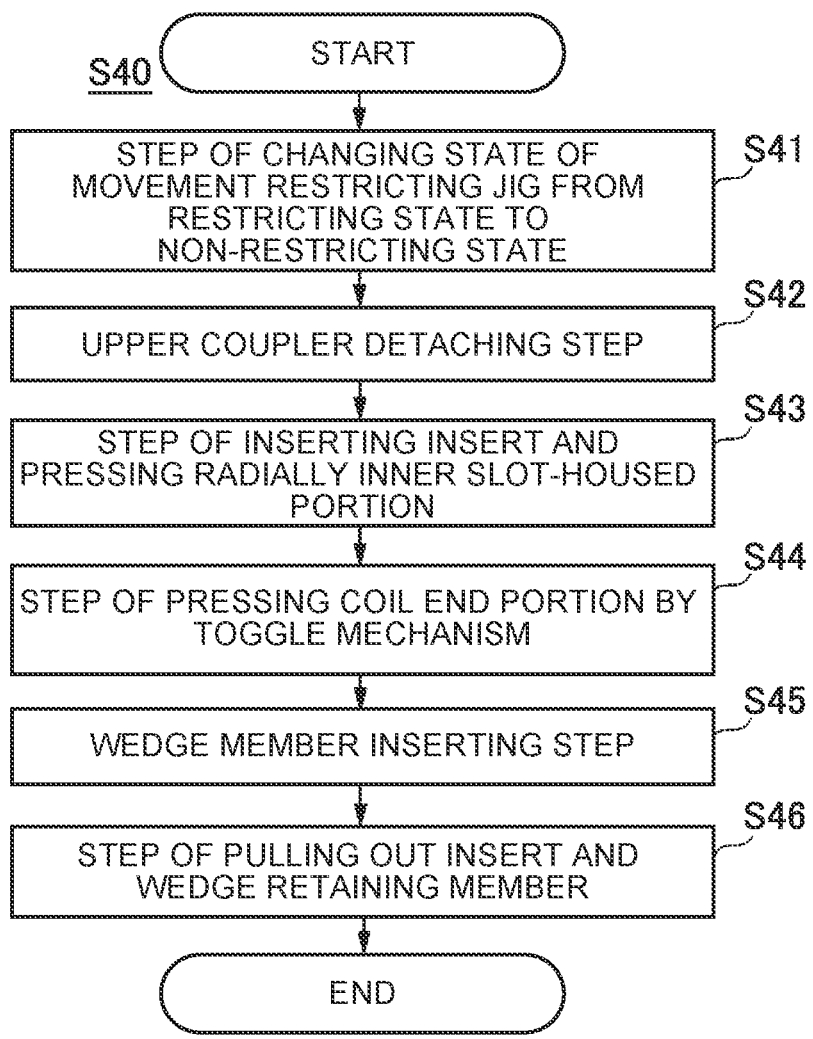

*FIG.66A*        *FIG.66B*        *FIG.66C*
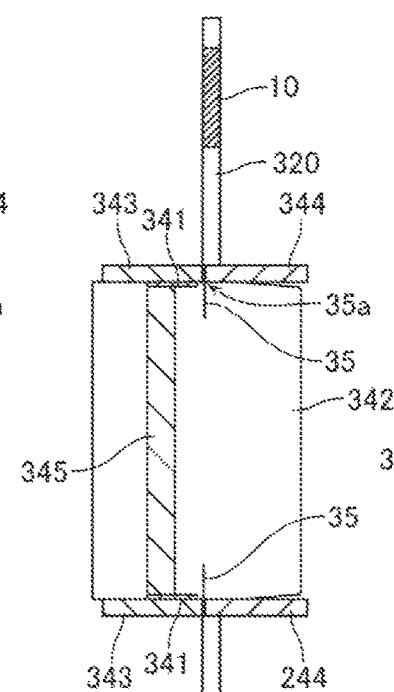
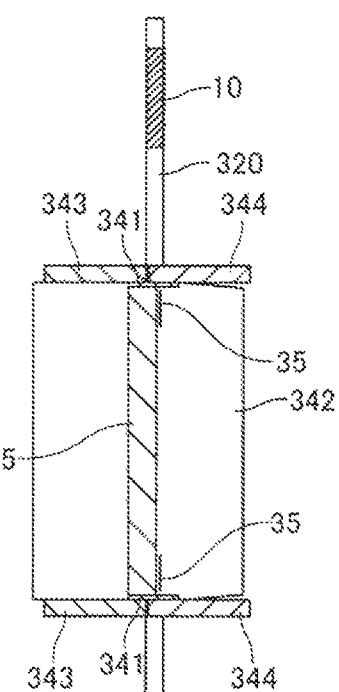
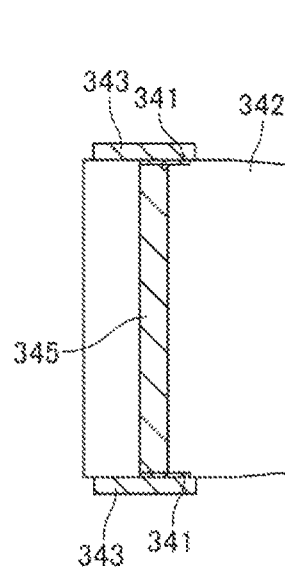
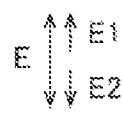

STATOR MANUFACTURING METHOD

TECHNICAL FIELD

The preferred embodiment relates to stator manufacturing methods, stator manufacturing apparatuses, and stators.

BACKGROUND ART

Stators including insulating sheets are known in the related art (see, for example, Patent Document 1).

Patent Document 1 discloses an electric motor that includes a stator including interphase insulating paper. The stator includes a stator core and a plurality of coils. The coils each include: a pair of slot-housed portions housed in slots; a coil end portion protruding from an end face of the stator core facing in a central axis direction; and a raised portion connecting the slot-housed portions with the coil end portion. With each pair of the slot-housed portions located away from each other in a circumferential direction (i.e., with each coil in a pre-formed state), some of the coils are placed in the stator core. The interphase insulating paper is then placed on the coil end portions, on the raised portions, and in the slots. The coils other than those that have already been placed in the stator core are then placed in the stator core, with each coil in a pre-formed state. The interphase insulating paper is thus placed between the coil end portions (or raised portions) of some of the coils and the coil end portions (or raised portions) of the other coils. The slots are provided such that the slots extend radially (i.e., such that each slot extends outward in a radial direction of the stator core). Each coil disclosed in Patent Document 1 is not only a single layer lap-wound coil but also a distributed-wound coil.

RELATED ART DOCUMENTS

Patent Documents

Patent Document 1: Japanese Unexamined Patent Application Publication No. 2005-218255 (JP 2005-218255 A)

SUMMARY

Problem to be Solved by the Invention

To simplify steps for manufacturing a stator including conventional coils each of which is not only a lap-wound coil but also a distributed-wound coil as in Patent Document 1, a step of forming the coils (e.g., a step of increasing a distance between each pair of slot-housed portions) and a step of placing each pair of slot-housed portions in slots may be carried out continuously. In this case, the coils may be prepared, with interphase insulating paper placed on coil end portions. The coils may then be formed, with a first slot-housed portion of each pair of slot-housed portions placed in the associated slot. For example, when each coil is not only a double layer lap-wound coil but also a distributed-wound coil, each first slot-housed portion is placed in the associated slot, and then a second slot-housed portion of each pair of slot-housed portions is moved in a circumferential direction, with the interphase insulating paper placed on the coil end portions. With the interphase insulating paper placed on the coil end portions, each second slot-housed portion is subsequently moved from a radially inward side to a radially outward side. Each second slot-housed portion is thus inserted into the slot different from the slot into which the associated first slot-housed portion is inserted.

The above stator manufacturing method known in the related art involves, with the interphase insulating paper placed on the coil end portions, moving the second slot-housed portion of each pair of slot-housed portions from the radially inward side to the radially outward side, thus inserting the first and second slot-housed portions into different slots. In other words, the second slot-housed portion of each pair of slot-housed portions is inserted into an associated one of the slots extending radially outward. This increases the distance between each pair of slot-housed portions in the circumferential direction. The interphase insulating paper placed on each coil end portion is thus pulled by an associated pair of the slot-housed portions (which means that a load is applied to the interphase insulating paper), making it difficult to allow the interphase insulating paper to have sufficient mechanical strength. This unfavorably makes it difficult to provide insulation between the coils. Consequently, the stator manufacturing method known in the related art unfortunately has difficulty in providing insulation between the coils while simplifying stator manufacturing steps.

The problems mentioned above occur similarly when each coil is a single layer lap-wound coil as well as when each coil is not only a double layer lap-wound coil but also a distributed-wound coil. When each coil is a single layer lap-wound coil, each coil is formed such that first and second slot-housed portions are located away from each other in a circumferential direction outside slots. The first and second slot-housed portions are then moved from a radially inward side to a radially outward side, with interphase insulating paper placed on each coil end portion. The first and second slot-housed portions are thus substantially simultaneously inserted into different slots. In other words, the first and second slot-housed portions of each pair of slot-housed portions are both inserted into the slots extending radially outward. This increases the distance between each pair of slot-housed portions in the circumferential direction. Accordingly, similarly to the case where each coil is not only a double layer lap-wound coil but also a distributed-wound coil, the interphase insulating paper placed on each coil end portion is pulled by an associated pair of the slot-housed portions (which means that a load is applied to the interphase insulating paper), making it difficult to allow the interphase insulating paper to have sufficient mechanical strength.

The preferred embodiment has been made to solve the above-described problems, and an object of the preferred embodiment is to provide a stator manufacturing method, a stator manufacturing apparatus, and a stator that enable an insulating sheet to have sufficient mechanical strength so as to provide insulation between coils while simplifying stator manufacturing steps.

Means for Solving the Problem

To achieve the above object, a first aspect of the invention provides a stator manufacturing method for manufacturing a stator including: a stator core including a plurality of slots; a plurality of coils each including a pair of slot-housed portions housed in the slots, and a coil end portion connected to the pair of slot-housed portions and protruded from an end face of the stator core in a central axis direction of the stator core; and an insulating sheet. The stator manufacturing method includes: an insulating sheet preparing step involving preparing the insulating sheet including a plurality of folded portions extending in the central axis direction; an insulating sheet placing step involving, after the insulating sheet preparing step, placing the insulating sheet in the stator core; a first slot-housed portion placing step involving placing a first slot-housed portion of each pair of the slot-housed portions in a first slot included in the slots; and a second slot-housed portion placing step involving, simultaneously with or after the first slot-housed portion placing step, moving a second slot-housed portion of each pair of the slot-housed portions radially outward while unfolding the insulating sheet in a direction intersecting a direction of extension of the folded portions of the insulating sheet, thus placing each second slot-housed portion in a second slot included in the slots and different from the first slot. As used herein, the expression "unfolding the insulating sheet in a direction intersecting a direction of extension of the folded portions of the insulating sheet" does not refer only to unfolding the insulating sheet such that all of the folded portions are fully unfolded (i.e., such that all of the folded portions have no curves) but refers to a broader concept that includes unfolding the insulating sheet such that some of the folded portions are fully unfolded (i.e., such that some of the folded portions have no curves) and unfolding the insulating sheet such that all or some of the folded portions remain curved.

As described above, the stator manufacturing method according to the first aspect of the invention includes the second slot-housed portion placing step involving, simultaneously with or after the first slot-housed portion placing step, moving the second slot-housed portion of each pair of the slot-housed portions radially outward while unfolding the insulating sheet in the direction intersecting the direction of extension of the folded portions of the insulating sheet, thus placing each second slot-housed portion. Thus, when the first and second slot-housed portions are simultaneously placed in the stator core, the stator manufacturing method enables each pair of the slot-housed portions to move radially outward while unfolding the folded portions of the insulating sheet extending in the central axis direction. When each coil is not only a single layer lap-wound coil but also a distributed-wound coil, the stator manufacturing method enables a reduction in load (tensile load) applied to the insulating sheet during placement of the slot-housed portions in the slots. When each second slot-housed portion is placed in the stator core after placement of each first slot-housed portion, the stator manufacturing method enables each second slot-housed portion to move radially outward while unfolding the folded portions of the insulating sheet extending in the central axis direction. When each coil is a double layer lap-wound coil, the stator manufacturing method enables a reduction in load (tensile load) applied to the insulating sheet during placement of the slot-housed portions in the slots. The stator manufacturing method is able to continuously perform the step of increasing the distance between each pair of the slot-housed portions (which is a coil forming step) and the step of placing each pair of the slot-housed portions in the associated slots. This makes it possible to simplify the steps for manufacturing the stator while allowing the insulating sheet to have sufficient mechanical strength. Consequently, the stator manufacturing method enables the insulating sheet to have sufficient mechanical strength so as to provide insulation between the coils while simplifying the steps for manufacturing the stator.

A second aspect of the invention provides a stator manufacturing apparatus for manufacturing a stator including: a stator core including a plurality of slots; a plurality of coils each including a pair of slot-housed portions housed in the slots located at different circumferential positions, and a coil end portion connected to the pair of slot-housed portions and protruded from an end face of the stator core in a central axis direction of the stator core; and an insulating sheet including a coil end portion insulator provided with a plurality of folded portions extending in the central axis direction, the coil end portion insulator being disposed on the coil end portion, with the folded portions unfolded. The stator manufacturing apparatus includes a cutting jig to cut off protruded regions which are protruding from the folded portions of the insulating sheet and by which the folded portions are fixed to each other such that the folded portions will not be spread out. The cutting jig extends in a direction intersecting the protruded regions and is structured to pass through a boundary region between the folded portions and the protruded regions so as to cut off the protruded regions.

The stator manufacturing apparatus according to the second aspect of the invention is structured as described above, thus achieving effects similar to those of the stator manufacturing method according to the first aspect. Consequently, the stator manufacturing apparatus enables the insulating sheet to have sufficient mechanical strength so as to provide insulation between the coils while simplifying the steps for manufacturing the stator.

A third aspect of the invention provides a stator including: a stator core including a plurality of slots; a plurality of coils each including a pair of slot-housed portions housed in the slots located at different circumferential positions, and a coil end portion connected to the pair of slot-housed portions and protruded from an end face of the stator core in a central axis direction of the stator core; and an insulating sheet including a coil end portion insulator provided with a plurality of folded portions extending in the central axis direction, the coil end portion insulator being disposed on the coil end portion, with the folded portions unfolded.

The stator according to the third aspect of the invention is structured as described above, thus achieving effects similar to those of the stator manufacturing method according to the first aspect. Consequently, the stator enables the insulating sheet to have sufficient mechanical strength so as to provide insulation between the coils while simplifying the steps for manufacturing the stator.

Effects of the Invention

As described above, the preferred embodiment enables an insulating sheet to have sufficient mechanical strength so as to provide insulation between coils while simplifying stator manufacturing steps.

BRIEF DESCRIPTION OF THE DRAWINGS

FIG. 7 is diagrams each illustrating a shape of the folded portion according to the first embodiment.

FIG. 32 is diagrams each illustrating a state in which the coil retaining jig according to the second embodiment is opened, FIG. 32A is the diagram as viewed in a direction G1, and FIG. 32B is the diagram as viewed in a direction F2.

FIG. 36 is diagrams each illustrating an arrangement of a coil position fixing jig of the first coil placer according to the second embodiment.

FIG. 44 is plan views of a shaft and the upper coupler of the stator manufacturing apparatus according to the second embodiment.

FIG. 59 is diagrams each schematically illustrating a structure of a rotator of the movement restricting jig according to the second embodiment.

FIG. 63 is a flow chart illustrating a radially outer slot-housed portion placing step according to the second embodiment.

FIG. 64 is a flow chart illustrating a coil deforming step according to the second embodiment.

FIG. 65 is a flow chart illustrating a radially inner slot-housed portion and wedge member placing step according to the second embodiment.

FIG. 66 is diagrams each illustrating a fixture cutting step according to the second embodiment, FIG. 66A is the diagram of an initial stage of the step, FIG. 66B is the diagram of an intermediate stage of the step, and FIG. 66C is the diagram of a final stage of the step.

MODES FOR CARRYING OUT THE INVENTION

Embodiments of the preferred embodiment will be described below with reference to the drawings.

First Embodiment

Structure of Stator

Referring to FIGS. 1 to 9, a stator 100 according to a first embodiment will be described. The stator 100 constitutes a portion of a rotary electric machine 102. The stator 100 is disposed to face an outer peripheral surface of a rotor 101 in a radial direction. The rotary electric machine 102 is an inner rotor type rotary electric machine. The rotary electric machine 102 is, for example, a motor to be driven upon receiving three-phase (i.e., U-phase, V-phase, and W-phase) AC power.

As used herein, the terms "axial direction" and "central axis direction" each refer to a direction along a central axis C1 (see FIG. 1) of the stator 100 (i.e., the direction of an arrow Z1 or the direction of an arrow Z2). The term "circumferential direction" refers to a circumferential direction of the stator 100 (i.e., the direction of an arrow A1 or the direction of an arrow A2). The term "radial direction" refers to a radial direction of the stator 100. The terms "radially inward" and "radially inner" each refer to a direction toward the central axis C1 of the stator 100 (i.e., the direction of an arrow B1). The terms "radially outward" and "radially outer" each refer to a direction away from the central axis C1 of the stator 100 (i.e., the direction of an arrow B2).

Arrangement of Coils and Stator Core

Figure 1:
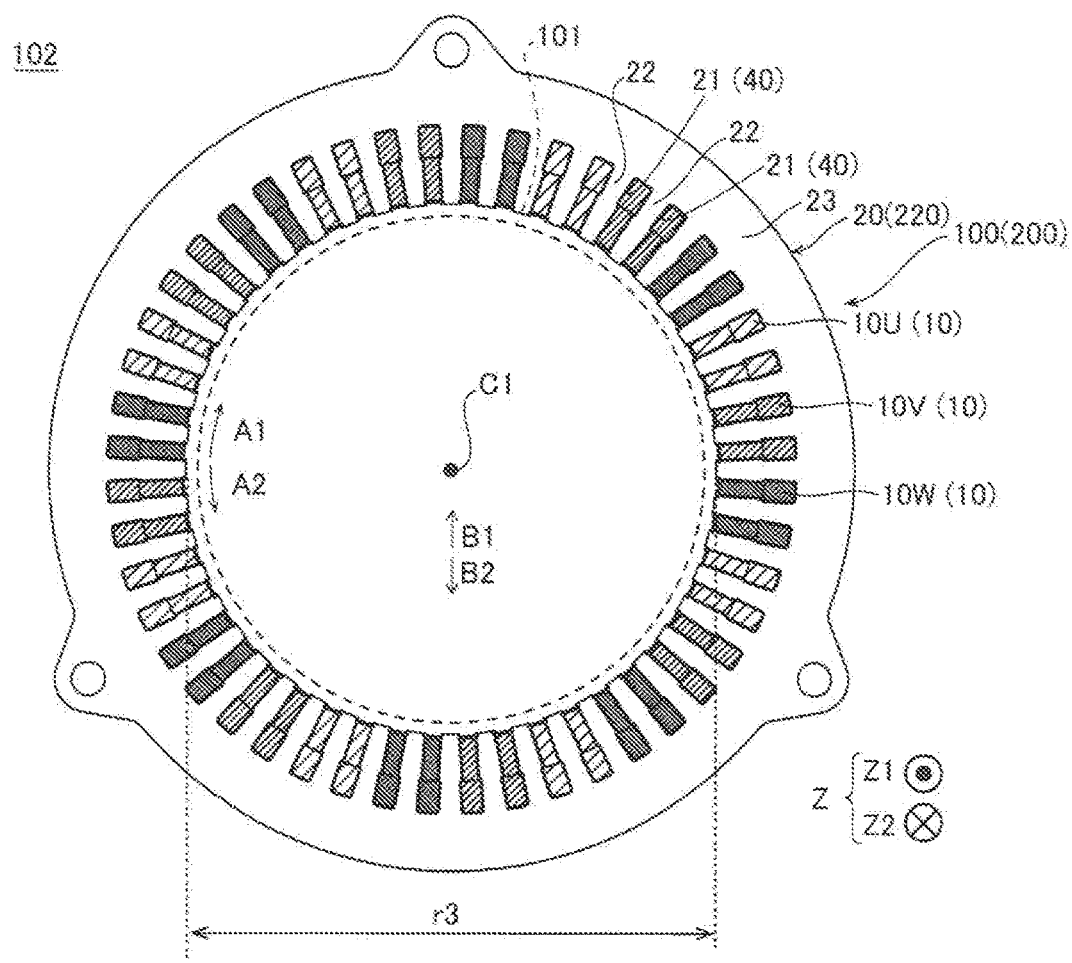
FIG. 1 is a cross-sectional view of a rotary electric machine (a stator thereof) according to a first embodiment as viewed in an axial direction.

As illustrated in FIG. 1, the stator 100 is provided with a plurality of coils 10. The coils 10 include a U-phase coil 10U that receives U-phase AC power, a V-phase coil 10V that receives V-phase AC power, and a W-phase coil 10W that receives W-phase AC power. In the following description, the U-phase coil 10U, the V-phase coil 10V, and the W-phase coil 10W will each be simply referred to as the "coil 10" when no particular distinction is made therebetween.

Figure 2:
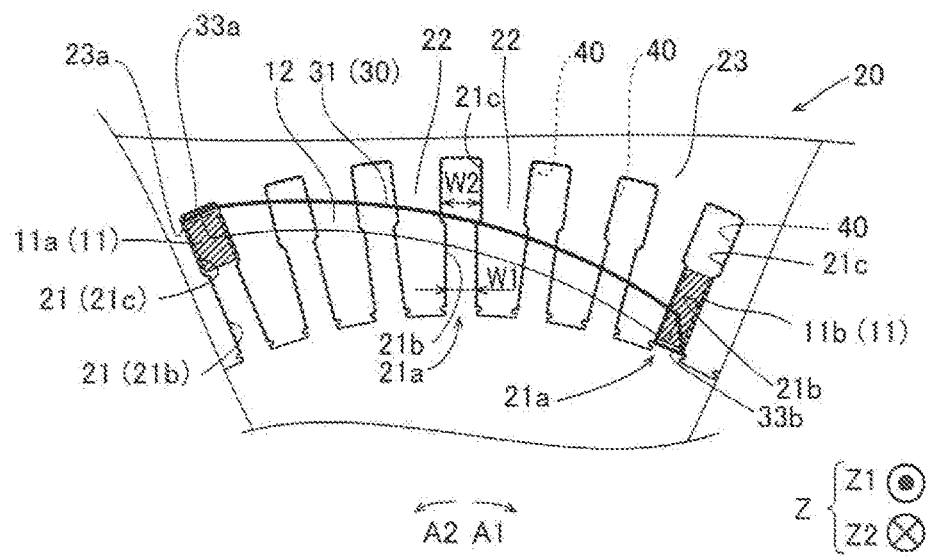
FIG. 2 is a diagram illustrating an arrangement of a coil and slots according to the first embodiment.

As illustrated in FIG. 2, the stator 100 includes a stator core 20. The stator core 20 is provided with a plurality of slots 21. The stator core 20 is provided with teeth 22 that define the slots 21. Each slot 21 is defined between the associated teeth 22 adjacent to each other in the circumferential direction. The teeth 22 are each formed to protrude radially inward from a back yoke 23. Each slot 21 includes an opening 21a opened radially inward. Each slot 21 includes a radially inner portion 21b having a width W1 in the circumferential direction and a radially outer portion 21c having a width W2 in the circumferential direction. The width W2 of the radially outer portion 21c of each slot 11 is larger than the width W1 of the radially inner portion 21b of each slot 21.

In the first embodiment, each coil 10 includes: a pair of slot-housed portions 11 housed in associated ones of the slots 21 of the stator core 20 that are located at different circumferential positions; and coil end portions 12 connected to the pair of slot-housed portions 11 and disposed to protrude in the central axis direction (axially outward) from end faces 20a (see FIG. 8) of the stator core 20 (the teeth 22) facing in a rotation axis direction (axial direction) thereof.

Each pair of slot-housed portions 11 includes a first slot-housed portion (i.e., a radially outer slot-housed portion) 11a and a second slot-housed portion (i.e., a radially inner slot-housed portion) 11b. The first slot-housed portion 11a is disposed in the radially outer portion 21c of the associated slot 21 (which is a first slot). The second slot-housed portion 11b is disposed in the radially inner portion 21b of the associated slot 21 (which is a second slot) located away from the slot 21, in which the first slot-housed portion 11a is disposed, by the width of a predetermined number of the slots 21 and a predetermined number of slot pitches in the circumferential direction. In FIG. 2, the number of slot pitches between the first and second slot-housed portions 11a and 11b is six. Each coil 10 is not only a double layer lap-wound coil but also a distributed-wound coil. The first slot-housed portion 11a is an example of a "first radial side slot-housed portion" and an example of a "first slot-housed portion" in the claims. The second slot-housed portion 11b is an example of a "second radial side slot-housed portion" and an example of a "second slot-housed portion" in the claims.

As illustrated in FIG. 1, the slot-housed portions 11 of the same phase are disposed in the radially inner portion 21b and the radially outer portion 21c of each slot 21. As illustrated in FIG. 2, each pair of slot-housed portions 11 is disposed in the associated slots 21, and a first connection 33a, a second connection 33b, and a slot insulating sheet 40 (which will be described below) are disposed in each slot 21.

Figure 3:
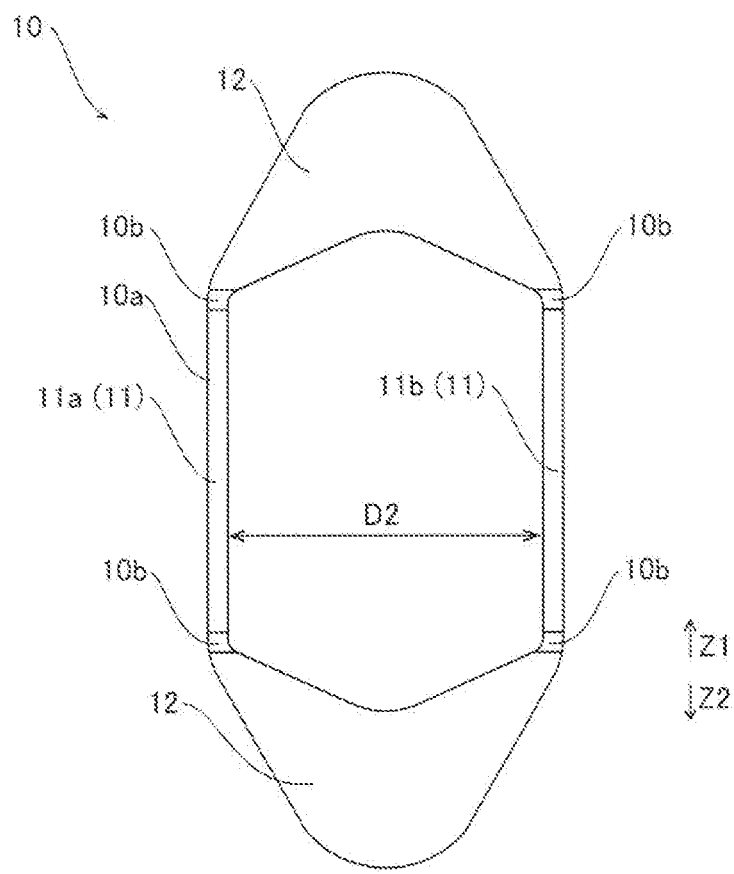
FIG. 3 is a diagram illustrating a structure of the coil according to the first embodiment.

As illustrated in FIG. 3, each pair of slot-housed portions 11 and the associated coil end portions 12 are formed continuously. Each pair of slot-housed portions 11 is formed to extend in a straight line along the central axis C1. Each coil end portion 12 connects the first and second slot-housed portions 11a and 11b to each other. Each coil end portion 12 is disposed to extend in the circumferential direction such that each coil end portion 12 straddles a plurality of the slots 21 (see FIG. 2). The coil end portions 12 are provided on both sides of each pair of slot-housed portions 11 such that one of the coil end portions 12 is located in the direction of the arrow Z1 and the other one of the coil end portions 12 is located in the direction of the arrow Z2.

In the first embodiment, each coil 10 is provided by winding a conductor wire 10a twice or more. The conductor wire 10a is, for example, a round wire. Each coil 10 has, for example, a hexagonal or octagonal shape as viewed from the radially inward side. Each coil 10 is provided with binders 10b that bind the conductor wire 10a wound twice or more. Each binder 10b is made of, for example, an insulator and is formed into a band shape. The binders 10b are each fixed in a wound state such that the binders 10b cover the peripheries of connections between the slot-housed portions 11 and the coil end portions 12 (e.g., four root regions of the coil end portions 12). The conductor wire 10a is an example of a "conductor" in the claims.

Figure 4:
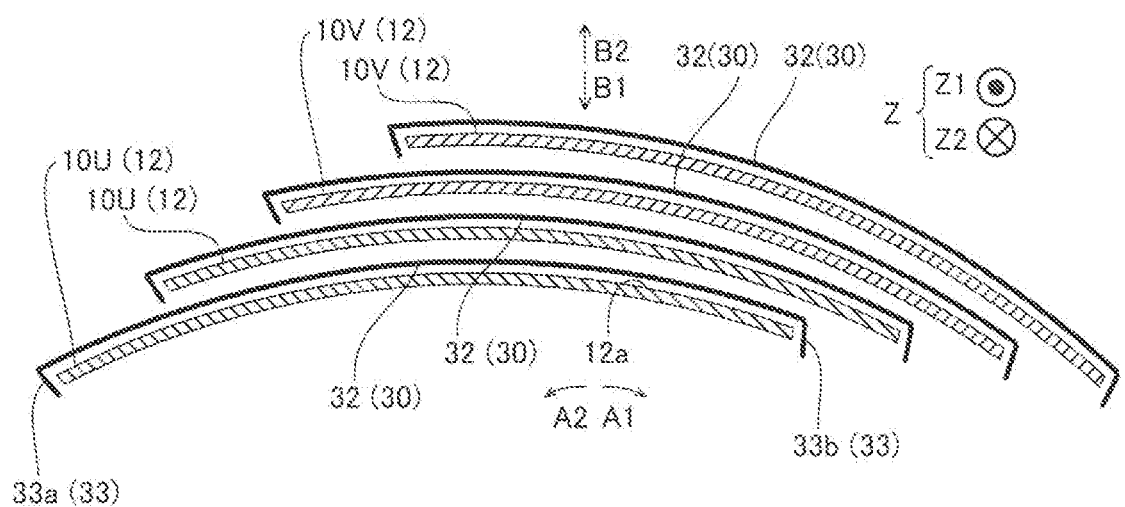
FIG. 4 is a diagram schematically illustrating an arrangement of the coils and insulating sheets according to the first embodiment as viewed in a central axial direction.

As illustrated in FIG. 4, the coil end portions 12 of the coils 10 of one phase (e.g., the U-phase coils 10U) are disposed adjacent to the coil end portions 12 of the coils 10 of the other phase (e.g., the V-phase coils 10V) in the radial direction and the circumferential direction.

Structure of Insulating Sheet

As illustrated in FIG. 4, the stator 100 according to the first embodiment includes a plurality of insulating sheets 30 (the number of which is equal to, for example, the number of coils 10). Each insulating sheet 30 includes coil end portion insulators 32. Each coil end portion insulator 32 is disposed on the associated coil end portion 12. Each coil end portion insulator 32 is provided with a plurality of folded portions 31 (see FIG. 5) extending along the central axis C1. Each coil end portion insulator 32 is disposed on the associated coil end portion 12, with the folded portions 31 unfolded (see FIG. 6). Each insulating sheet 30 is provided with connections 33 connected to the coil end portion insulators 32.

In the first embodiment, the coil end portion insulator 32 of each of the insulating sheets 30 is disposed radially outward of the coil end portion 12 of the associated one of the coils 10. In one example, the insulating sheets 30 are each disposed between the coils 10 (the coil end portions 12) adjacent to each other, with the coils 10 disposed in all the slots 21 in the stator 100. Each insulating sheet 30 attached to an associated one of the coils 10 radially inward thereof is disposed between the coil end portion 12 of the radially inward coil 10 and the coil end portion 12 of the radially outward coil 10 (which is adjacent to the radially inward coil 10) in the radial direction. For the sake of simplicity of description, each coil 10 and the associated insulating sheet 30 illustrated in FIG. 4 are disposed away from each other (disposed such that a clearance is created therebetween). Each coil 10 and the associated insulating sheet 30, however, may be in contact with each other. In one example, the coil end portion insulator 32 of each insulating sheet 30 is in contact with a radially outward lateral surface 12a of the associated coil end portion 12. The term "radially outward" is an example of a "first radial side" in the claims.

Each insulating sheet 30 is made of, for example, Nomex®, Kapton®, or a combination thereof. Nomex is fiber (insulating paper) made of aramid polymer. Each insulating sheet 30 may include: a core made of a PEN (polyethylene naphthalate) film; and a surface member made of aramid fiber and provided to cover both sides of the core. The material(s) just mentioned or other material(s) may be entirely bonded to each other, for example, with an adhesive or by fusion so as to provide a single sheet that serves as the insulating sheet 30.

Arrangement of Folded Portions

Figure 5:
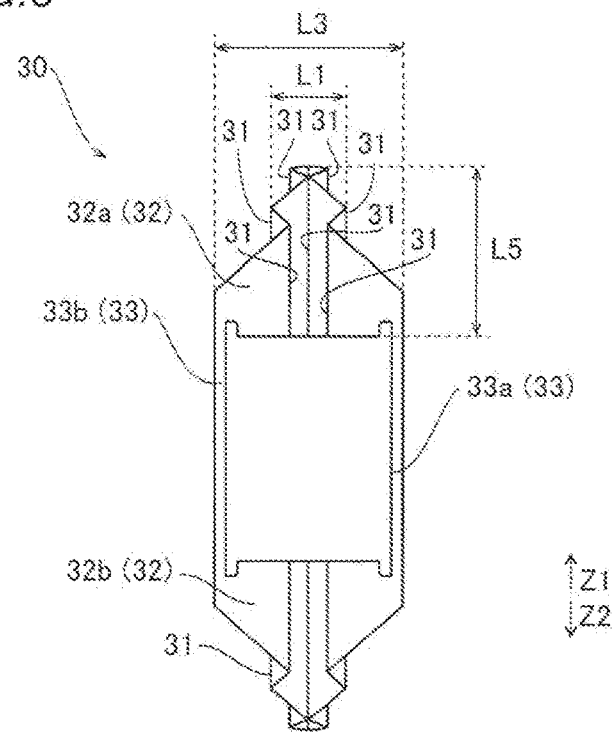
FIG. 5 is a diagram illustrating a structure of the insulating sheet according to the first embodiment (before its folded portions are unfolded).
Figure 6:
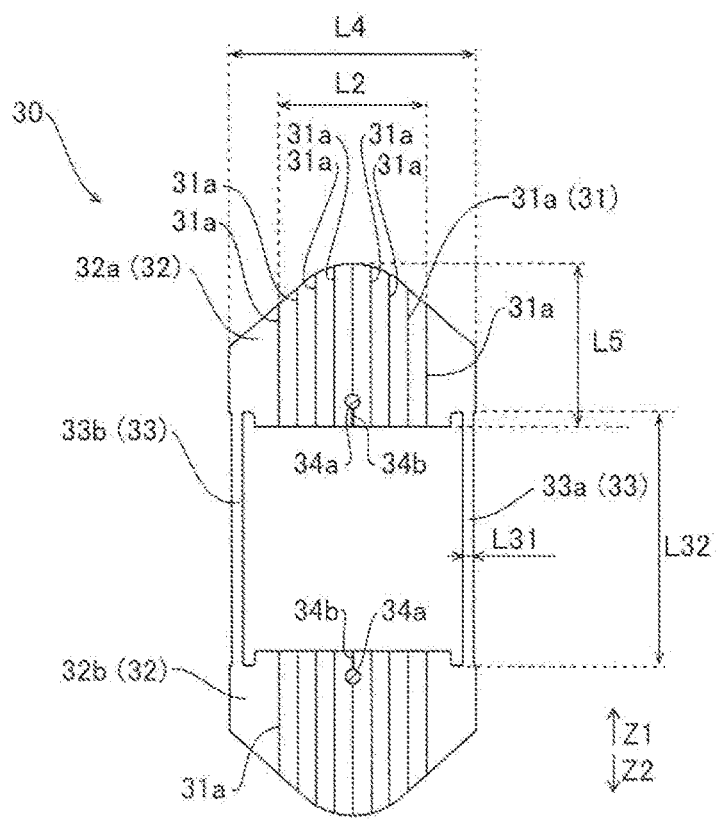
FIG. 6 is a diagram illustrating a structure of the insulating sheet according to the first embodiment (after its folded portions are unfolded).

As illustrated in FIGS. 5 and 6, each insulating sheet 30 is formed into a sheet shape. Folding an insulating sheet 30 twice or more forms the folded portions 31 on each coil end portion insulator 32. FIG. 5 illustrates the insulating sheet 30 before the folded portions 31 are unfolded, namely, the insulating sheet 30, with the folded portions 31 folded up (see FIG. 7A). FIG. 5 illustrates the state of the insulating sheet 30 during manufacture of the stator 100. FIG. 6 illustrates the insulating sheet 30 after the folded portions 31 are unfolded (see FIGS. 7B and 7C). FIG. 6 illustrates the state of the insulating sheet 30 after completion of the stator 100.

In the first embodiment, the folded portions 31 are formed to extend in parallel with each other along the central axis C1. The folded portions 31 before being unfolded have a length L1 in a direction perpendicular to the central axis C1 (see FIG. 5). The folded portions 31 after being unfolded have a length L2 in the direction perpendicular to the central axis C1 (see FIG. 6). The length L2 is longer than the length L1. Each coil end portion insulator 32 before the folded portions 31 are unfolded has a length L3 in the direction perpendicular to the central axis C1 (see FIG. 5). Each coil end portion insulator 32 after the folded portions 31 are unfolded has a length L4 in the direction perpendicular to the central axis C1 (see FIG. 6). The length L4 is longer than the length L3. Each coil end portion insulator 32 has a length L5 along the central axis C1. The length L5 remains substantially unchanged when the folded portions 31 are unfolded.

Figure 7A:
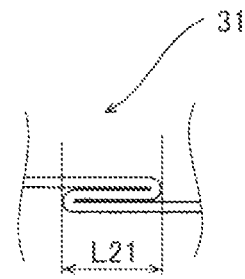
FIG. 7A is the diagram illustrating a state of the folded portion before being unfolded.
Figure 7B:
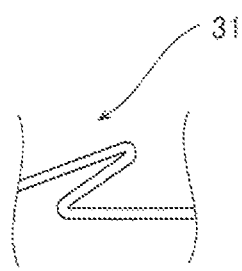
FIG. 7B is the diagram illustrating a state of the folded portion in the course of being unfolded.
Figure 7C:
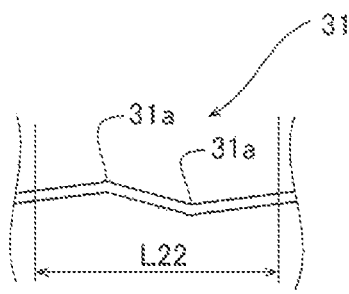
FIG. 7C is the diagram illustrating a state of the folded portion after being unfolded.

As illustrated in FIG. 7A, the folded portion 31 is provided by, for example, folding back (folding up) a portion of the insulating sheet 30. In one example, the folded portion 31 is substantially S-shaped as viewed along the central axis C1. The substantially S-shaped folded portion 31 has a length L21 in a direction (radial direction) perpendicular to the central axis C1. Pulling the folded portion 31 from both sides in a direction intersecting the central axis C1 spreads out the folded back region of the folded portion 31 (see FIG. 7B). As illustrated in FIG. 7C, the length of the folded portion 31 in the direction perpendicular to the central axis C1 thus changes to a length L22 longer than the length L21. This exposes folding lines 31a whose positions correspond to folding positions on the folded portion 31. As illustrated in FIG. 6, the folding lines 31a extend in parallel with each other along the central axis C1.

Arrangement of Coil End Portion Insulators

Figure 8:
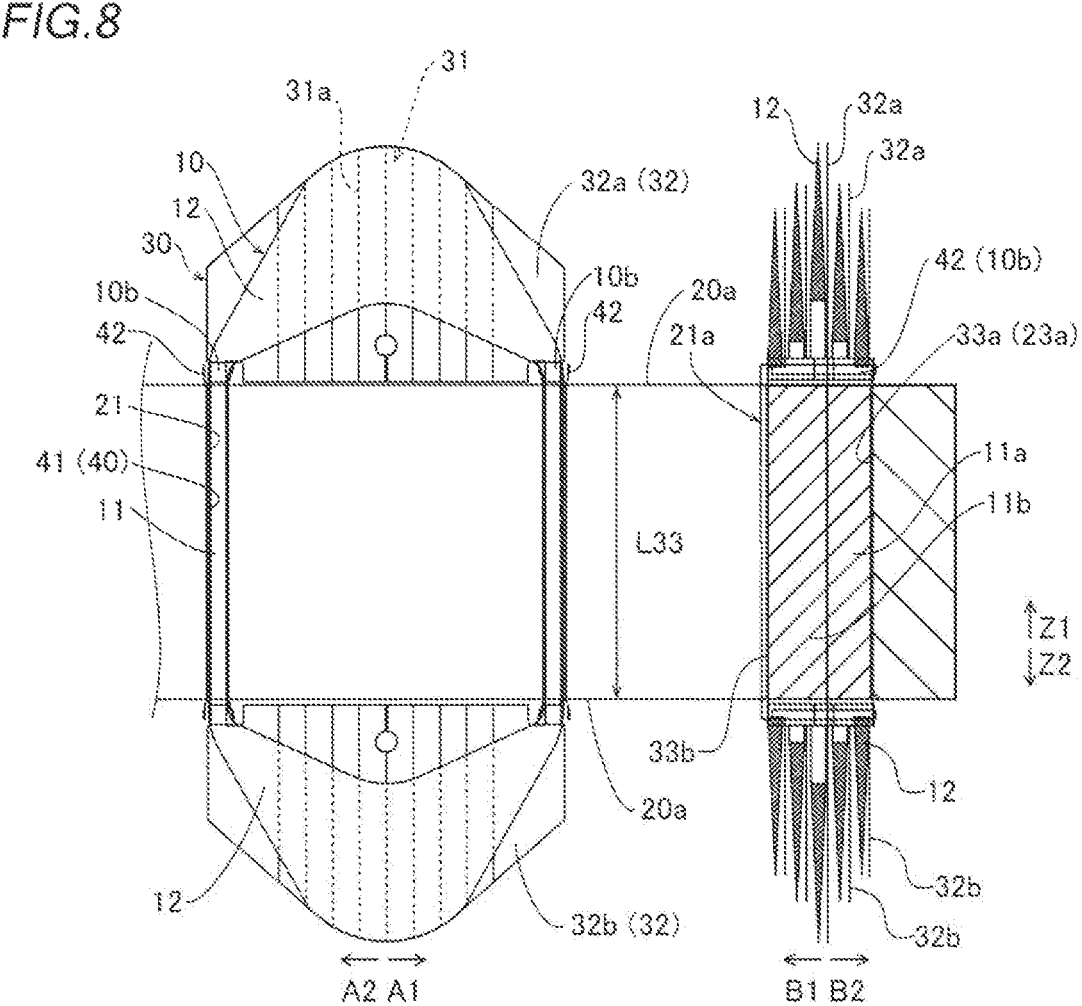
FIG. 8 is a diagram illustrating the coils and the insulating sheets according to the first embodiment that are placed in a stator core.

The coil end portion insulators 32 have the function of providing insulation between the coil end portions 12 of different phases (or the same phase). As illustrated in FIG. 8, the coil end portion insulators 32 conform in shape to the coil end portions 12. Specifically, the coil end portion insulators 32 and the coil end portions 12 are disposed to overlap with each other as viewed in the radial direction. Each coil end portion insulator 32 is preferably formed to cover an entirety of the associated coil end portion 12 (i.e., an entirety of the associated lateral surface 12a) as viewed in the radial direction.

In the first embodiment, each insulating sheet 30 is provided with a first coil end portion insulator 32a disposed in the direction of the arrow Z1 and a second coil end portion insulator 32b disposed in the direction of the arrow Z2. The first and second coil end portion insulators 32a and 32b are similar in shape. The first and second coil end portion insulators 32a and 32b are both disposed radially outward of the associated coil 10.

As illustrated in FIG. 6, each coil end portion insulator 32 is provided with: a hole 34a located closer to the stator core 20 than the associated coil end portion 12; and a cut-out 34b extending from the hole 34a to an end face of the coil end portion insulator 32 adjacent to the stator core 20. Thus, when one coil end portion 12 is disposed between the other coil end portion 12 and the stator core 20 (i.e., when one coil end portion 12 is disposed under the other coil end portion 12), a portion of the coil end portion insulator 32 close to the cut-out 34b is deformable in the radial direction while the cut-out 34b of the coil end portion insulator 32 is widened. Accordingly, if the coil end portions 12 are close to each other along the central axis C1, insulation between the coil end portions 12 would be provided. If the cut-out 34b is widened, the hole 34a would distribute a deformation-induced load (would reduce stress concentration). This enables each coil end portion insulator 32 to have sufficient mechanical strength.

Arrangement of Connections

As illustrated in FIG. 6, each insulating sheet 30 according to the first embodiment is provided with the connections 33 (legs) connecting the first and second coil end portion insulators 32a and 32b to each other. Each connection 33 has, for example, a shape (rectangular shape) conforming to the shape of an associated one of each pair of slot-housed portions 11. Specifically, a length L31 of each connection 33 in the circumferential direction is equal to or shorter than the width W2 of each slot 21. A length L32 of each connection 33 along the central axis C1 is equal to or longer than a length L33 of the stator core 20 along the central axis C1 (see FIG. 8).

As illustrated in FIG. 2, the connections 33 include the radially outward first connection 33a and the radially inward second connection 33b. In the first embodiment, each first connection 33a is disposed in the associated slot 21 such that each first connection 33a is located between the first slot-housed portion 11a of an associated pair of the slot-housed portions 11 and an inner surface 23a (inner wall surface) of the stator core 20 (the back yoke 23) that defines the bottom of the slot 21 on the radially outward side. Each second connection 33b is disposed in the associated slot 21 such that each second connection 33b is located between the associated second slot-housed portion 11b and the associated opening 21a.

Arrangement of Slot Insulating Sheets

As illustrated in FIG. 2, each coil 10 according to the first embodiment includes the slot insulating sheets 40 that insulate the slot-housed portions 11 and the slots 21 from each other. Specifically, the slot insulating sheets 40 are made of the same material as the insulating sheets 30. The slot insulating sheets 40 are made of, for example, Nomex, Kapton, a PEN film, or any combination thereof.

Figure 9:
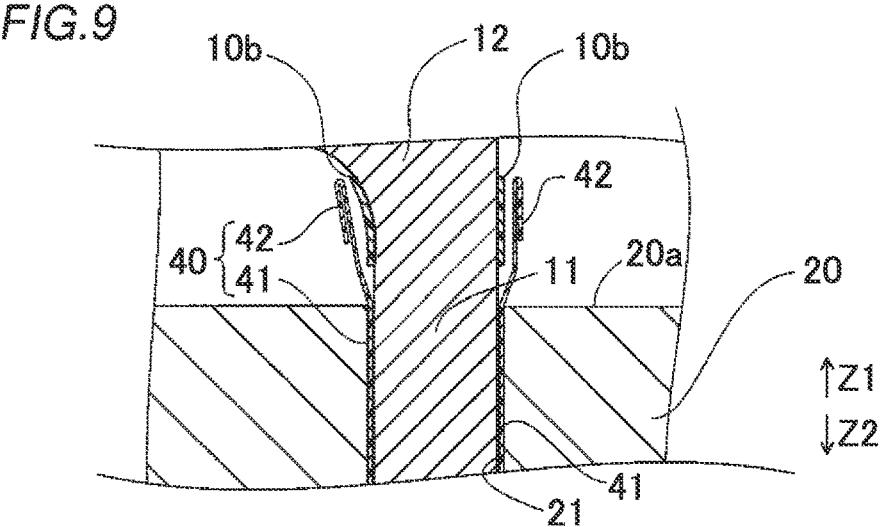
FIG. 9 is a cross-sectional view of an arrangement of a binder and a slot insulating sheet according to the first embodiment.

As illustrated in FIG. 9, each slot insulating sheet 40 includes a slot insulator 41. Each slot insulator 41 is disposed between the associated slot-housed portions 11 and the associated slot 21. Each slot insulator 41 is disposed to cover the inner surface of the associated slot 21. Each slot insulator 41 has the function of providing insulation between the associated coil 10 (i.e., the associated slot-housed portions 11) and the associated slot 21.

The slot insulating sheets 40 include collars 42 protruding in the direction of the arrow Z1 or the direction of the arrow Z2 from the end face 20a of the stator core 20 facing in the rotation axis direction. The collars 42 are disposed to overlap with the binders 10b as viewed in the circumferential direction of the stator core 20 (see FIG. 8). In other words, the collars 42 are disposed to cover the coil end portions 12 from the radially outer side and both sides in the circumferential direction through the binders 10b. The collars 42 are formed to be continuous with the slot insulator 41. The collars 42 are each formed into a collar shape by being folded back toward the end face 20a of the stator core 20.

Stator Manufacturing Method

Figure 10:
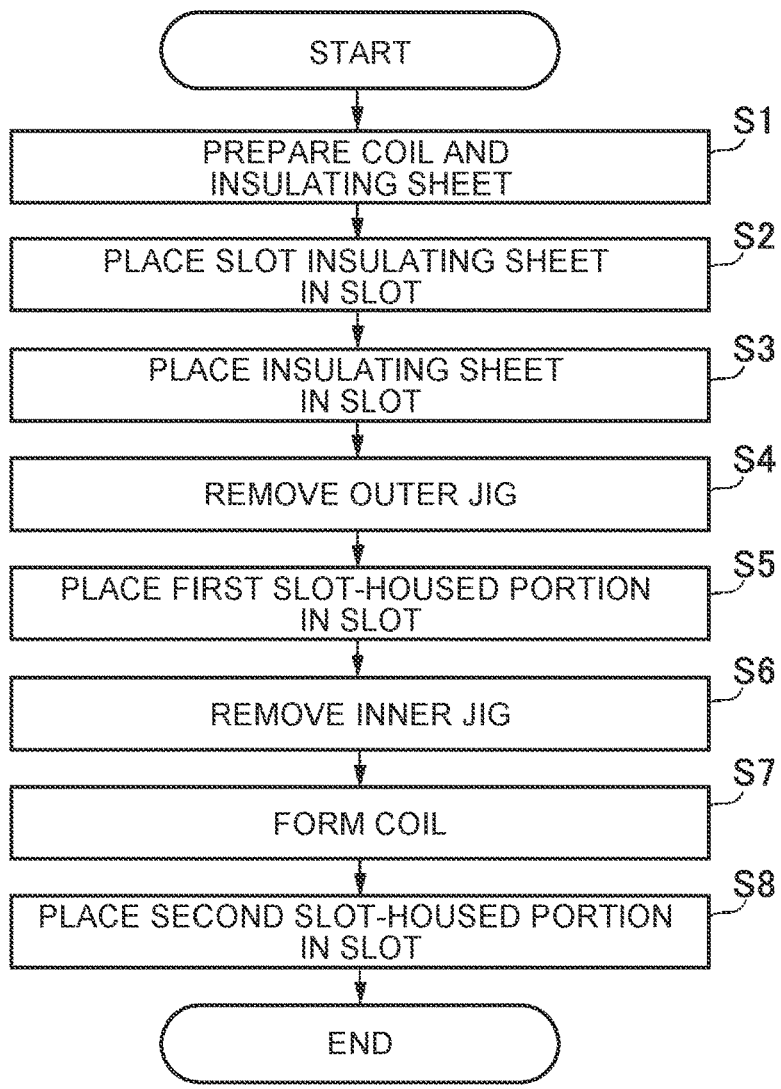
FIG. 10 is a flow chart illustrating steps for manufacturing the stator according to the first embodiment.

Referring to FIGS. 1 to 7 and FIGS. 10 to 23, a method for manufacturing the stator 100 according to the first embodiment will be described below. FIG. 10 is a flow chart illustrating steps for manufacturing the stator 100 according to the first embodiment.

Coil and Insulating Sheet Preparing Step

Step S1 involves preparing the coils 10 and the insulating sheets 30. Specifically, step S1 involves, as illustrated in FIG. 3, preparing the coils 10 each including: a pair of the slot-housed portions 11 to be housed in the slots 21 when the coils 10 are placed in the stator core 20; and the coil end portions 12 that are connected to the pair of slot-housed portions 11 and to be protruded from the end faces 20a of the stator core 20 facing along the central axis C1 of the stator core 20.

Figure 11:
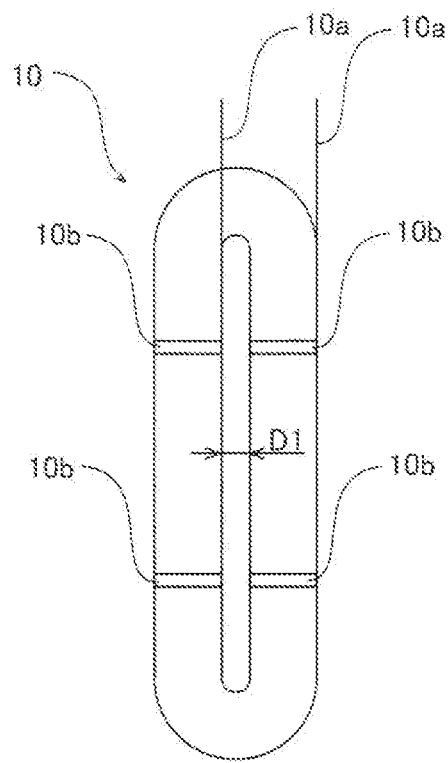
FIG. 11 is a diagram illustrating a coil preparing step according to the first embodiment.

More specifically, winding the conductor wire 10a around a spool (not illustrated) twice or more provides the coil 10 having a substantially oblong shape (e.g., a racetrack shape) as illustrated in FIG. 11. The binders 10b are wound around and attached to four connections between portions of the coil 10 that will be a pair of the slot-housed portions 11 and portions of the coil 10 that will be the coil end portions 12.

As illustrated in FIG. 5, step S1 involves providing (preparing) the insulating sheets 30 each including: the coil end portion insulators 32 (i.e., the first and second coil end portion insulators 32a and 32b) including the folded portions 31 extending along the central axis C1; and the connections 33 (i.e., the first and second connections 33a and 33b) connecting the first and second coil end portion insulators 32a and 32b to each other. In this step, the insulating sheets 30 are prepared, with the folded portions 31 folded back or folded up (see FIG. 7A).

Slot Insulating Sheet Placing Step

Figure 12:
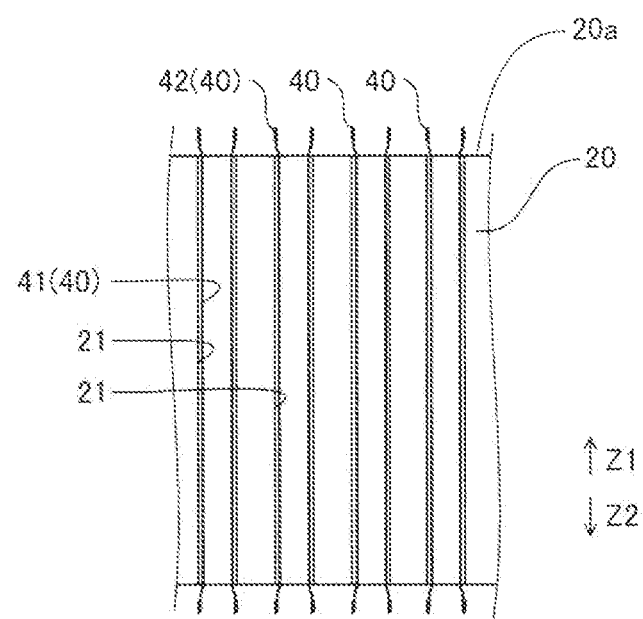
FIG. 12 is a diagram illustrating a slot insulating sheet placing step according to the first embodiment.

Step S2 involves placing the slot insulating sheets 40 in the slots 21 before the step (S3) of placing the insulating sheets 30. Specifically, as illustrated in FIG. 12, each slot insulating sheet 40 is inserted into the associated slot 21 in the stator core 20 along the central axis C1 or in the radial direction through the associated opening 21a. Thus, the slot insulators 41 are placed in the slots 21, and in addition, the collars 42 are protruded outward along the central axis C1 from the end face 20a of the stator core 20.

Step of Placing Insulating Sheets in Slots

Step S3 involves placing the insulating sheets 30 in the stator core 20 (the slots 21). Specifically, this step (S3) is performed after the step (S1) of preparing the insulating sheets 30 and before the step (S5) of placing the first slot-housed portions 11a.

As illustrated in FIGS. 13 to 16, the first embodiment involves placing the insulating sheets 30 in the stator core 20, with each insulating sheet 30 retained by a first retaining jig 50. Each first retaining jig 50 is placed between the associated insulating sheet 30 and the associated teeth 22 that define the slot 21 (first slot) in which the first slot-housed portion 11a is to be placed. Specifically, the insulating sheets 30 are placed in the stator core 20, with each insulating sheet 30 retained by an outer jig 51 and an inner jig 52. Each outer jig 51 is placed between the associated insulating sheet 30 and the associated teeth 22. Each inner jig 52 is placed in the associated slot 21 such that each inner jig 52 is located inward of the associated insulating sheet 30. Each insulating sheet 30 is interposed between the associated outer jig 51 and the associated inner jig 52.

Figure 13:
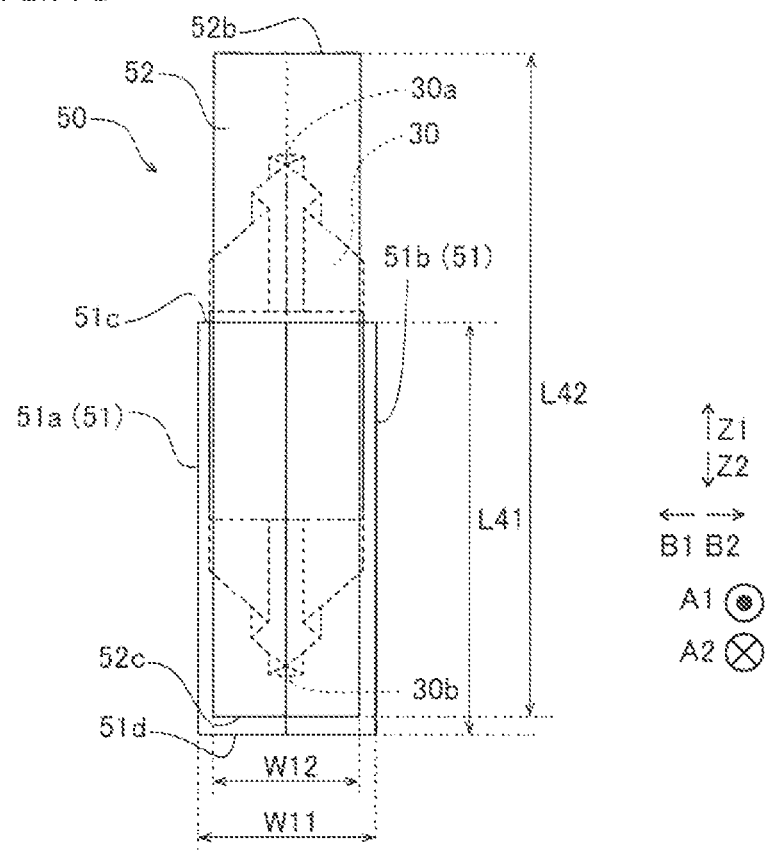
FIG. 13 is a diagram illustrating a structure of a retaining jig according to the first embodiment.

Specifically, each first retaining jig 50 is attached to the associated insulating sheet 30 as illustrated in FIG. 13. Each first retaining jig 50 includes: the outer jig 51 to be placed outward of the associated insulating sheet 30 (i.e., close to the associated teeth 22); and the inner jig 52 to be placed inward of the associated insulating sheet 30 (i.e., inward of the associated slot 21). Each of the outer jigs 51 and the inner jigs 52 is, for example, a thin plate (e.g., a plate whose thickness is less than 1 mm or preferably about 0.1 mm) or a film member. Each of the outer jigs 51 and the inner jigs 52 is made of a material having a frictional coefficient lower than that of at least one of the stator core 20, the associated insulating sheet 30, and the associated slot insulating sheet 40 (i.e., a material more slidable than at least one of the stator core 20, the associated insulating sheet 30, and the associated slot insulating sheet 40). Each of the outer jigs 51 and the inner jigs 52 is made of, for example, a metal member (such as a cold-finished steel plate) or a resin member (such as Kapton).

Figure 14:
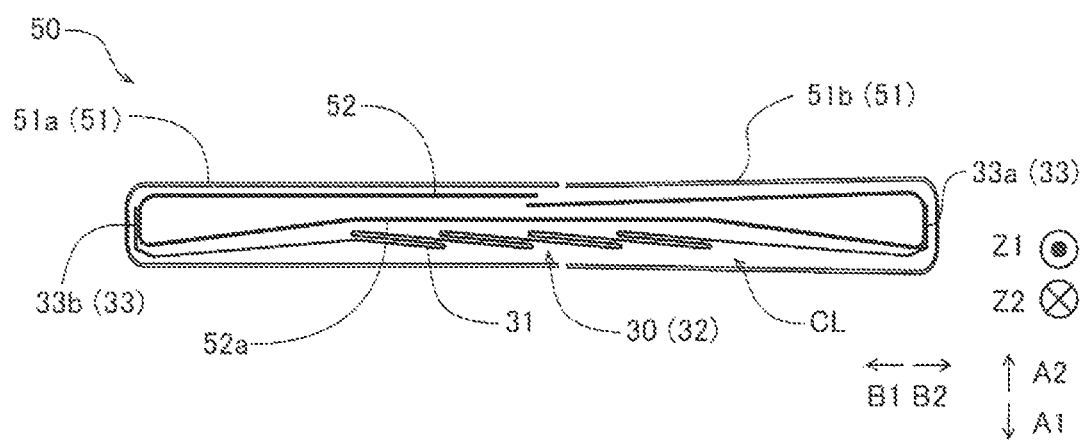
FIG. 14 is a diagram illustrating the insulating sheet and the retaining jig according to the first embodiment as viewed in the central axial direction.

As illustrated in FIG. 14, each outer jig 51 includes: a pressing jig side outer jig 51a to be placed in an associated one of grooves 61 of a circumferential pressing jig 60 (which will be described below); and a slot side outer jig 51b to be placed along the outer periphery of the associated slot 21 (i.e., the circumferential lateral surfaces and inner surface 23a of the teeth 22). The pressing jig side outer jig 51a and the slot side outer jig 51b are each substantially U-shaped as viewed along the central axis C1. The bottom of the substantially U-shaped pressing jig side outer jig 51a is placed adjacent to a bottom 61a of the groove 61 located in the direction of the arrow B1. The bottom of the substantially U-shaped slot side outer jig 51b is placed adjacent to the inner surface 23a of the stator core 20 located in the direction of the arrow B2. The pressing jig side outer jig 51a and the slot side outer jig 51b form a substantially annular shape.

Each inner jig 52 is placed inward of the associated outer jig 51. Each inner jig 52 is placed such that the associated insulating sheet 30 is interposed between the inner jig 52 and the associated outer jig 51. Each inner jig 52 is formed into, for example, a substantially annular shape. Each inner jig 52 includes, in its substantially annular region, a recess 52a recessed inward. The folded portions 31 of each insulating sheet 30 are placed in a clearance CL between the associated recess 52a and the associated outer jig 51. Each insulating sheet 30 is thus retained by the associated first retaining jig 50.

As illustrated in FIG. 13, a length L41 of each outer jig 51 along the central axis C1 is shorter than a length L42 of each inner jig 52 along the central axis C1. An end 51c of each outer jig 51 facing in the direction of the arrow Z1 is placed in the direction of the arrow Z2 along the central axis C1 relative to an end 52b of the associated inner jig 52 facing in the direction of the arrow Z1 and an end 30a of the associated insulating sheet 30 facing in the direction of the arrow Z1. An end face 51d of each outer jig 51 facing in the direction of the arrow Z2 is placed in the direction of the arrow Z2 relative to an end face 52c of the associated inner jig 52 facing in the direction of the arrow Z2 and an end face 30b of the associated insulating sheet 30 facing in the direction of the arrow Z2.

The end 52b of each inner jig 52 facing in the direction of the arrow Z1 is placed in the direction of the arrow Z1 relative to the end 30a of the associated insulating sheet 30 facing in the direction of the arrow Z1. The end face 52c of each inner jig 52 facing in the direction of the arrow Z2 is placed in the direction of the arrow Z2 relative to the end face 30b of the associated insulating sheet 30 facing in the direction of the arrow Z2. A width W11 of each outer jig 51 in the radial direction is larger than a width W12 of each inner jig 52 in the radial direction.

Figure 15:
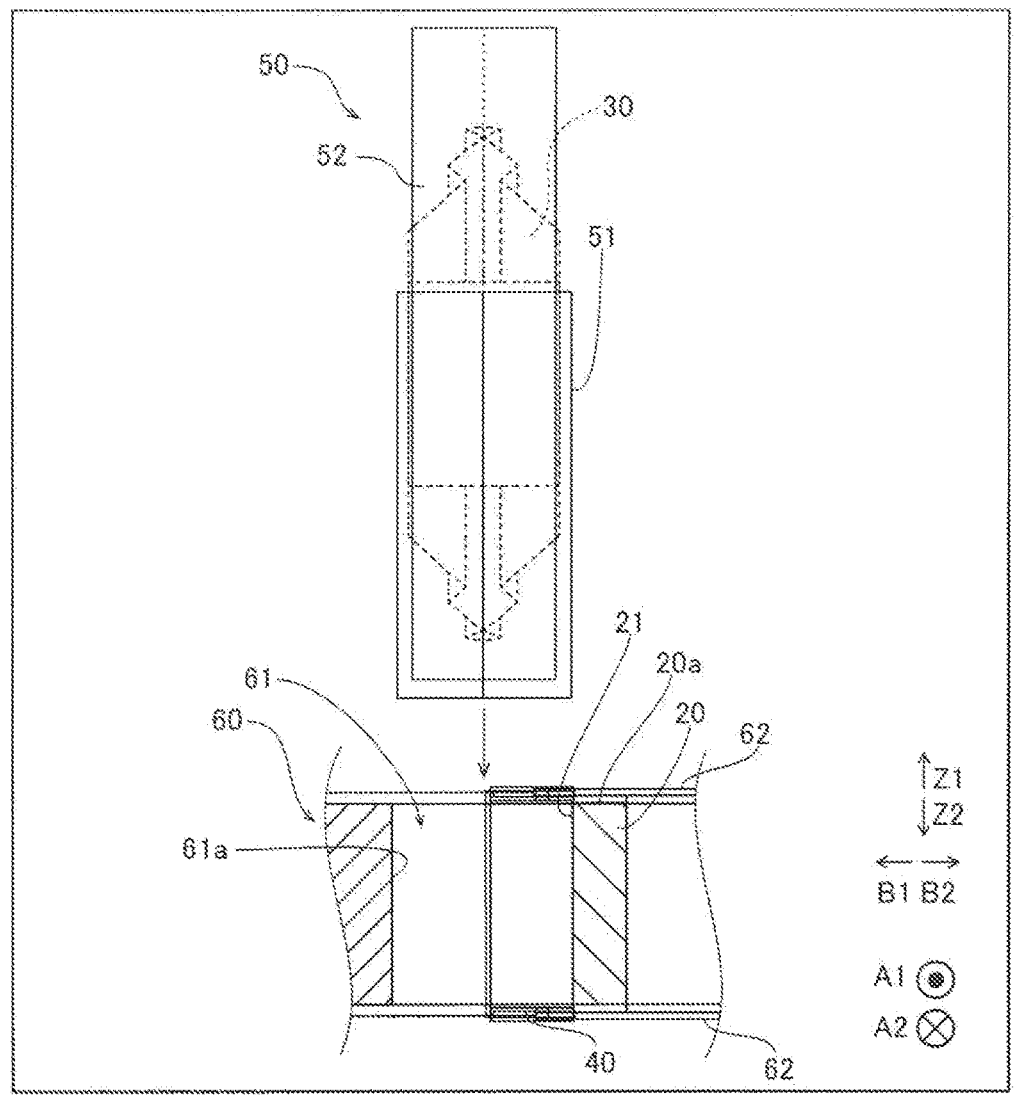
FIG. 15 is a diagram illustrating an insulating sheet placing step according to the first embodiment.
Figure 16:
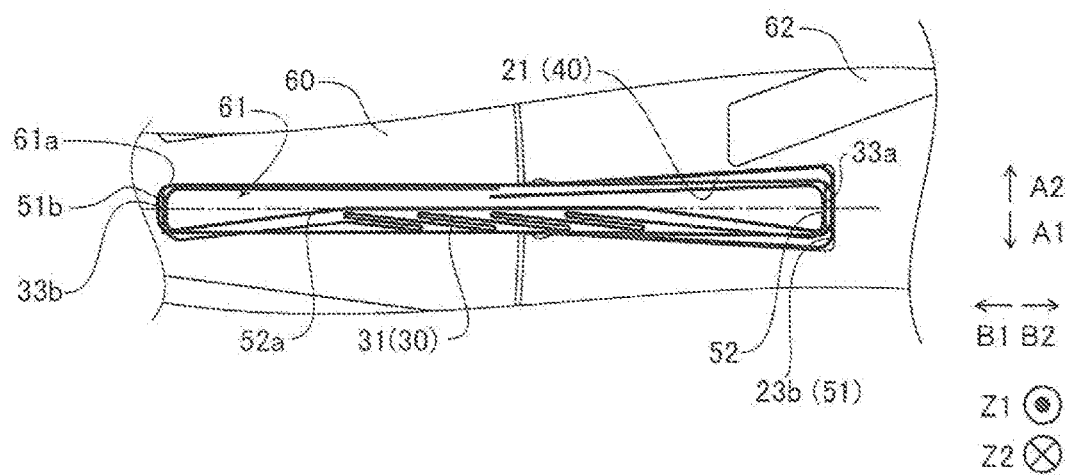
FIG. 16 is a diagram illustrating the insulating sheet and the retaining jig placed in the stator core according to the first embodiment.

As illustrated in FIGS. 15 and 16, the circumferential pressing jig 60 is placed such that the opening of each groove 61 faces the opening 21a of the associated slot 21 in the radial direction. The circumferential pressing jig 60 is provided to deform (form) the coils 10. Forming the coils 10 involves placing support jigs 62 on end faces (i.e., end faces 22a) of the teeth 22. Each support jig 62 is formed into a plate shape so as to support a portion of the associated coil 10 that is the first slot-housed portion 11a.

With each insulating sheet 30 retained by the associated first retaining jig 50, the insulating sheets 30 are inserted into the slots 21 and the grooves 61 of the circumferential pressing jig 60 along the central axis C1. Each outer jig 51 functions as a guide and a protector for the associated insulating sheet 30 during insertion of the insulating sheet 30 into the associated slot 21 and the associated groove 61 of the circumferential pressing jig 60. In other words, the insulating sheets 30 and the stator core 20 will not rub against each other, so that the insulating sheets 30 are placed in the slots 21 and the grooves 61 while the outer jigs 51 are in contact with the stator core 20. As illustrated in FIG. 16, each insulating sheet 30 is thus placed in the associated slot 21 and groove 61 together with the associated first retaining jig 50.

Outer Jig Removing Step

Figure 17:
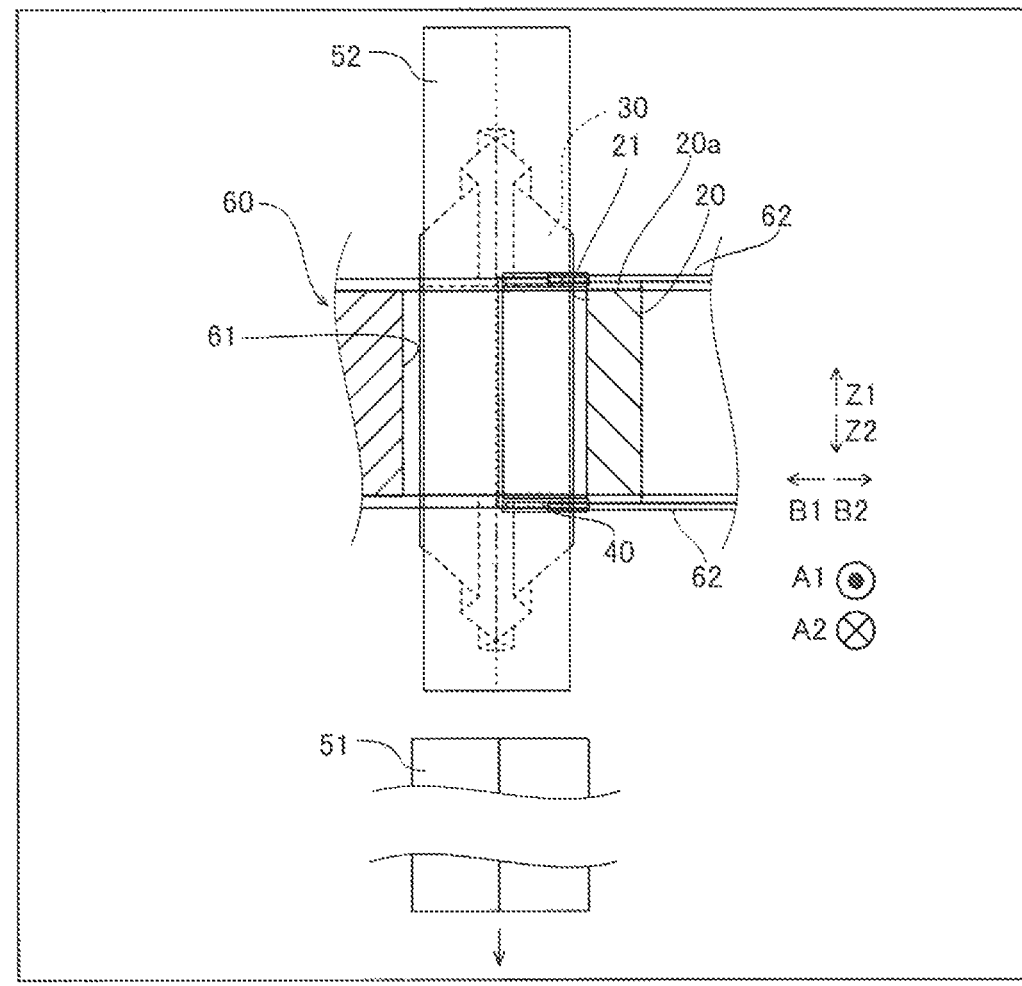
FIG. 17 is a diagram illustrating an outer jig removing step according to the first embodiment.
Figure 18:
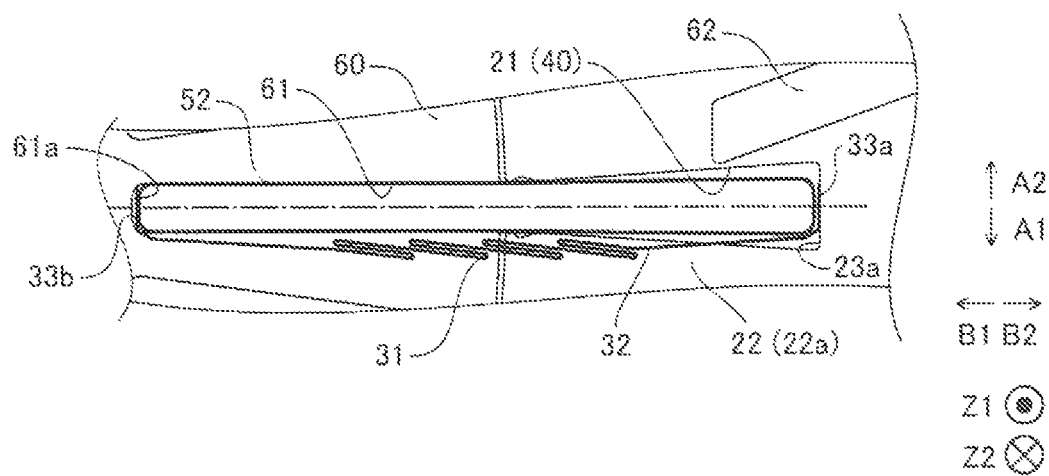
FIG. 18 is a diagram illustrating an arrangement of the stator from which the outer jig according to the first embodiment has been removed.

As illustrated in FIGS. 17 and 18, step S4 involves removing each outer jig 51 from the associated slot 21. This step (S4) is performed after the step (S3) of placing the insulating sheets 30 and before the step (S5) of placing the first slot-housed portions 11a.

Specifically, as illustrated in FIG. 17, each outer jig 51 is moved in the direction of the arrow Z2 relative to the associated coil 10, the stator core 20, the associated insulating sheet 30, the circumferential pressing jig 60, and the associated support jigs 62, so that each outer jig 51 is pulled out. Each outer jig 51 is thus removed from the associated slot 21 (i.e., from between the associated insulating sheet 30 and the associated teeth 22).

As illustrated in FIG. 18, the first embodiment involves removing each outer jig 51 from between the associated insulating sheet 30 and the associated teeth 22, so that the folded portions 31 of each insulating sheet 30 are pressed out of the associated slot 21 by the associated inner jig 52 and brought into engagement with the end face 22a of the associated tooth 22 (the stator core 20) facing along the central axis C1. Specifically, removal of each outer jig 51 moves the associated inner jig 52 outward in the associated slot 21 (i.e., toward the associated teeth 22) such that each inner jig 52 widens in the circumferential direction inside the associated slot 21. Accordingly, the inner jigs 52 push the coil end portion insulators 32 to the teeth 22 from positions overlapping with the slots 21 as viewed along the central axis C1. This brings the folded portions 31, which have moved to the teeth 22, into engagement with the end faces 22a of the teeth 22 facing along the central axis C1 and an end face of the circumferential pressing jig 60 facing in the axial direction thereof, thus effecting positioning of the insulating sheets 30 (restricting movement of the insulating sheets 30) relative to the stator core 20 along the central axis C1.

Step of Placing First Slot-Housed Portions in Slots

Figure 19:
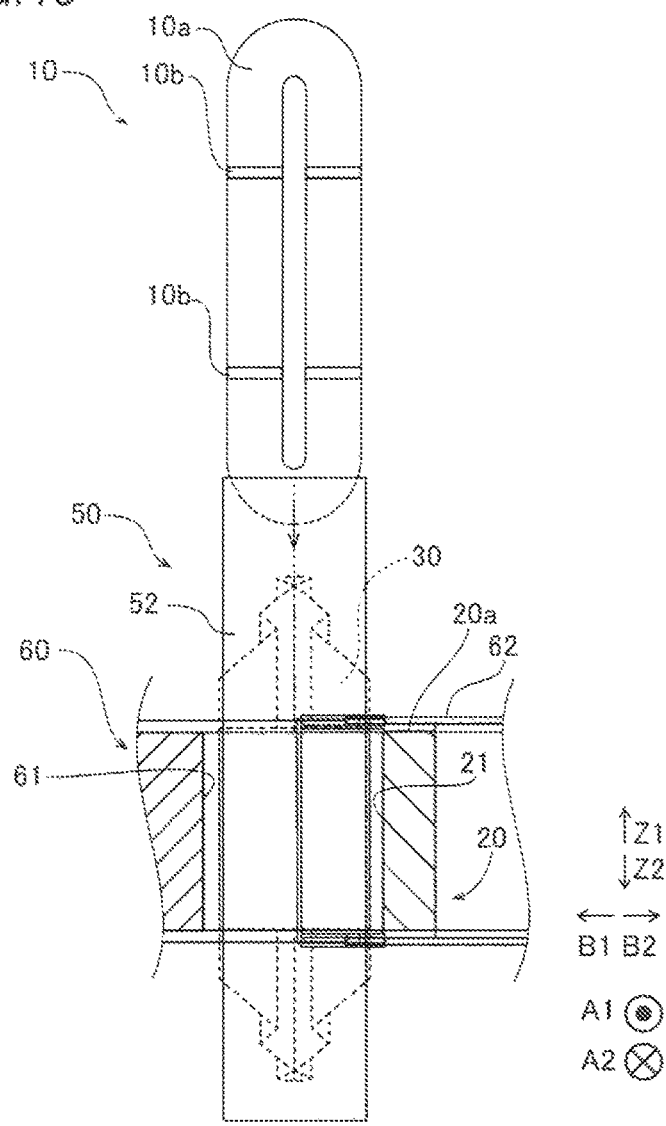
FIG. 19 is a diagram illustrating a first slot-housed portion placing step according to the first embodiment.
Figure 20:
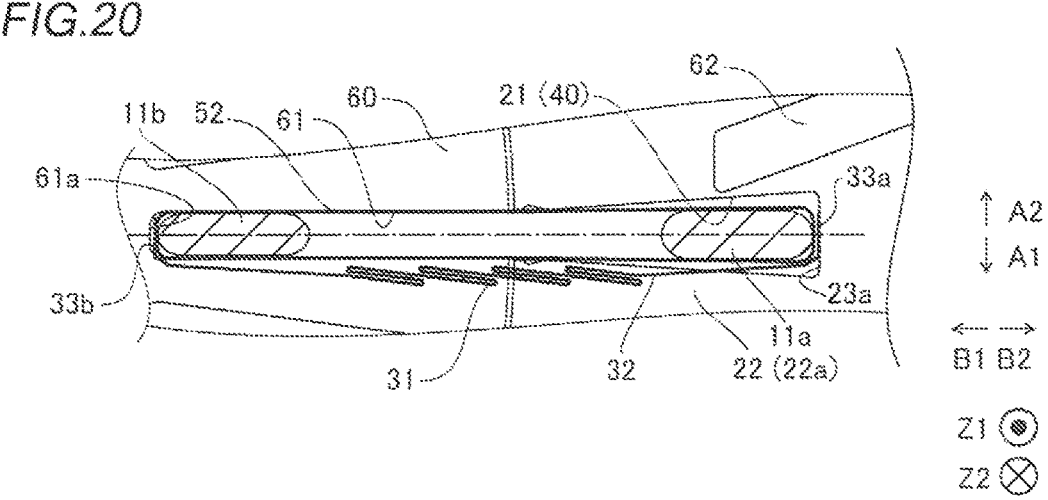
FIG. 20 is a diagram illustrating an arrangement of the stator, with the first slot-housed portion according to the first embodiment placed in the slot.

Step S5 involves placing each first slot-housed portion 11a in the associated slot 21 (first slot). Specifically, as illustrated in FIGS. 19 and 20, each first slot-housed portion 11a is placed inside the associated slot 21 and inward of the associated inner jig 52, and each second slot-housed portion 11b is placed inside the associated groove 61 of the circumferential pressing jig 60 and inward of the associated inner jig 52.

In the first embodiment, the first and second slot-housed portions 11a and 11b are placed inward of the inner jigs 52 inside the slots 21 while the first and second slot-housed portions 11a and 11b are guided by the inner jigs 52. As illustrated in FIG. 19, for example, each coil 10 is placed in the direction of the arrow Z1 relative to the stator core 20. Each coil 10 is then moved relative to the stator core 20 along the central axis C1 and thus inserted into the associated slot 21 such that each coil 10 is located inward of the associated inner jig 52. Specifically, each coil 10 is moved along the inner surface of the associated inner jig 52 (each coil 10 is moved while being in contact with the inner surface of the associated inner jig 52), such that each first slot-housed portion 11a is inserted into the associated slot 21 and each second slot-housed portion 11b is inserted into the associated groove 61. As illustrated in FIG. 20, each inner jig 52 is thus placed between the associated first slot-housed portion 11a and the inner surface 23a in the radial direction and between the associated second slot-housed portion 11b and the bottom 61a of the associated groove 61 in the radial direction.

In this step, the first connection 33a of each insulating sheet 30 is placed between the associated first slot-housed portion 11a and the inner surface 23a in the radial direction. The second connection 33b of each insulating sheet 30 is placed between the associated second slot-housed portion 11b and the bottom 61a of the associated groove 61 in the radial direction.

Inner Jig Removing Step

Figure 21:
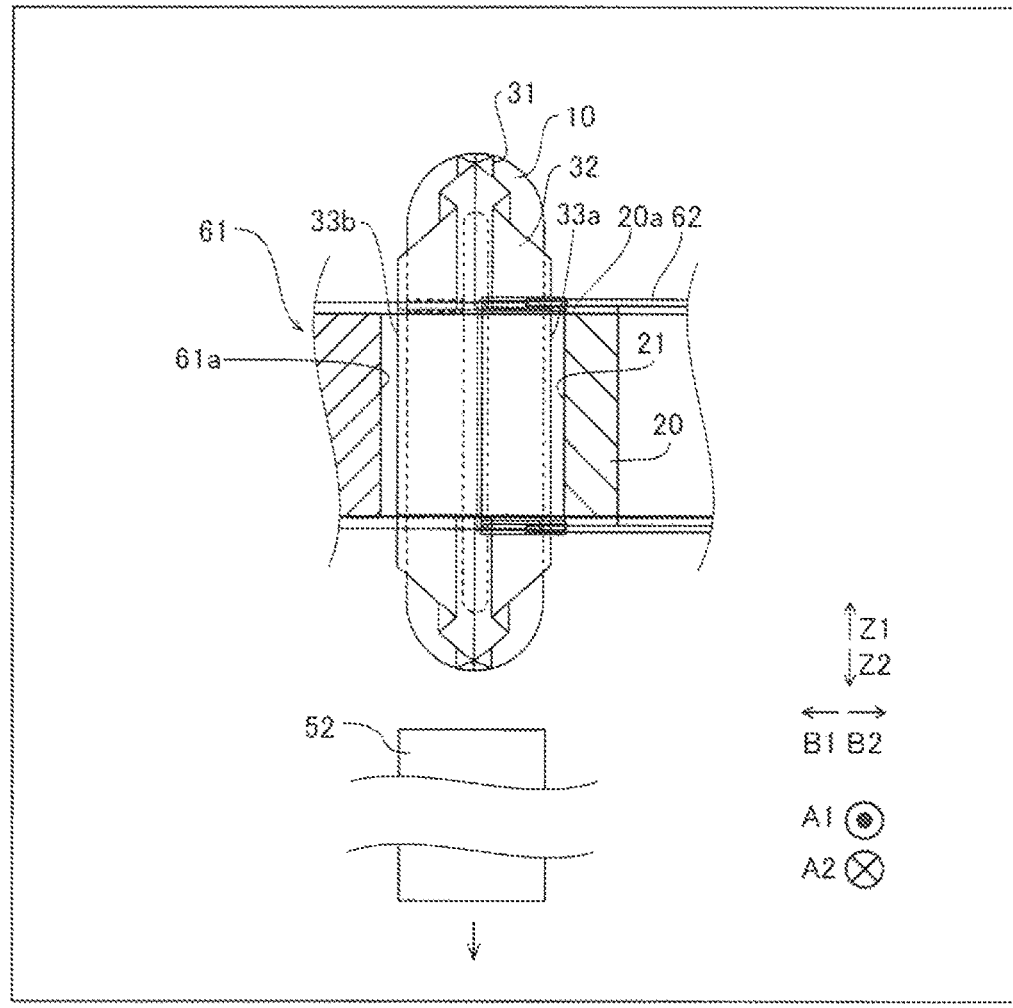
FIG. 21 is a diagram illustrating an inner jig removing step according to the first embodiment.
Figure 22:
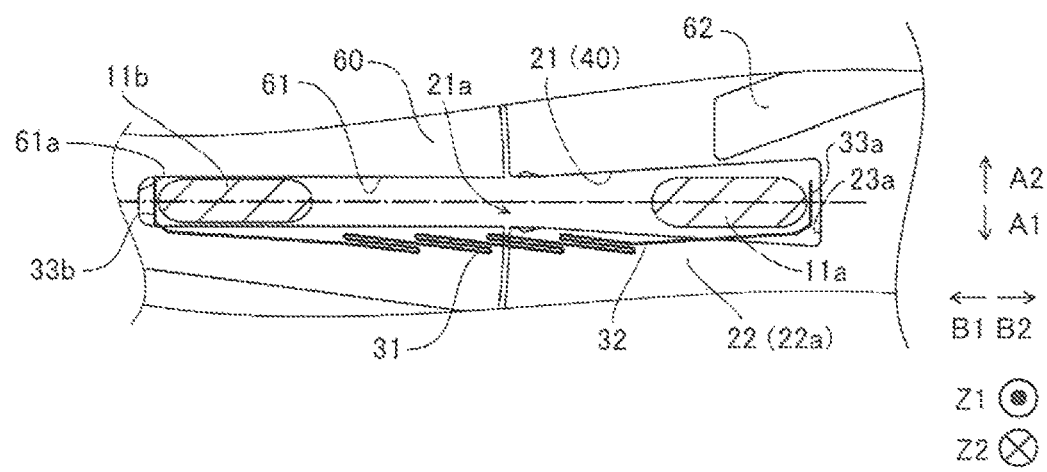
FIG. 22 is a diagram illustrating an arrangement of the stator from which the inner jig according to the first embodiment has been removed.

As illustrated in FIGS. 21 and 22, step S6 involves removing each inner jig 52. This step (S6) involves removing each inner jig 52 from between the associated insulating sheet 30 and the associated first slot-housed portion 11a after the step (S5) of placing the first slot-housed portions 11a in the slots 21 and before the step (S8) of placing the second slot-housed portions 11b in the slots 21. Specifically, step S6 involves moving each inner jig 52 relative to the associated slot 21 along the central axis C1. As illustrated in FIG. 22, each first slot-housed portion 11a, each first connection 33a, and each slot insulating sheet 40 are thus placed in the associated slot 21. Each second slot-housed portion 11b and each second connection 33b are placed in the associated groove 61.

Coil Forming Step

Figure 23:
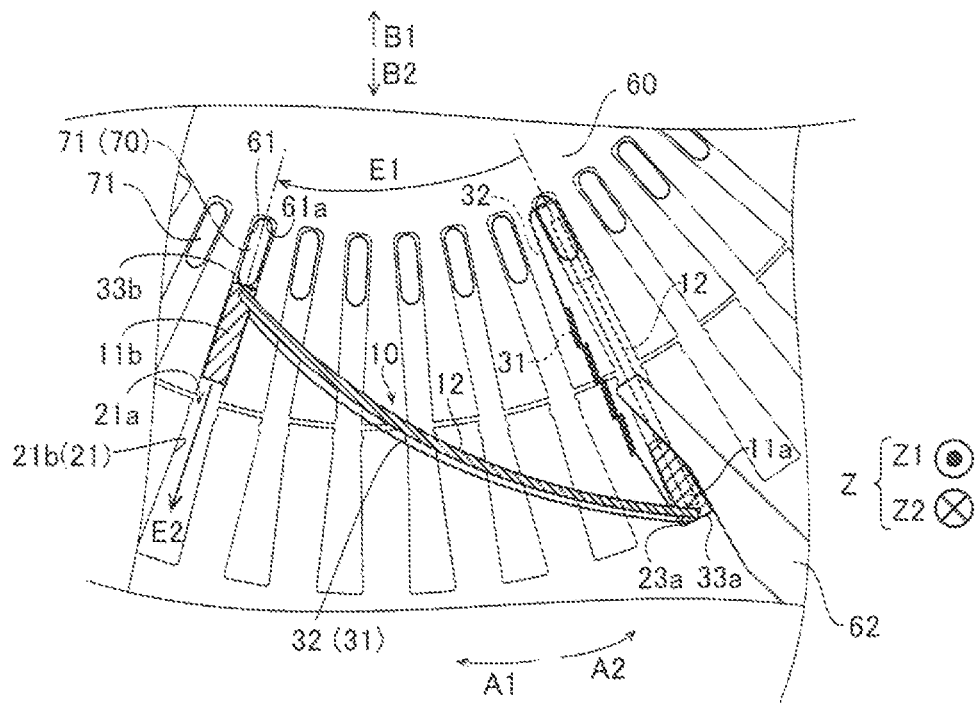
FIG. 23 is a diagram illustrating a coil forming step according to the first embodiment.

As illustrated in FIG. 23, step S7 involves forming each coil 10. This step (S7) is performed after the step (S3) of placing the insulating sheets 30 and before the step (S8) of placing the second slot-housed portions 11b in the slots 21. The first embodiment involves increasing a distance D1 between the first and second slot-housed portions 11a and 11b (see FIG. 11) to a distance D2 (see FIG. 3) while unfolding the folded portions 31 of each insulating sheet 30 in a direction (i.e., a circumferential direction) intersecting the direction of extension of the folded portions 31 (i.e., a direction Z). Each second slot-housed portion 11b is thus moved to a circumferential position corresponding to the slot 21 (second slot) different from the slot 21 (first slot) in which the associated first slot-housed portion 11a is placed. Although only one coil 10 is illustrated in FIG. 23 for the sake of clarity of description, the first slot-housed portions 11a are each placed in an associated one of the slots 21, and the second slot-housed portions 11b are each placed in an associated one of the grooves 61.

Specifically, the first embodiment involves, with each insulating sheet 30 placed on a portion of the associated coil end portion 12 located in the direction of the arrow A1, pressing each second slot-housed portion 11b in the direction of the arrow A1 from the direction of the arrow A2 by the circumferential pressing jig 60. This moves each second slot-housed portion 11b to a circumferential position corresponding to the slot 21 (second slot) different in circumferential position from the slot 21 (first slot) in which the associated first slot-housed portion 11a is placed, while unfolding the folded portions 31.

To be more specific, the radially inner region of each first slot-housed portion 11a is supported by the associated support jig 62 such that each first slot-housed portion 11a will not move radially inward. In this state, the circumferential pressing jig 60 is rotated in the direction of an arrow E1 (i.e., the direction of the arrow A1) around the central axis C1 so as to change the circumferential positions of the grooves 61 relative to the stator core 20. The first and second slot-housed portions 11a and 11b thus change from a state where the first and second slot-housed portions 11a and 11b are located at substantially the same circumferential position to a state where the first and second slot-housed portions 11a and 11b are located at different circumferential positions. This increases the distance between the first and second slot-housed portions 11a and 11b from the distance D1 (see FIG. 11) to the distance D2 (see FIG. 3). Each of the distances D1 and D2 is the shortest distance between the first and second slot-housed portions 11a and 11b. As illustrated in FIGS. 5 and 6, the length of the folded portions 31 thus increases from the length L1 to the length L2 (the length of each folded portion 31 increases from the length L21 to the length L22). The length of each coil end portion insulator 32 increases from the length L3 to the length L4.

Step of Placing Second Slot-Housed Portions in Slots

As illustrated in FIG. 23, step S8 involves placing each second slot-housed portion 11b in the associated slot 21. The first embodiment involves, after the step (S5) of placing the first slot-housed portions 11a, moving each second slot-housed portion 11b radially outward while unfolding each insulating sheet 30 in a direction intersecting the direction of extension of the folded portions 31 of each insulating sheet 30, so that each second slot-housed portion 11b is placed in the second slot 21 different from the first slot 21. More specifically, the second slot-housed portions 11b are moved radially outward (i.e., in the direction of an arrow E2) by radial pressing jigs 70, with each first connection 33a placed between the associated first slot-housed portion 11a and the inner surface 23a and each second connection 33b placed between the associated second slot-housed portion 11b and the associated radial pressing jig 70. Each second slot-housed portion 11b is thus placed in the associated slot 21.

Specifically, each radial pressing jig 70 is inserted into an inner space of the associated groove 61 located between the bottom 61a of the associated groove 61 and the associated second connection 33b. Each radial pressing jig 70 includes, for example, a tapered pressing surface 71 inclined relative to the central axis C1. Movement of each radial pressing jig 70 relative to the circumferential pressing jig 60 along the central axis C1 causes each pressing surface 71 to move radially outward in the associated groove 61. Accordingly, each pressing surface 71 presses the associated second slot-housed portion 11b radially outward through the associated second connection 33b. This moves each second slot-housed portion 11b radially outward and thus inserts each second slot-housed portion 11b into the radially inner portion 21b of the associated slot 21 through the associated opening 21a (see FIG. 2).

As illustrated in FIG. 4, each insulating sheet 30 is thus placed between the associated coil end portions 12 adjacent to each other. The circumferential pressing jig 60, the support jigs 62, and the radial pressing jigs 70 are then removed so as to complete the stator 100 illustrated in FIG. 1.

Second Embodiment

Referring to FIGS. 1, 3, 24, and 25, a stator 200 according to a second embodiment will be described below. In the following description, components similar to those in the first embodiment are identified by the same reference characters, and description thereof will be omitted.

Structure of Stator

Arrangement of Coils and Stator Core

Figure 24:
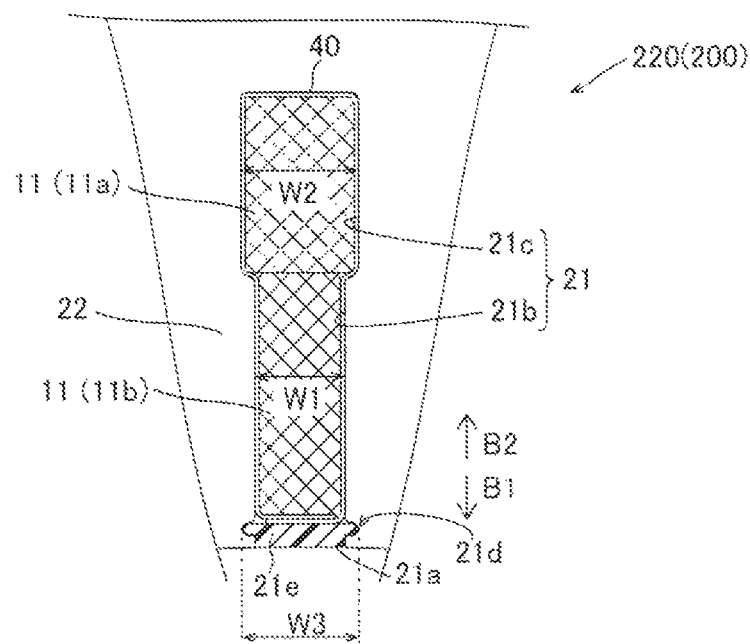
FIG. 24 is a diagram illustrating an arrangement of a slot of a stator according to a second embodiment.

As illustrated in FIG. 1, the stator 200 includes a stator core 220. The stator core 220 has a length L10 (see FIG. 39) in the axial direction. As illustrated in FIG. 24, a plate-shaped wedge member 21e is disposed in the vicinity of the opening 21a of each slot 21 of the stator core 220. Each wedge member 21e prevents radially inward movement (disengagement) of the associated coil 10. Specifically, each wedge member 21e is provided in a groove 21d defined in the vicinity of the opening 21a of the associated slot 21. A circumferential width W3 of each groove 21d in the circumferential direction is larger than the width W1 such that each plate-shaped wedge member 21e is disposed in the associated groove 21d (i.e., such that each plate-shaped wedge member 21e is inserted into the associated groove 21d in the central axis direction).

Structure of Insulating Sheet

Figure 25:
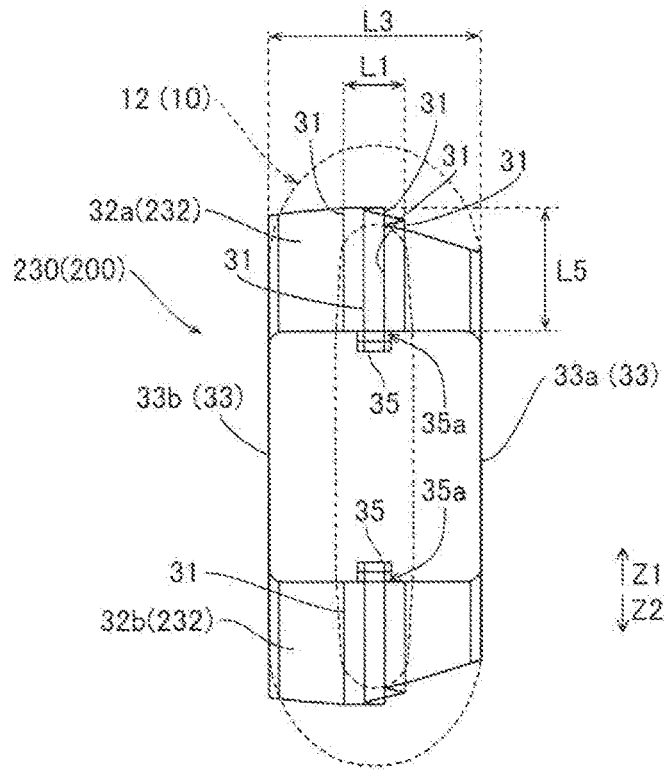
FIG. 25 is a diagram illustrating a structure of an insulating sheet according to the second embodiment (during manufacture of the stator).
Figure 26:
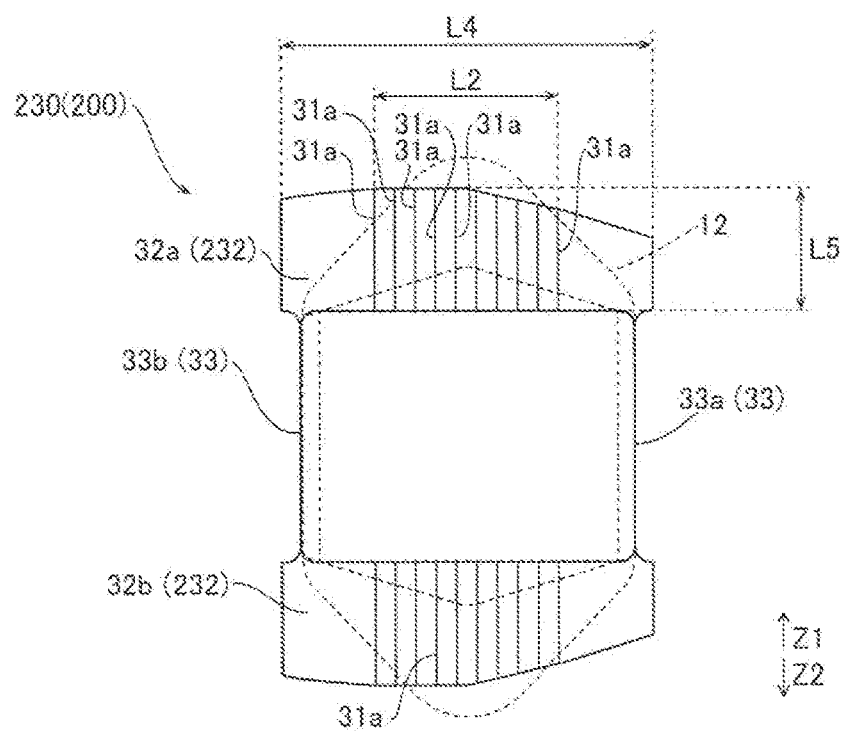
FIG. 26 is a diagram illustrating a structure of the insulating sheet according to the second embodiment (upon completion of the stator).

As illustrated in FIG. 25, the stator 200 includes a plurality of insulating sheets 230. Each insulating sheet 230 includes coil end portion insulators 232. Unlike the coil end portion insulators 32 according to the first embodiment, the coil end portion insulators 232 are provided with no holes 34a or cut-outs 34b.

Arrangement of Fixtures

During manufacture of the stator 200, each coil end portion insulator 232 is provided with a fixture 35 to fix the folded portions 31 to each other so as to prevent the folded portions 31 from being spread out. In one example, each insulating sheet 230 is provided with the fixtures 35 such that one of the fixtures 35 is connected to an end of a first coil end portion insulator 32a facing in the direction Z2 and the other fixture 35 is connected to an end of a second coil end portion insulator 32b facing in the direction Z1. Each fixture 35 is provided by fixing folded back regions of the folded portions 31 to each other with, for example, an adhesive. The fixtures 35 are formed to protrude from the first and second coil end portion insulators 32a and 32b toward the winding inner side of the coil 10. The fixtures 35 are removed before completion of the stator 200. Each fixture 35 is an example of a "protruded region" in the claims.

Stator Manufacturing Apparatus

Referring to FIGS. 25 to 75, a manufacturing apparatus 300 for the stator 200 according to the present embodiment will be described below. In the following description, with the coils 10 placed in the stator core 220, a direction E corresponds to the axial direction (i.e., the direction Z) in which each radially outer slot-housed portion 11a and each radially inner slot-housed portion 11b extend, a direction F corresponds to a direction along a winding axis of each coil 10, and a direction G corresponds to a direction that is perpendicular to the direction E and intersects the direction F.

Structure of Coil Former

Figure 27:
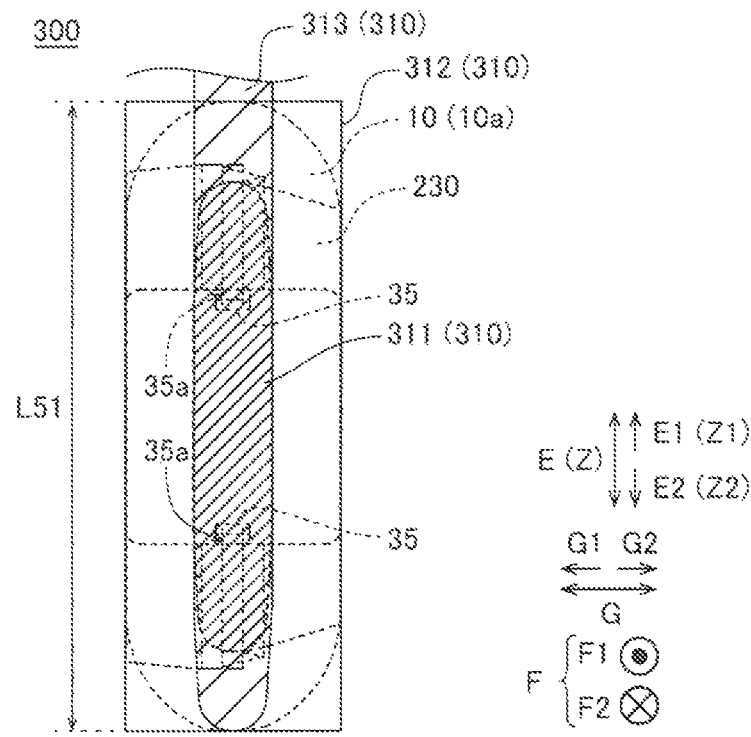
FIG. 27 is a side view of a structure of a coil former according to the second embodiment.
Figure 28:
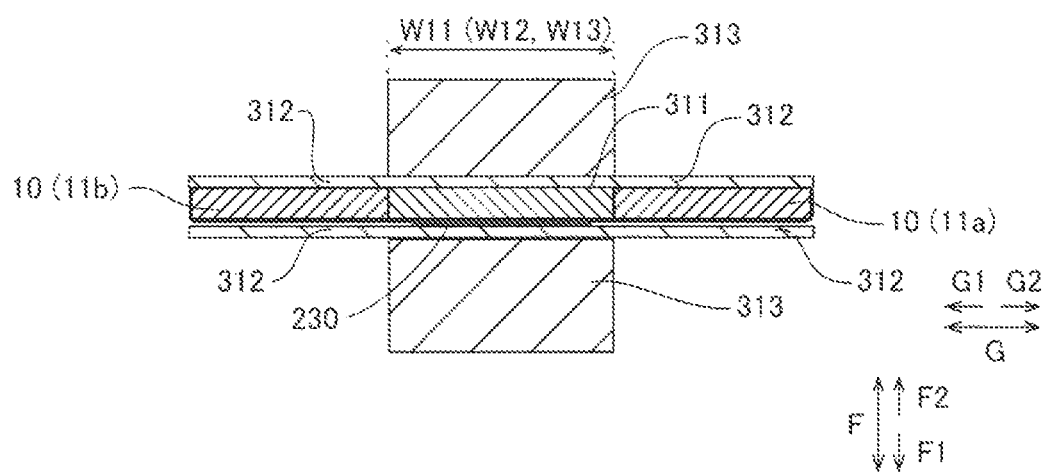
FIG. 28 is a cross-sectional view of a structure of the coil former according to the second embodiment.

As illustrated in FIG. 27, the manufacturing apparatus 300 includes a coil former 310 to form the coils 10. The coil former 310 includes a winding core 311, two side plates 312, and two winding core retaining jigs 313. As illustrated in FIG. 28, a spool is provided by placing the two side plates 312 such that the winding core 311 is sandwiched between the side plates 312 from both sides in the direction F. The coil former 310 is structured such that winding the conductor wire 10a around the winding core 311 (spool) forms the coil 10 having an oblong shape (see FIG. 27), such as a racetrack shape, as viewed in the direction F and having a length L51 in the direction E. The winding core 311 is formed such that the winding core 311 has an oblong shape (elliptical shape) as viewed in the direction F and has a width W11 (see FIG. 28) in the direction G The winding core 311 and the side plates 312 are placed such that the insulating sheet 230 is sandwiched between the winding core 311 and one of the side plates 312.

As illustrated in FIG. 28, the winding core retaining jigs 313 are structured to retain the winding core 311 such that the winding core 311 is sandwiched between the winding core retaining jigs 313 through the side plates 312 from both sides in the direction F. The winding core retaining jigs 313 are thus structured to retain the coil 10 from both sides in the direction F. Each winding core retaining jig 313 has, for example, a width W12 in the direction G Each winding core retaining jig 313 is formed into a plate extending in the direction E. The width W12 is substantially equal to the width W11. The winding core retaining jigs 313 are structured to be movable together with the side plates 312 in the direction E.

Structure of Coil Retaining Jig

Figure 29:
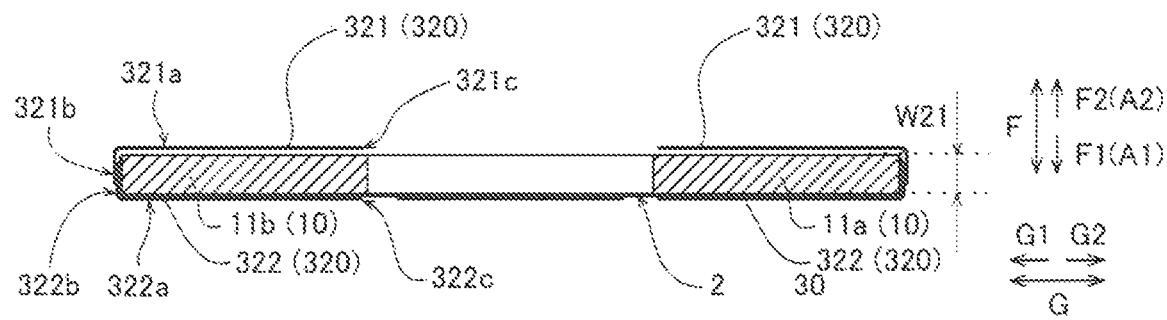
FIG. 29 is a cross-sectional view of a structure of a coil retaining jig according to the second embodiment.
Figure 30:
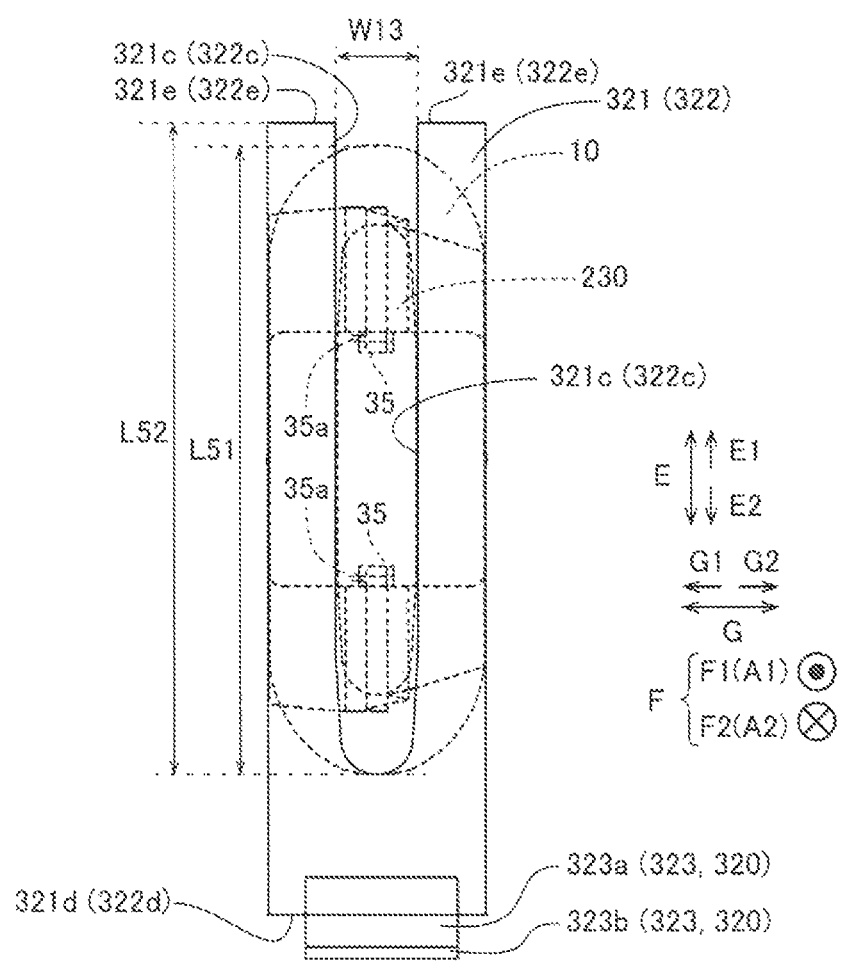
FIG. 30 is a side view of a structure of the coil retaining jig according to the second embodiment.
Figure 31:
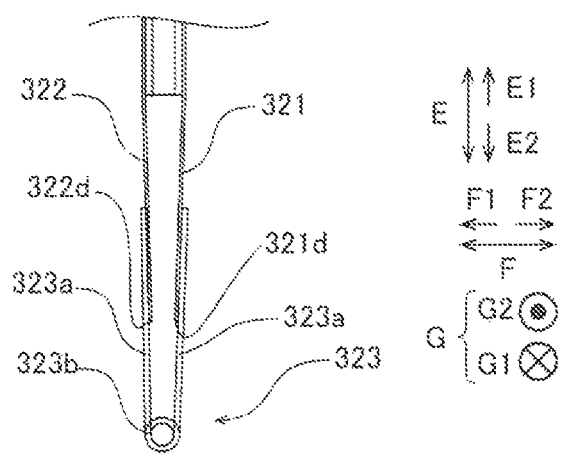
FIG. 31 is a diagram illustrating a structure of a connector of the coil retaining jig according to the second embodiment.

As illustrated in FIGS. 29 to 31, the manufacturing apparatus 300 includes a plurality of coil retaining jigs 320. The coil retaining jigs 320 are each provided for an associated one of the coils 10. Each coil retaining jig 320 retains the associated coil 10 so as to restrict deformation of at least a portion of the associated coil 10.

As illustrated in FIG. 29, each coil retaining jig 320 includes a plate member 321, a plate member 322, and a connector 323. The plate members 321 and 322 retain the associated coil 10 such that the coil 10 is sandwiched between the plate members 321 and 322 from both sides in the circumferential direction of the stator core 220 (i.e., from both sides in the direction F in FIG. 29). The plate members 321 and 322 are structured to retain the associated coil 10 such that the coil 10 is sandwiched between the plate members 321 and 322 from both sides in the circumferential direction of the stator core 220, thus restricting deformation of the coil 10 in the circumferential direction of the stator core 220. In other words, the plate members 321 and 322 are structured to prevent an increase in the size of the associated coil 10.

Each plate member 321 includes: a first portion 321a to be placed on a portion of the associated coil 10 facing in a direction F2; and a second portion 321b that is connected to the first portion 321a and to be placed on both sides of the associated coil 10 in the direction G Each plate member 322 includes: a first portion 322a to be placed on a portion of the associated coil 10 facing in a direction F1; and a second portion 322b that is connected to the first portion 322a and to be placed on both sides of the associated coil 10 in the direction G The first portions 321a and 322a are able to prevent the associated coil 10 from being deformed and increased in size on both sides in the direction F. A width W21 of each coil 10 in the direction F is equal to or smaller than the width W2 (width W1) of each slot 21. The second portions 321b and 322b are able to prevent the associated coil 10 from being deformed and increased in size on both sides in the direction G.

As illustrated in FIG. 30, the plate members 321 and 322 are respectively provided with openings 321c and 322c, so that the plate members 321 and 322 are substantially U-shaped as viewed in the circumferential direction of the stator core 220 (i.e., as viewed from the direction A1). The plate member 321 is provided with the opening 321c opened in the direction Z1 of the stator core 220. The plate member 322 is provided with the opening 322c opened in the direction Z1 of the stator core 220. The opening 321c is provided in the form of a cut-out. This cut-out is formed by cutting out the plate member 321 in the direction Z2 from an end 321e of the plate member 321 facing in the direction Z1. The opening 322c is provided in the form of a cut-out. This cut-out is formed by cutting out the plate member 322 in the direction Z2 from an end 322e of the plate member 322 facing in the direction Z1.

A length L52 of each of the openings 321c and 322c in the direction E is equal to or longer than the length L51 of each coil 10 (which is before being subjected to a coil deforming step S30) in the direction E. A width W13 of each of the openings 321c and 322c in the direction G is equal to or larger than the width W11 of the winding core 311 and the width W12 of each winding core retaining jig 313. Accordingly, each coil retaining jig 320 is structured such that each coil retaining jig 320 is able to retain the associated coil 10, with the coil 10 and the winding core 311 retained by the winding core retaining jigs 313 through the openings 321c and 322c.

The plate members 321 and 322 are structured to retain the associated coil 10 such that the insulating sheet 230 is sandwiched between the coil 10 (i.e., the coil end portion 12) and the plate member 322. In other words, each coil retaining jig 320 is structured to retain the associated coil 10 having the insulating sheet 230 attached thereto. The plate members 321 and 322 are structured to retain the associated coil 10 such that the fixtures 35 of the insulating sheet 230 are exposed through the openings 321c and 322c as viewed in the circumferential direction.

As illustrated in FIG. 30, the connector 323 is structured to connect the plate members 321 and 322 in the vicinity of ends 321d and 322d of the plate members 321 and 322. Specifically, as illustrated in FIG. 31, the connector 323 includes two connecting plates 323a and a rotation shaft 323b. The connector 323 is provided in the form of a hinge. As used herein, the term "vicinity of the ends 321d and 322d" refers to an area including the ends 321d and 322d, a region ranging from the ends 321d and 322d to a portion of the coil 10 that is located in the direction E2 and will be the coil end portion 12, and a region located in the direction E2 relative to the ends 321d and 322d.

Each coil retaining jig 320 is structured such that at least one of the plate members 321 and 322 is rotatable around the rotation shaft 323b and thus each coil retaining jig 320 is changeable between an opened state where the plate members 321 and 322 are opened as illustrated in FIG. 32 and a closed state where the plate members 321 and 322 are closed as illustrated in FIGS. 29 and 30. The term "closed state" refers to a state where the plate members 321 and 322 are substantially parallel to each other and both of the plate members 321 and 322 are in abutment with (close to) the coil 10 (i.e., a state where the coil 10 is retained by both of the plate members 321 and 322). The term "opened state" refers to a state where at least one of the plate members 321 and 322 is rotated around the rotation shaft 323b and one of the plate members 321 and 322 is out of contact with the coil 10 (i.e., a state where the coil 10 is not retained by the plate members 321 and 322).

Structure of First Coil Placer

Figure 33:
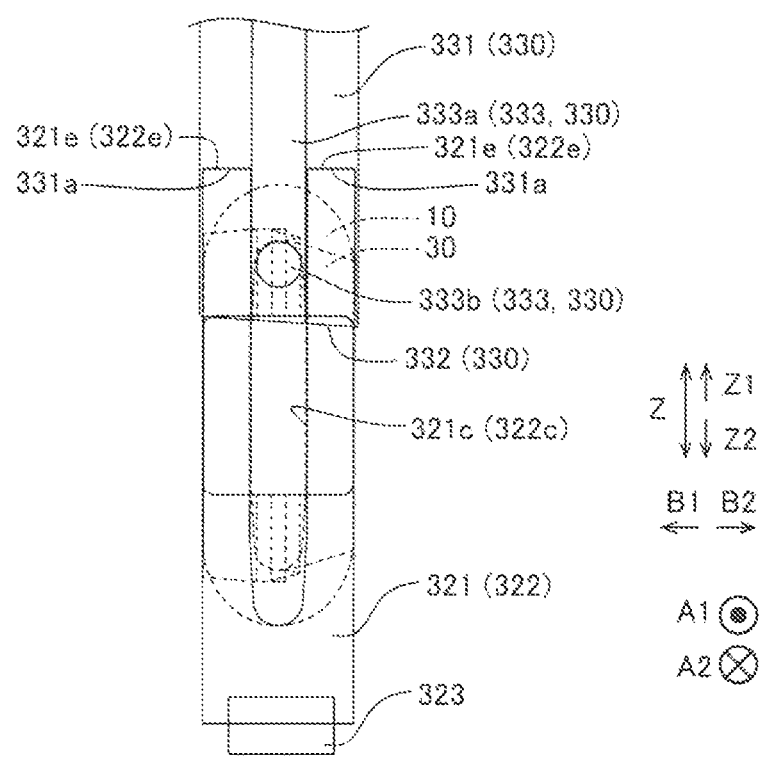
FIG. 33 is a side view of a structure of a first coil placer according to the second embodiment.

As illustrated in FIG. 33, the manufacturing apparatus 300 includes a first coil placer 330 to place the radially outer slot-housed portions 11a in the slots 21. In the present embodiment, the first coil placer 330 is structured such that the radially outer slot-housed portions 11a of the coils 10 having the coil retaining jigs 320 attached thereto are placed in in the slots 21. Specifically, the first coil placer 330 of the manufacturing apparatus 300 includes jig pressing members 331, pressing position restricting members 332, and coil position fixing jigs 333.

Each jig pressing member 331 is structured such that, with an end 331a of each jig pressing member 331 (which faces in the direction Z2) in contact with the ends 321e and 322e of the associated coil retaining jig 320, each jig pressing member 331 presses the associated coil retaining jig 320 in the direction Z2 upon application of a pressing force to each jig pressing member 331 in the direction Z2 by a driving device (not illustrated). The first coil placer 330 is thus structured such that the radially outer slot-housed portions 11a of the coils 10 having the coil retaining jigs 320 attached thereto are inserted into the slots 21 in the axial direction.

Figure 34:
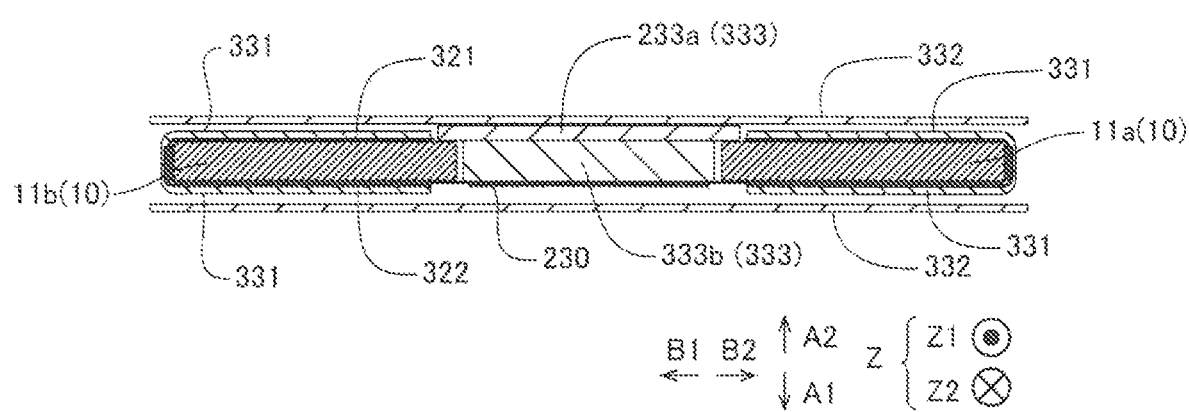
FIG. 34 is a cross-sectional view of a structure of the first coil placer according to the second embodiment.
Figure 35A:
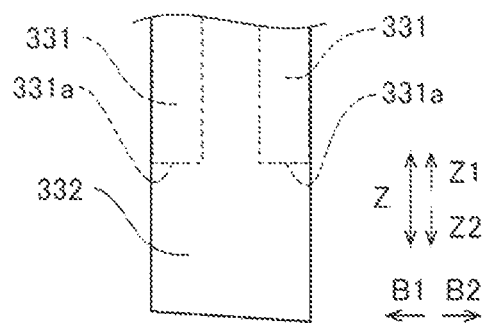
FIG. 35 is diagrams each illustrating an arrangement of a jig pressing member and a pressing position restricting member of the first coil placer according to the second embodiment, FIG. 35 A is the diagram as viewed in a circumferential direction.
FIG. 35B is the diagram as viewed in a radial direction.
Figure 35B:
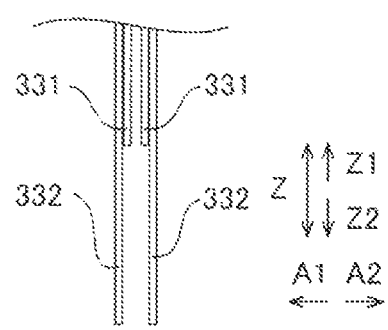

As illustrated in FIGS. 34, 35A, and 35B, each pressing position restricting member 332 is structured such that each pressing position restricting member 332 is disposed outward of the associated jig pressing member 331 in the circumferential direction and moved together with the associated jig pressing member 331. The first coil placer 330 is structured such that each pressing position restricting member 332, which moves together with the associated jig pressing member 331, comes into contact with the end face 20a (see FIG. 9) of the stator core 220 so as to restrict axial movement of the associated jig pressing member 331, thus restricting the axial position of the associated radially outer slot-housed portion 11a in the slot 21.

Figure 36A:
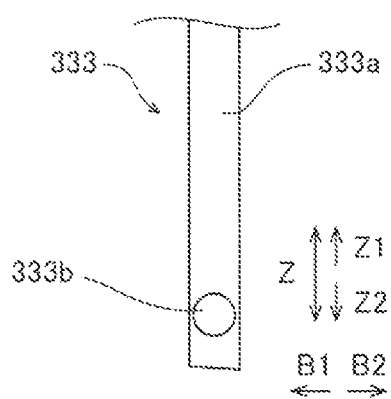
FIG. 36A is the diagram as viewed in the circumferential direction.
Figure 36B:
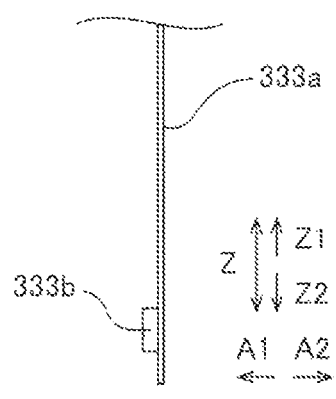
FIG. 36B is the diagram as viewed in the radial direction.

As illustrated in FIGS. 33 and 34, each coil position fixing jig 333 is structured to retain the winding inner side of the associated coil 10. Specifically, as illustrated in FIGS. 36A and 36B, each coil position fixing jig 333 includes: an axially extending plate-shaped portion 333a; and a protrusion 333b connected to the plate-shaped portion 333a and protruded in the circumferential direction (i.e., the direction A1). Each protrusion 333b is formed into a cylindrical shape protruding in the direction A1. In the manufacturing apparatus 300, each protrusion 333b is disposed such that each protrusion 333b abuts against (is caught on) a lateral surface of the winding inner side of the associated coil 10. Accordingly, each coil position fixing jig 333 is structured to allow the associated coil retaining jig 320 to move relative to the stator core 220 in the direction Z2, with the axial position of the associated coil 10 fixed, and thus the associated coil retaining jig 320 is removable, with the coil 10 remaining in the associated slot 21.

Structure of Fixture Cutting Device

Figure 37:
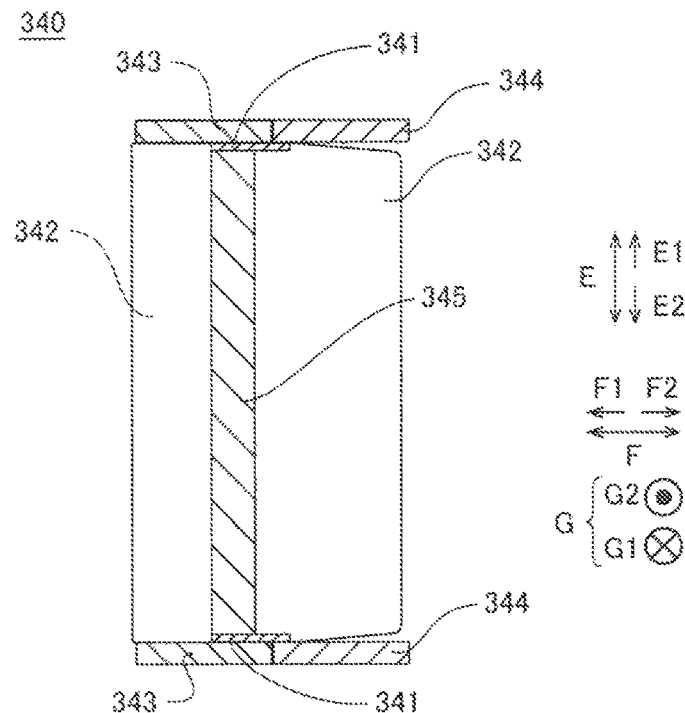
FIG. 37 is a cross-sectional view of a structure of a fixture cutting device according to the second embodiment taken along the line 400-400 in FIG. 21 and as viewed in the direction G1.
Figure 38:
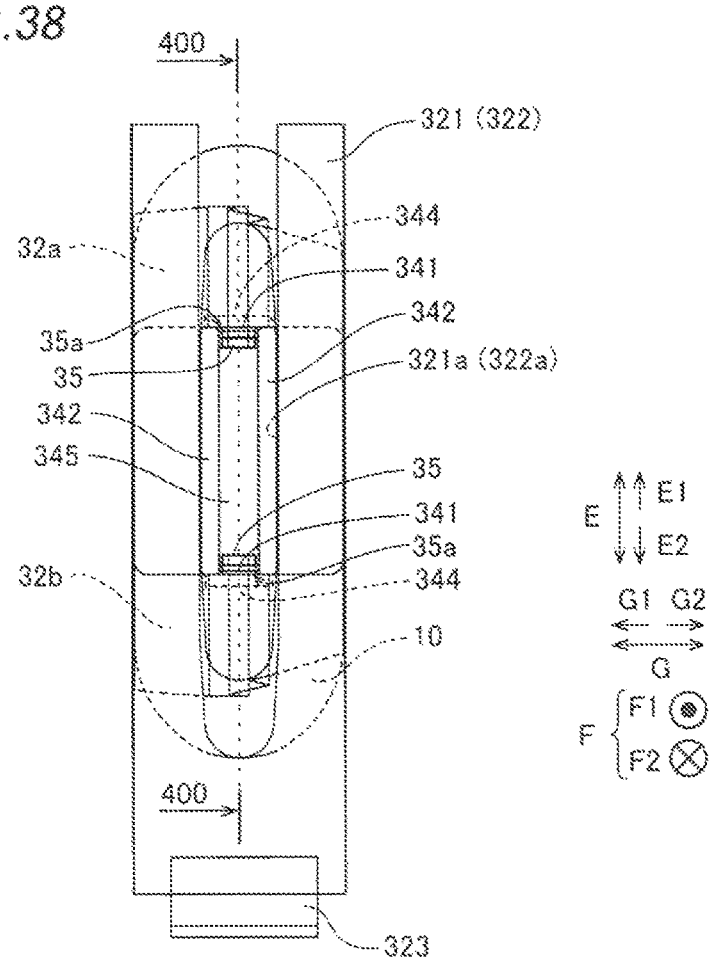
FIG. 38 is a diagram illustrating a structure of the fixture cutting device according to the second embodiment as viewed in the direction F2.

As illustrated in FIGS. 37 and 38, the manufacturing apparatus 300 includes a fixture cutting device 340 to cut off the fixtures 35 of the insulating sheet 230. The fixture cutting device 340 includes cutters 341, coil protectors 342, clamps 343, receivers 344, and a chip discharger 345. Each cutter 341 is an example of a "cutting jig" in the claims.

As illustrated in FIG. 37, each cutter 341 is provided on an associated one of ends of the chip discharger 345 facing in the direction E. Each cutter 341 is disposed to protrude in the direction F2 from the chip discharger 345. As illustrated in FIG. 38, one of the two cutters 341 is disposed to overlap with a boundary region 35a between the associated fixture 35 of the insulating sheet 230 and the first coil end portion insulator 32a as viewed in the direction F2. The other one of the two cutters 341 is disposed to overlap with a boundary region 35a between the associated fixture 35 and the second coil end portion insulator 32b as viewed in the direction F2. Accordingly, each cutter 341 is able to cut off the associated fixture 35 from the insulating sheet 230 by passing through the boundary region 35a between the associated fixture 35 of the insulating sheet 30 and the first coil end portion insulator 32a (the second coil end portion insulator 32b) in the direction F2.

On the winding inner side of the coil 10, the coil protectors 342 are disposed between the cutters 341 and the coil 10 in the direction G The coil protectors 342 are thus able to restrict movement (deformation) of the coil 10 to the winding inner side when the cutters 341 cut off the fixtures 35.

On the winding inner side of the coil 10, the clamps 343 are each disposed on an associated one of ends of each coil protector 342 facing in the direction E. As illustrated in FIG. 37, the clamps 343 are structured to move together with the cutters 341, the coil protectors 342, and the chip discharger 345 in the direction F2. The clamps 343 may be structured to move together with the cutters 341 and the chip discharger 345 in the direction F2 after the coil protectors 342 have moved in the direction F2.

As illustrated in FIG. 38, on the winding inner side of the coil 10, the receivers 344 are each disposed on an associated one of the ends of each coil protector 342 facing in the direction E. As illustrated in FIG. 37, the receivers 344 are disposed in the direction F2 relative to the clamps 343. Each receiver 344 is structured to abut against the associated clamp 343 through the first coil end portion insulator 32a (the second coil end portion insulator 32b) upon movement of the clamps 343, the cutters 341, the coil protectors 342, and the chip discharger 345 in the direction F2, thus restricting movement of the associated clamp 343 in the direction F2. Accordingly, when the cutters 341 cut off the fixtures 35, the vicinity of the boundary region 35a between one of the fixtures 35 and the first coil end portion insulator 32a (which is located in the direction E1) is sandwiched between one of the clamps 343 and the associated receiver 344, and the vicinity of the boundary region 35a between the other fixture 35 and the second coil end portion insulator 32b (which is located in the direction E2) is sandwiched between the other clamp 343 and the associated receiver 344.

The chip discharger 345 is structured to move together with the cutters 341 relative to the clamps 343 and the coil protectors 342 in the direction F2, with the clamps 343 in abutment with the receivers 344. The chip discharger 345 is disposed between the two cutters 341 in the direction E. The fixtures 35 that have been cut off are thus pushed out in the direction F2 by the chip discharger 345. In the second embodiment, each cutter 341 extends in a direction intersecting the associated fixture 35 (i.e., in the direction F) and is structured to pass through the boundary region 35a between the associated fixture 35 and the folded portions 31, thus cutting off the associated fixture 35.

Structure of Coil Deformer

Figure 39:
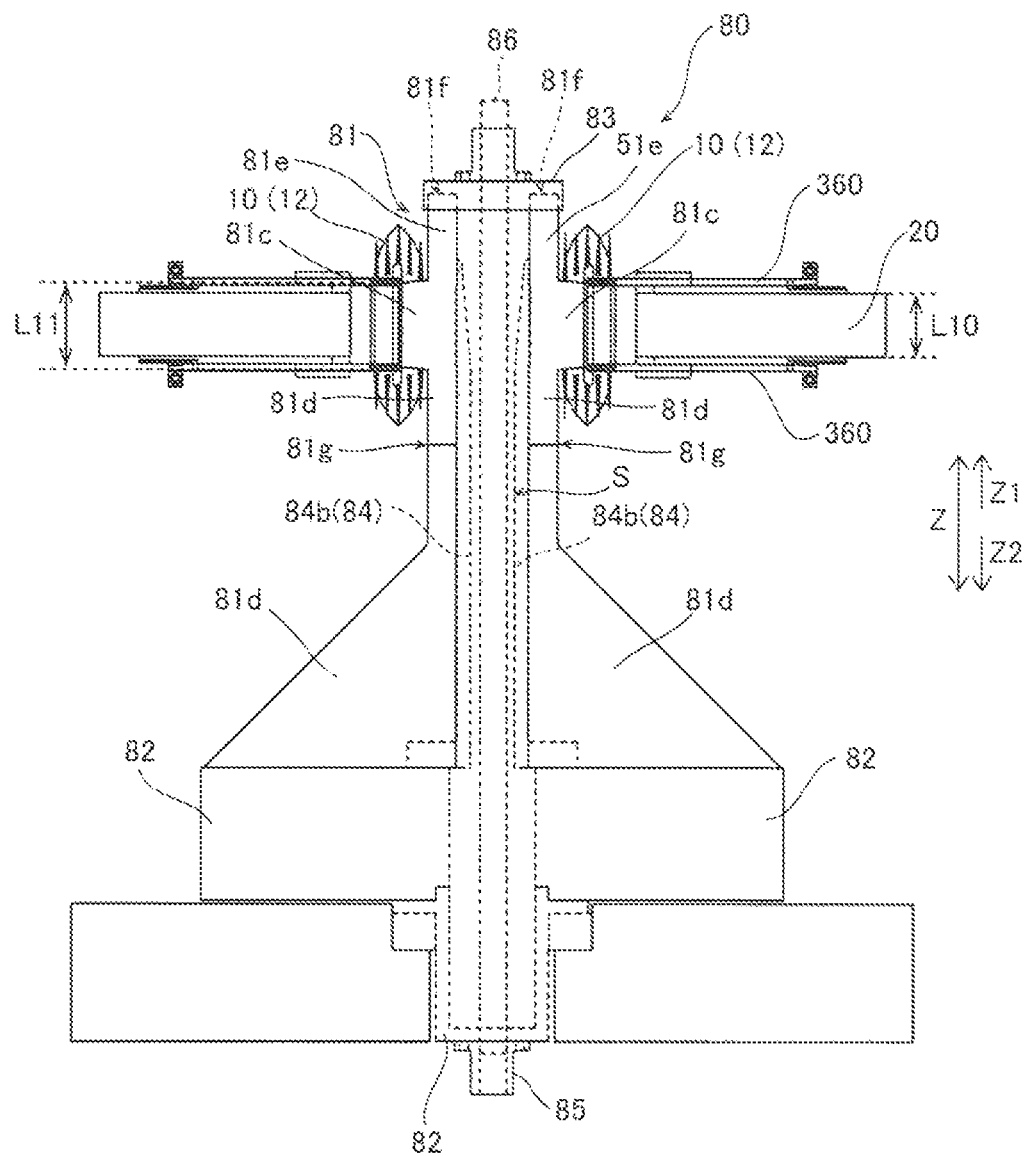
FIG. 39 is a side view of a stator manufacturing apparatus according to the second embodiment to which an upper coupler is attached.

As illustrated in FIG. 39, the manufacturing apparatus 300 for the stator 200 includes a coil deformer 80. The coil deformer 80 includes a plurality of coil guide jigs 81, a lower rotative driving device 82, an upper coupler 83, a coil pressing device 84 (see FIGS. 39 and 40), a lower coupler 85, and a shaft 86. Each coil guide jig 81 is an example of a "circumferential pressing jig" in the claims. The coil pressing device 84 is an example of a "radial pressing jig" in the claims.

Figure 41:
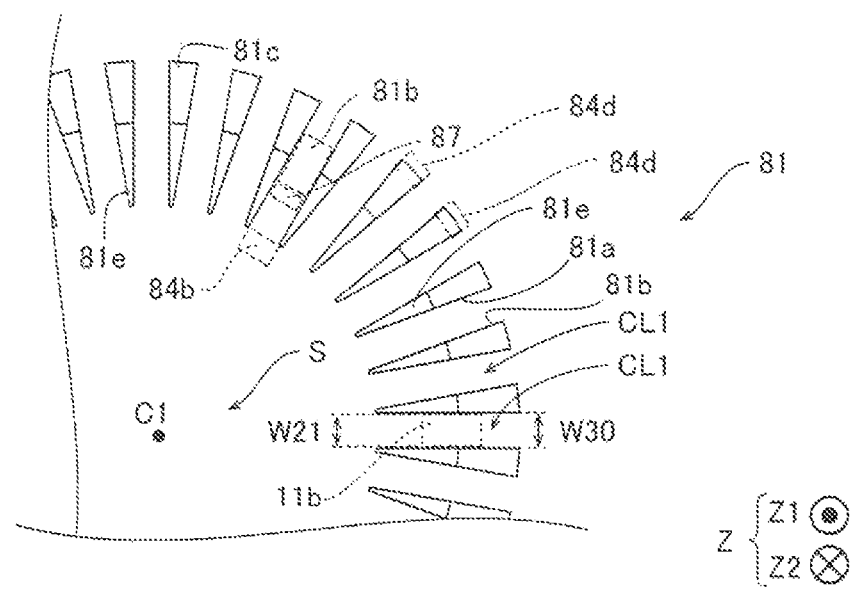
FIG. 41 is a partial plan view illustrating coil guide jigs according to the second embodiment.

As illustrated in FIG. 41, the coil guide jigs 81 (the number of which is 48 in the present embodiment) are provided independently such that the coil guide jigs 81 are adjacent to each other in the circumferential direction. The coil guide jigs 81 each have a substantially triangular shape or wedge shape tapered radially inward as viewed in the direction Z1. The coil guide jigs 81 are equiangularly spaced in the circumferential direction such that clearances CL1 are created therebetween. A width W30 of each clearance CL1 is larger than the width W21 of each radially inner slot-housed portion 11b. The width W30 of each clearance CL1 is substantially constant in the radial direction. Each clearance CL1 thus allows the associated radially inner slot-housed portion 11b to move between a first side and a second side in the radial direction of the clearance CL1. In other words, openings that allow the associated radially inner slot-housed portion 11b to pass therethrough are defined on both sides in the radial direction of each clearance CL1. As used herein, the term "width of each clearance CL1" refers to a distance between an end face 81a of one of the coil guide jigs 81 that faces in the circumferential direction and an end face 81b of the other coil guide jig 81 adjacent thereto that faces the end face 81a.

A space S is defined radially inward of the coil guide jigs 81. In the space S, an insert 84a of the coil pressing device 84 is movable in the central axis direction.

As illustrated in FIG. 39, the coil guide jigs 81 each include: a guide body 81c substantially rectangular in a cross section taken in the radial direction; a lower connection 81d protruded from the guide body 81c in the direction Z2 and connected to the lower rotative driving device 82 provided below the coil guide jigs 81 (i.e., located in the direction Z2 relative to the coil guide jigs 81); and an upper connection 81e protruded from the guide body 81c in the direction Z1 and connected to the upper coupler 83. The guide body 81c, the lower connection 81d, and the upper connection 81e are integral with each other. The guide body 81c has a length L11 in the central axis direction.

The shaft 86 is provided to extend in the central axis direction (i.e., the direction Z) such that the shaft 86 passes through both of the lower rotative driving device 82 and the upper coupler 83. The shaft 86 is provided to extend in the central axis direction (i.e., the direction Z) through the center of a circle formed by the circumferentially provided coil guide jigs 81.

The shaft 86 is structured to transmit a rotative driving force from the lower rotative driving device 82 to the upper coupler 83. The structure of the upper coupler 83 will be described in detail below.

Figure 42:
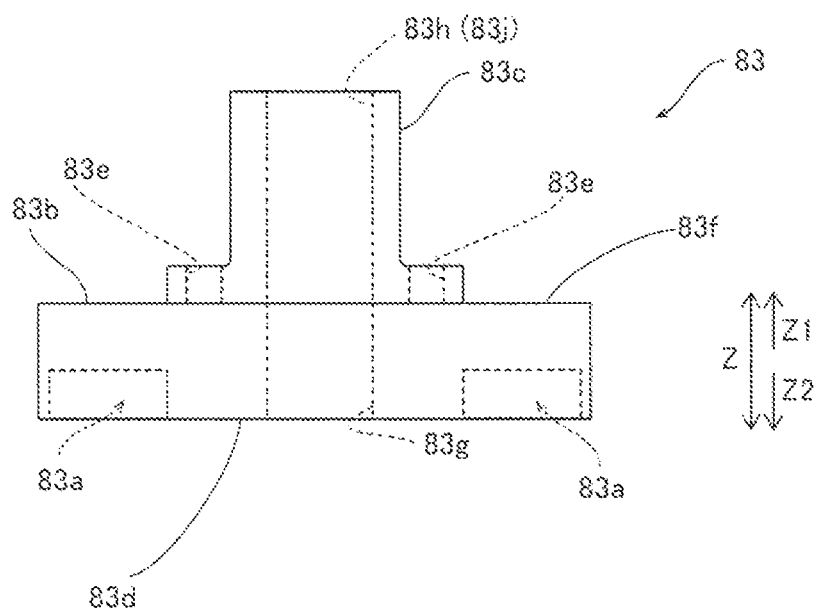
FIG. 42 is a side view of the upper coupler according to the second embodiment.
Figure 43:
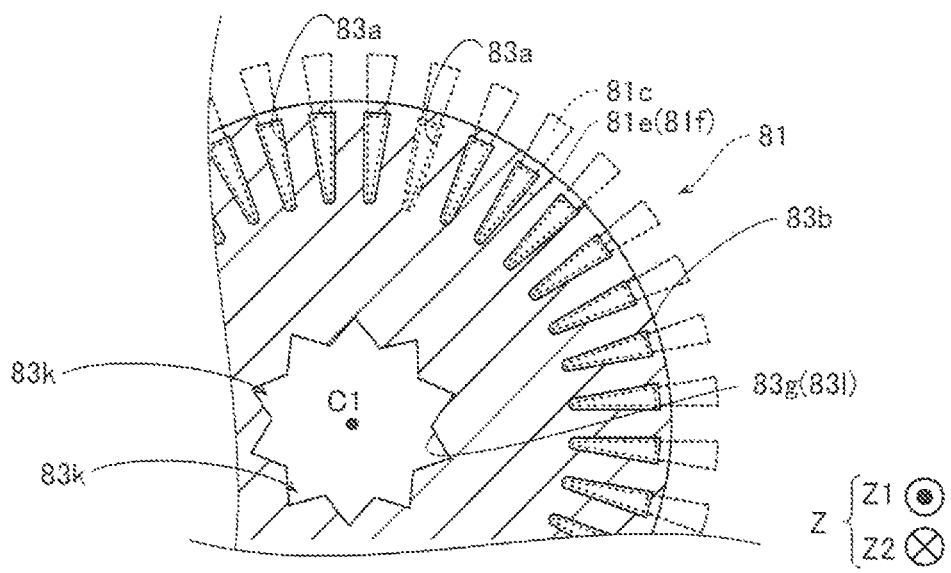
FIG. 43 is a partial planar cross-sectional view of the upper coupler according to the second embodiment.

As illustrated in FIG. 42, the upper coupler 83 is attached to upper ends 81f (see FIG. 39) of the coil guide jigs 81 (i.e., the upper connections 81e) when the coils 10 undergo deformation. Specifically, the upper coupler 83 includes recesses 83a into which the upper ends 81f of the coil guide jigs 81 are fitted, with the upper coupler 83 attached to the upper ends 81f of the coil guide jigs 81. The upper coupler 83 further includes a plate-shaped flange member 83b and a cap member 83c attached to the flange member 83b. As illustrated in FIG. 43, the recesses 83a are provided on a lower surface 83d (see FIG. 42) of the flange member 83b such that the recesses 83a are circumferentially adjacent to each other.

As illustrated in FIG. 42, the cap member 83c is provided with a plurality of threaded holes 83e into which screw members (not illustrated) to fasten the cap member 83c and the flange member 83b together are to be inserted. The cap member 83c is fastened to an upper surface 83f of the flange member 83b (i.e., a surface of the flange member 83b facing in the direction Z1).

The flange member 83b and the cap member 83c respectively include a through hole 83g and a through hole 83h to which the shaft 86 is fitted (see FIG. 39) such that the rotative driving force is transmittable, with the upper coupler 83 attached to the upper ends 81f of the coil guide jigs 81. The through holes 83g and 83h are provided to overlap with each other as viewed in the central axis direction.

Figure 44A:
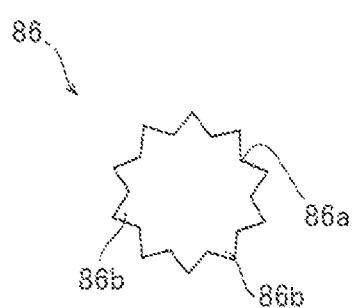
FIG. 44A is the plan view of the shaft.

As illustrated in FIG. 44A, the shaft 86 includes projections 86b provided on a circumferential surface 86a of the shaft 86. The projections 86b are provided circumferentially (such that the projections 86b are spaced equiangularly) along the circumferential surface 86a. The projections 86b each have a radially outwardly tapered shape. The projections 86b, however, may each have any other shape.

Figure 44B:
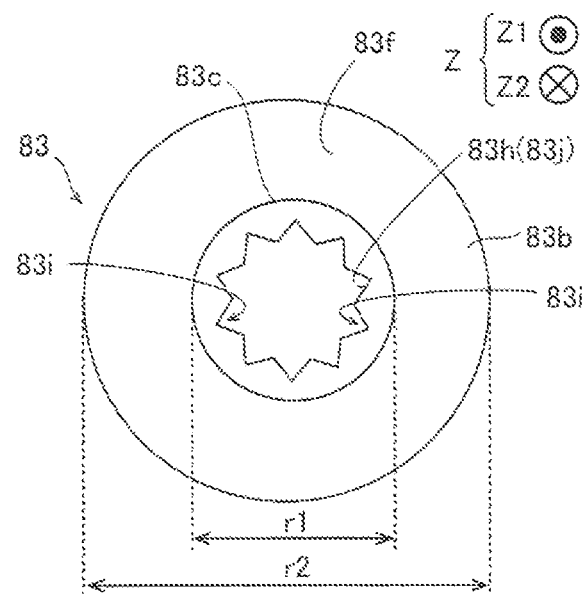
FIG. 44B is the plan view of the upper coupler.

As illustrated in FIG. 44B, the through hole 83h in the cap member 83c of the upper coupler 83 is provided with recesses 83i that are in engagement with the projections 86b of the shaft 86, with the shaft 86 fitted to the through hole 83h. The recesses 83i are provided circumferentially (such that the recesses 83i are spaced equiangularly) along a circumferential surface 83j of the through hole 83h. The recesses 83i are each provided to extend in the central axis direction (i.e., the direction Z).

The through hole 83g in the flange member 83b of the upper coupler 83 is provided with recesses 83k (see FIG. 43) that are in engagement with the projections 86b of the shaft 86, with the shaft 86 fitted to the through hole 83g. The recesses 83k are provided circumferentially along a circumferential surface 83l of the through hole 83h (see FIG. 43). The recesses 83k are each provided to extend in the central axis direction (i.e., the direction Z).

Engagement of the projections 86b with the recesses 83i and the recesses 83k transmits a rotative force of the shaft 86 to the upper coupler 83 (i.e., the cap member 83c) so as to rotate the upper coupler 83. Accordingly, upon rotation of each of the upper coupler 83 and the lower rotative driving device 82, each coil guide jig 81 receives, on its ends facing in an up-down direction, the rotative driving force. This results in rotation of the coil guide jigs 81. Similarly to the projections 86b, the recesses 83i and the recesses 83k each have a radially outwardly tapered shape. The cap member 83c is fastened to the flange member 83b such that the recesses 83i overlap with the recesses 83k as viewed in the central axis direction. For the sake of simplicity, the threaded holes 83e are not illustrated in FIG. 44B.

The cap member 83c and the flange member 83b each have a circular shape as viewed from the direction Z1. A diameter r1 (see FIG. 44B) of the cap member 83c and a diameter r2 (see FIG. 44B) of the flange member 83b are each smaller than an inner peripheral diameter r3 (see FIG. 1) of the stator core 220 having an annular shape. With the upper coupler 83 attached to the coil guide jigs 81, an entirety of the upper coupler 83 is surrounded by the stator core 220 as viewed from the direction Z1.

Figure 45:
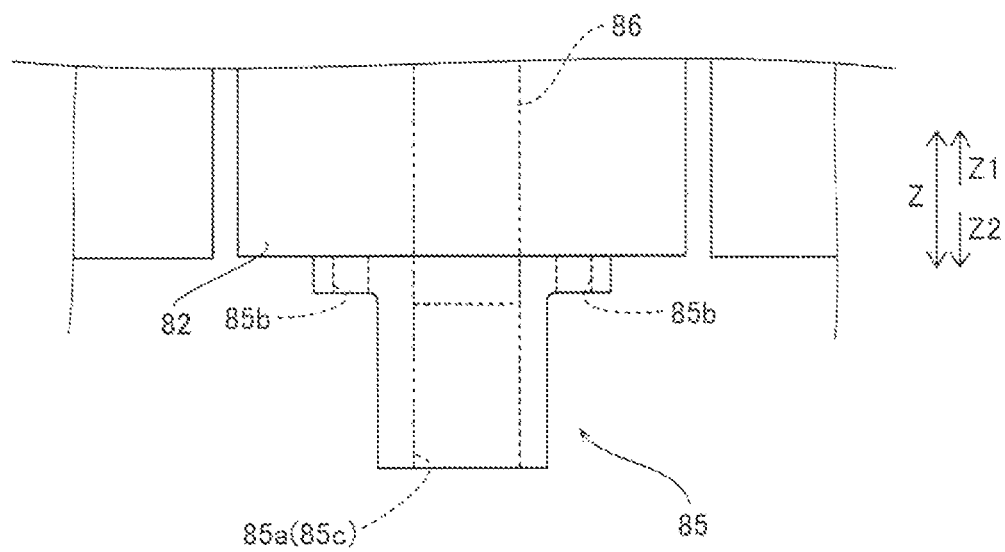
FIG. 45 is a side view of a lower coupler according to the second embodiment.

As illustrated in FIG. 45, the lower coupler 85 is attached to the lower rotative driving device 82 when the coils 10 undergo deformation. The lower coupler 85 is structured such that the rotative driving force of the lower rotative driving device 82 is transmitted to the upper coupler 83 through the shaft 86 when the coils 10 undergo deformation.

Specifically, the lower coupler 85 includes a through hole 85a through which the shaft 86 is to be inserted when the coils 10 undergo deformation. The lower coupler 85 further includes a plurality of threaded holes 85b to be used to fasten the lower coupler 85 to the lower rotative driving device 82. Inserting screw members (not illustrated) into the threaded holes 85b fastens the lower coupler 85 to the lower rotative driving device 82.

Figure 46:
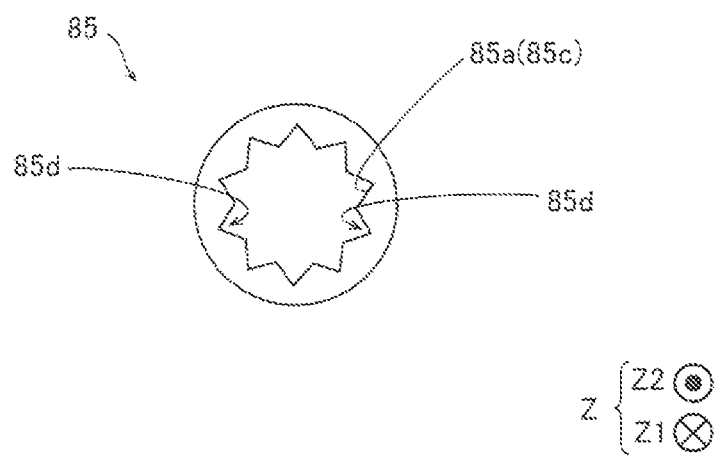
FIG. 46 is a plan view of the lower coupler according to the second embodiment.
Figure 47:
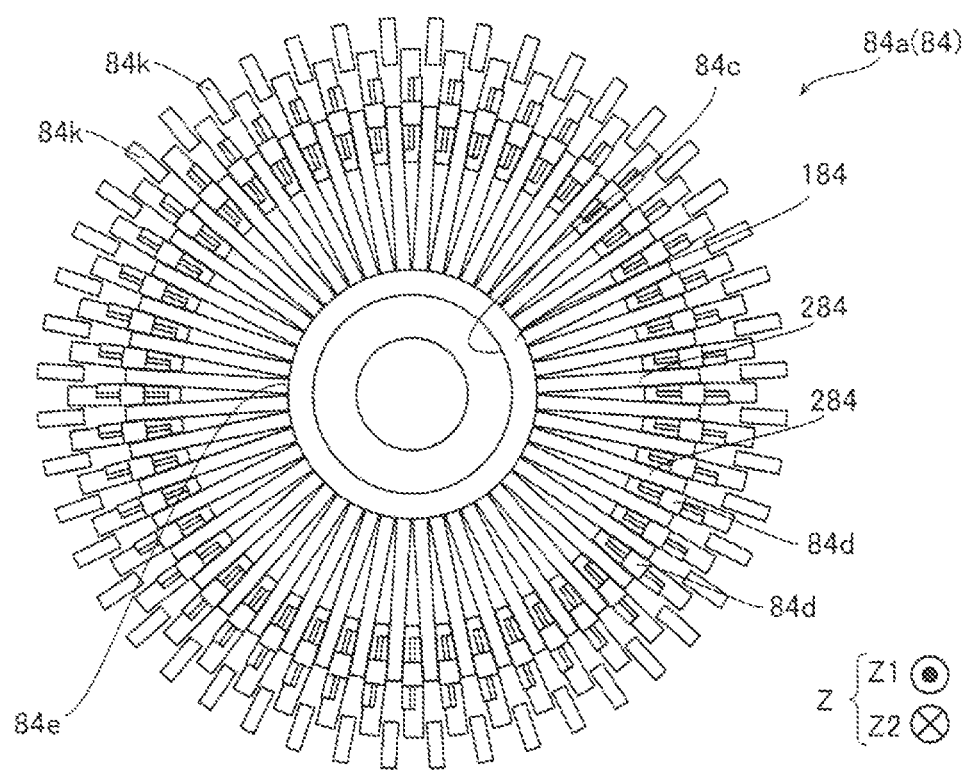
FIG. 47 is a plan view of the insert according to the second embodiment.

As illustrated in FIG. 46, a circumferential surface 85c of the through hole 85a in the lower coupler 85 is provided with a plurality of recesses 85d extending in the central axis direction (i.e., the direction Z). The recesses 85d are provided circumferentially (such that the recesses 85d are spaced equiangularly). Engagement of the projections 86b (see FIG. 44A) of the shaft 86 with the recesses 85d transmits the rotative driving force of the lower rotative driving device 82 to the shaft 86 through the lower coupler

85. Accordingly, the rotative driving force transmitted to the shaft 86 through the lower coupler 85 rotates the upper coupler 83.

Figure 40:
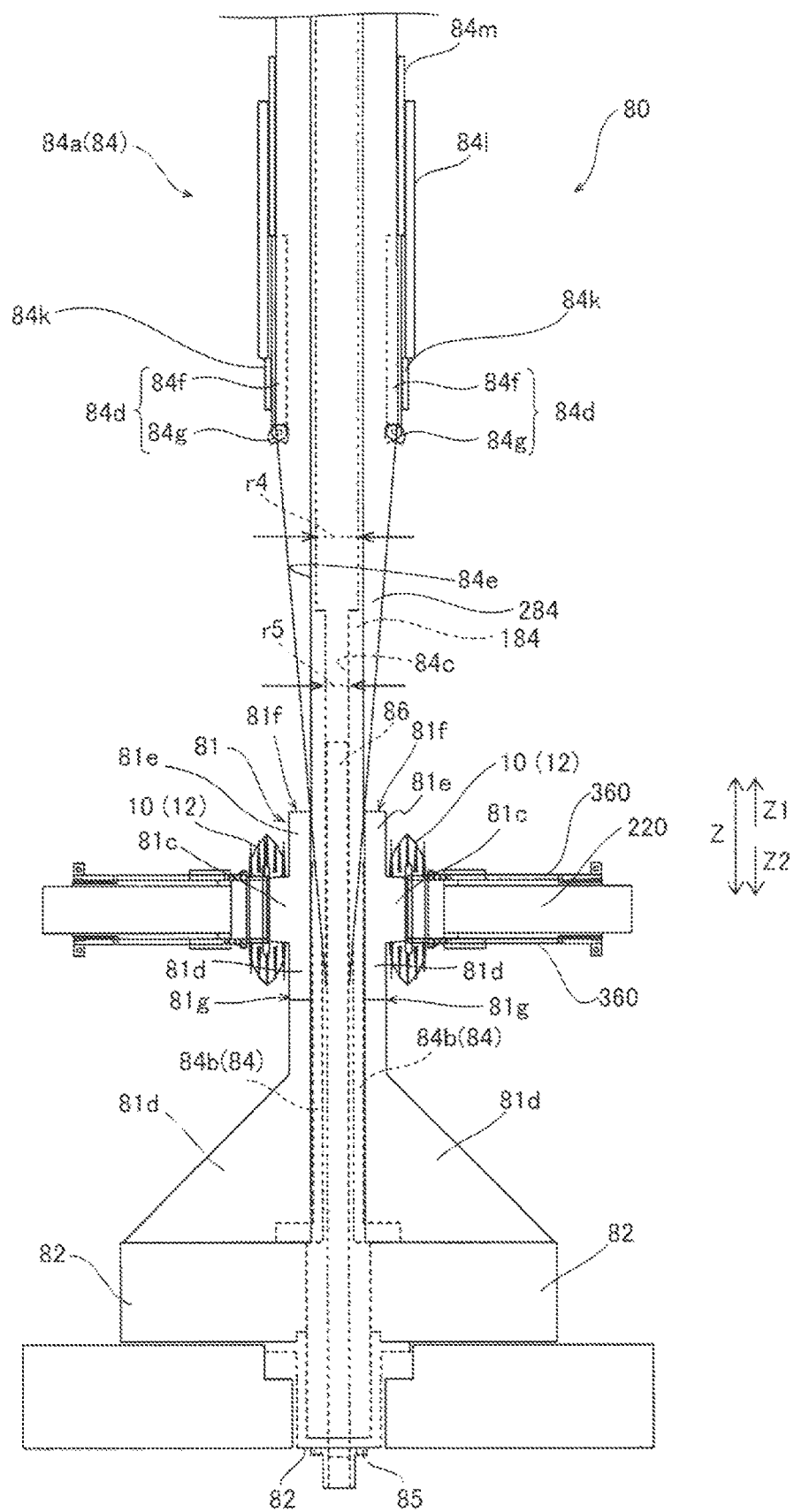
FIG. 40 is a side view of the stator manufacturing apparatus according to the second embodiment into which an insert is inserted.

As illustrated in FIG. 40, the coil pressing device 84 includes the insert 84a having a tapered shape tapered in the direction of insertion (i.e., the direction Z2). A tip of the insert 84a located in the direction of insertion (i.e., the direction Z2) is formed into a tapered shape. Specifically, the insert 84a includes: a cylindrical portion 184 having a cylindrical shape; and a plurality of plate-shaped blades 284 (the number of which is 48 in the present embodiment) connected to the cylindrical portion 184 so as to circumferentially surround the cylindrical portion 184 and tapered in the direction of insertion. The blades 284 are provided to extend radially (see FIG. 47) from the cylindrical portion 184 as viewed in the central axis direction. The blades 284 are provided to overlap with the clearances CL1 (see FIG. 72) between the coil guide jigs 81 as viewed in the central axis direction (i.e., the direction Z1).

The insert 84a is moved in the central axis direction (i.e., the direction Z2) and thus inserted into the stator core 220. During insertion, the insert 84a presses each radially inner slot-housed portion 11b from the slot 21, in which the associated radially outer slot-housed portion 11a is placed, to the slot 21 located away therefrom in the circumferential direction.

Specifically, the coil pressing device 84 includes a plurality of pressers 84b (the number of which is 48 in the present embodiment) disposed radially inward of the coil guide jigs 81. The pressers 84b are each disposed radially inward of the slots 21 different from each other. Movement of the insert 84a in the direction Z2 causes the insert 84a (the blades 284) to press the pressers 84b radially outward, so that the pressers 84b enter the clearances CL1 between the coil guide jigs 81 adjacent to each other (see FIG. 72). The radially inner slot-housed portions 11b are thus pressed from the radially inward side to the radially outward side by the pressers 84b.

The insert 84a includes an insertion hole 84c which extends in the central axis direction (i.e., the direction Z) and into which the shaft 86 is to be inserted when the insert 84a is inserted into the stator core 220. A diameter r4 of a portion of the insertion hole 84c located opposite to the direction of insertion (i.e., located in the direction Z1) is larger than a diameter r5 of a portion of the insertion hole 84c located in the direction of insertion (i.e., located in the direction Z2).

Figure 48:
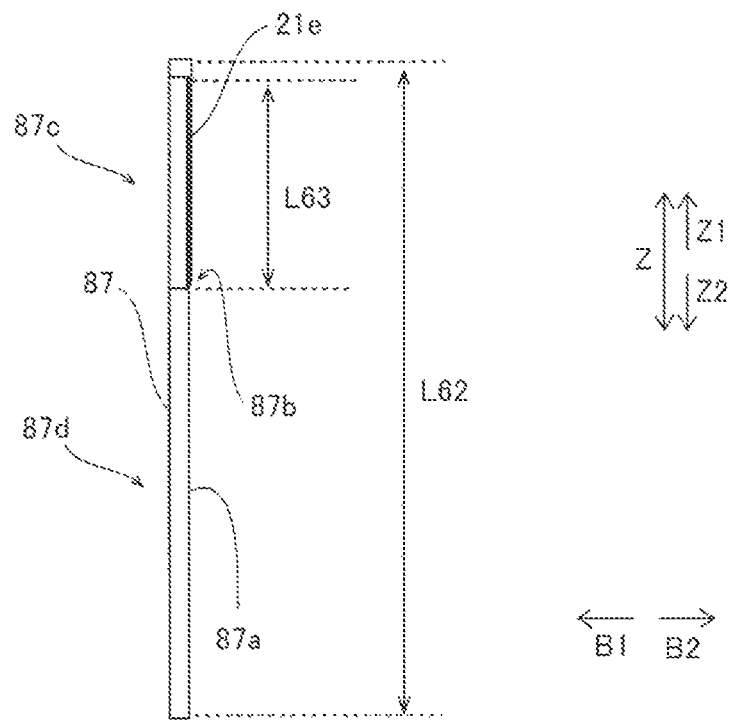
FIG. 48 is a side view of a wedge retaining member according to the second embodiment.

As illustrated in FIG. 48, the manufacturing apparatus 300 for the stator 200 includes wedge retaining members 87. Each wedge retaining member 87 retains the associated wedge member 21e. A length L62 of each wedge retaining member 87 in the central axis direction (i.e., the direction Z) is longer than a length L63 of each wedge member 21e in the central axis direction.

The length L42 of each wedge retaining member 87 in the central axis direction (i.e., the direction Z) is longer than the length L10 of the stator core 220 in the central axis direction (see FIG. 39). Thus, when the wedge retaining members 87 press the radially inner slot-housed portions 11b from the radially inward side as will be described below, the coil end portions 12 protruding from the stator core 220 in the central axis direction (i.e., the directions Z1 and Z2) are pressed and enlarged by the wedge retaining members 87.

Each wedge member 21e is disposed on a step 87b defined on a radially outward surface 87a of the associated wedge retaining member 87. Because each wedge member 21e is disposed on the step 87b, each wedge member 21e is provided on a portion 87c of the associated wedge retaining member 87 located above the center of the associated wedge retaining member 87 in the central axis direction (i.e., the direction Z). The portion 87c is located in the direction Z1 relative to the center of the wedge retaining member 87 in the central axis direction (i.e., the direction Z). A portion of each wedge retaining member 587 located below the portion 87c (i.e., located in the direction Z2 relative to the portion 87c) will hereinafter be referred to as a "portion 87d".

The portion 87d is located in the direction of movement of the wedge retaining member 87 (i.e., the direction Z2) relative to the portion 87c when the wedge member 21e is placed in the opening 21a.

Figure 49:
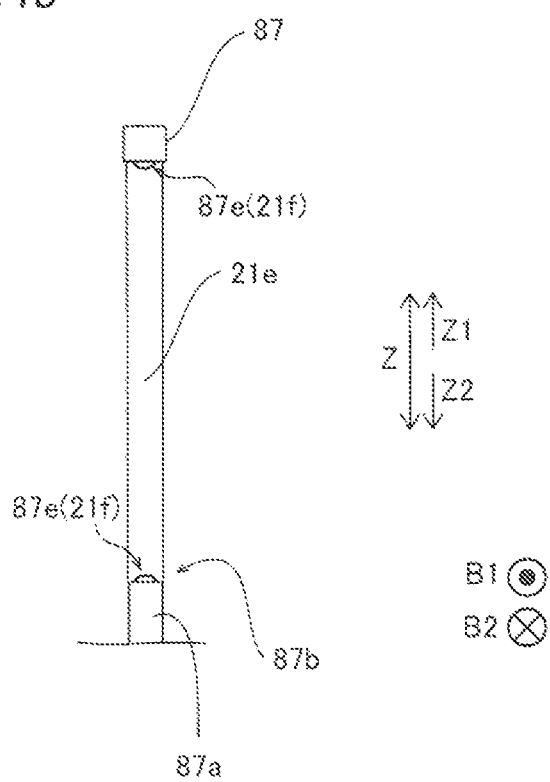
FIG. 49 is a front view of the wedge retaining member according to the second embodiment.

As illustrated in FIG. 49, with the wedge member 21e disposed on the step 87b, recesses 21f defined in the wedge member 21e are in engagement with projections 87e provided on the wedge retaining member 87, thus temporarily locking the wedge member 21e. The recesses 21f and the projections 87e are provided on both sides of the wedge member 21e in the central axis direction.

Each wedge retaining member 87 is disposed radially inward of the associated radially inner slot-housed portion 11b as viewed in the central axis direction (i.e., the direction Z). Specifically, each wedge retaining member 87 is disposed such that as viewed in the central axis direction, each wedge retaining member 87 is sandwiched between the associated radially inner slot-housed portion 11b (slot 21) and the associated presser 84b in the radial direction (see FIG. 41). More specifically, the wedge retaining members 87 are disposed (in the clearances CL1) such that before the pressers 84b are pressed by the insert 84a, each wedge retaining member 87 is sandwiched between the circumferentially adjacent guide bodies 81c on a step 81g (see FIG. 39) defined on the lower connections 81d of the coil guide jigs 81. The wedge retaining members 87 (the number of which is 48 in the present embodiment) are each provided for an associated one of the radially inner slot-housed portions 11b (i.e., for an associated one of the clearances CL1).

As illustrated in FIG. 40, the manufacturing apparatus 300 for the stator 200 includes toggle mechanisms 84d provided adjacent to the openings 21a (see FIG. 24) of the slots 21 in the circumferential direction as viewed in the central axis direction (i.e., the direction Z). The toggle mechanisms 84d (the number of which is 48 in the present embodiment) are each provided for an associated one of the coil guide jigs 81. Specifically, each toggle mechanism 84d is provided to overlap with a radially outward end of the guide body 81c of the associated coil guide jig 81 as viewed in the central axis direction (see FIG. 41). As viewed in the central axis direction, each toggle mechanism 84d is provided at a location where each toggle mechanism 84d is sandwiched between the blades 284 adjacent thereto in the circumferential direction (see FIG. 47).

Each of the toggle mechanisms 84d is attached to the insert 84a. The toggle mechanisms 84d are provided along an outer peripheral surface 84e of the insert 84a (the cylindrical portion 184). In other words, the toggle mechanisms 84d are provided to circumferentially surround the insert 84a.

Figure 50:
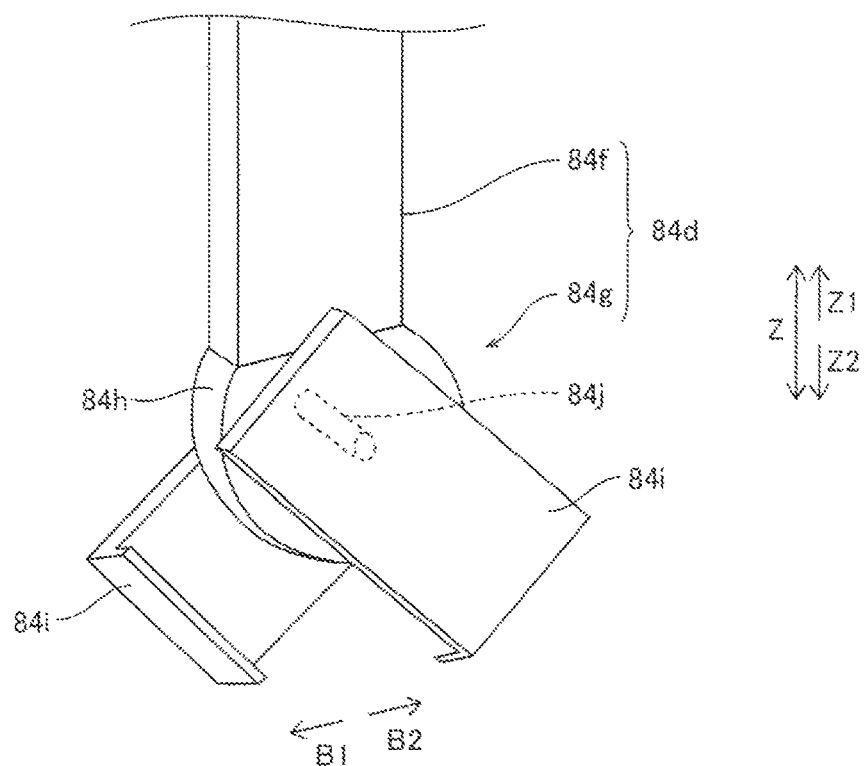
FIG. 50 is a perspective view of a toggle mechanism according to the second embodiment.

As illustrated in FIG. 50, each of the toggle mechanisms 84d is provided with: a plate-shaped portion 84f extending in the central axis direction (i.e., the direction Z); and a toggle 84g attached to an end of the plate-shaped portion 84f located adjacent to the associated coil guide jig 81 (i.e., located in the direction Z2).

Each toggle 84g includes: a first portion 84h attached to the plate-shaped portion 84f; and a pair of second portions 84i provided to sandwich the first portion 54h in the circumferential direction. The pair of second portions 84i is rotatable around a pin 84j passing through the pair of second portions 84i and the first portion 84h. Although not illustrated, the first portion 84h and the pair of second portions 84i are each provided with a through hole through which the pin 84j passes.

Figure 51:
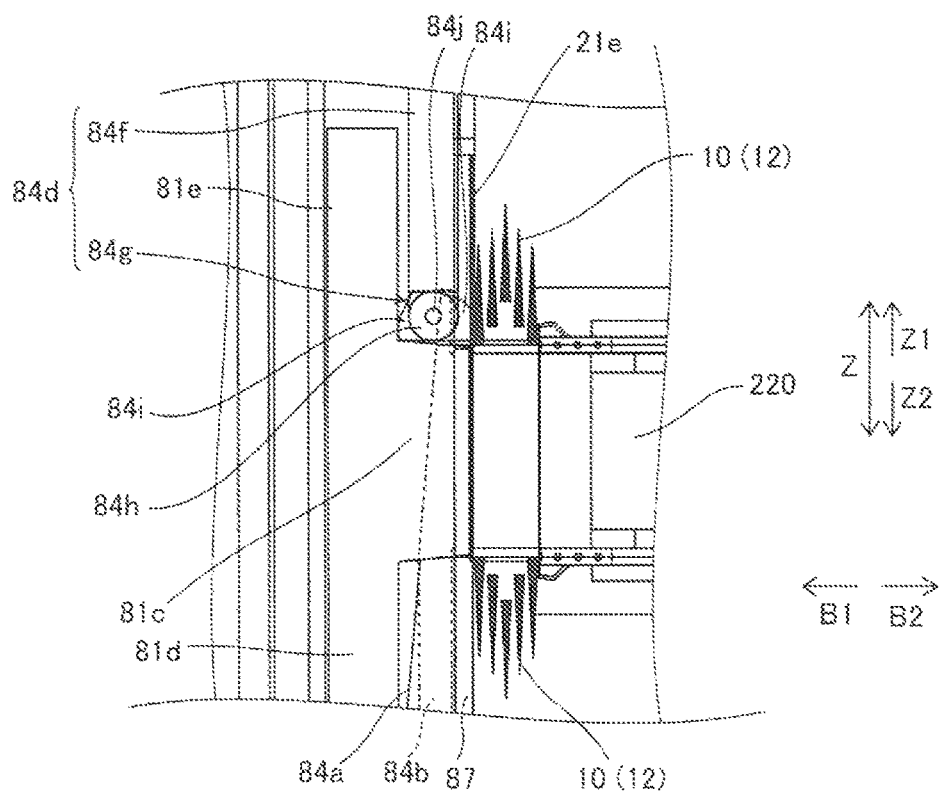
FIG. 51 is a side view of the stator manufacturing apparatus according to the second embodiment, with coil end portions pressed by the toggle mechanisms.

Thus, the pair of second portions 84i moves from a position located in the direction Z1 and abuts against the associated guide body 81c, so that the second portions 84i rotate in opposite directions (i.e., in clockwise and counterclockwise directions as viewed in the circumferential direction). Accordingly, the pair of second portions 84i, which is fixed such that the second portions 84i intersect with each other as viewed in the circumferential direction, is pressed from below (i.e., from the direction Z2) by the associated guide body 81c, such that the angle of intersection of the second portions 84i increases. As illustrated in FIG. 51, the coil end portions 12 protruding from the stator core 220 in the direction Z1 are thus pressed from the radially inward side to the radially outward side by an end of one of the pair of second portions 84i.

As illustrated in FIG. 40, the manufacturing apparatus 300 for the stator 200 includes wedge drivers 84k attached to the insert 84a. The wedge drivers 84k are provided along the outer peripheral surface 84e of the insert 84a (the cylindrical portion 184). The wedge drivers 84k (the number of which is 48 in the present embodiment) are each provided for an associated one of the wedge retaining members 87. Each of the wedge retaining members 87 is structured to be slidable along the outer peripheral surface 84e in the central axis direction.

The manufacturing apparatus 300 for the stator 200 includes a sleeve 841 attached to the insert 84a. The sleeve 841 is provided along the outer peripheral surface 84e of the insert 84a (the cylindrical portion 184). The sleeve 841 has a cylindrical shape so as to surround the insert 84a. The sleeve 841 is structured to slide in the central axis direction, thus pressing the wedge drivers 84k from above. Accordingly, each of the wedge drivers 84k is structured to slide together with the sleeve 841.

The manufacturing apparatus 300 for the stator 200 includes a sleeve 84m attached to the insert 84a. The sleeve 84m is provided along the outer peripheral surface 84e of the insert 84a (the cylindrical portion 184). The sleeve 84m has a cylindrical shape so as to surround the insert 84a. The sleeve 84m is structured to slide in the central axis direction, thus pressing the toggle mechanisms 84d (the plate-shaped portions 84f) from above. Accordingly, each of the toggle mechanisms 84d (the plate-shaped portions 84f) is structured to slide together with the sleeve 84m.

The insert 84a, the toggle mechanisms 84d (which slide together with the sleeve 84m), and the wedge drivers 84k (which slide together with the sleeve 841) are independently movable in the central axis direction (i.e., the direction Z). In other words, the timings of movement and moving distances of the insert 84a, the toggle mechanisms 84d (which slide together with the sleeve 84m), and the wedge drivers 84k (which slide together with the sleeve 841) may be different from each other. Because the toggle mechanisms 84d (which slide together with the sleeve 84m) and the wedge drivers 84k (which slide together with the sleeve 841) are each attached to the insert 84a, the toggle mechanisms 84d and the wedge drivers 84k move in accordance with the movement of the insert 84a while being movable independently of the movement of the insert 84a along the outer peripheral surface 84e of the insert 84a (the cylindrical portion 184).

Arrangement of Movement Restricting Jigs

As illustrated in FIGS. 52 to 60, the manufacturing apparatus 300 includes movement restricting jigs 360 to restrict radially inward movement of the radially outer slot-housed portions 11a.

Figure 52:
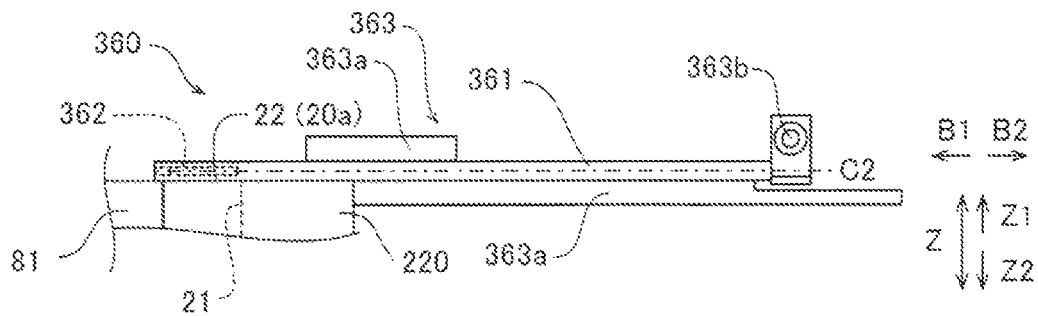
FIG. 52 is a diagram illustrating a structure of a movement restricting jig (which is in a restricting state) according to the second embodiment as viewed in the circumferential direction.

As illustrated in FIG. 52, the movement restricting jigs 360 are disposed on the end faces 20a of the teeth 22. Specifically, the movement restricting jigs 360 are disposed on the end faces 20a of the stator core 220 on both sides in the axial direction (see FIG. 22). Each movement restricting jig 360 is structured such that each movement restricting jig 360 is rotated and thus changed between a restricting state illustrated in FIG. 53 where each movement restricting jig 360 restricts radially inward movement of the associated radially outer slot-housed portion 11a and a non-restricting state illustrated in FIGS. 54 and 55 where each movement restricting jig 360 does not restrict radially inward movement of the associated radially outer slot-housed portion 11a.

Figure 53:
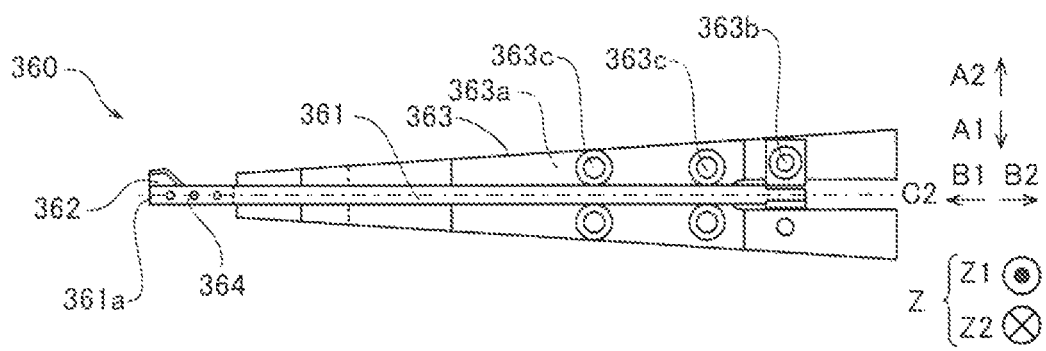
FIG. 53 is a diagram illustrating a structure of the movement restricting jig (which is in the restricting state) according to the second embodiment as viewed in the axial direction.
Figure 54:
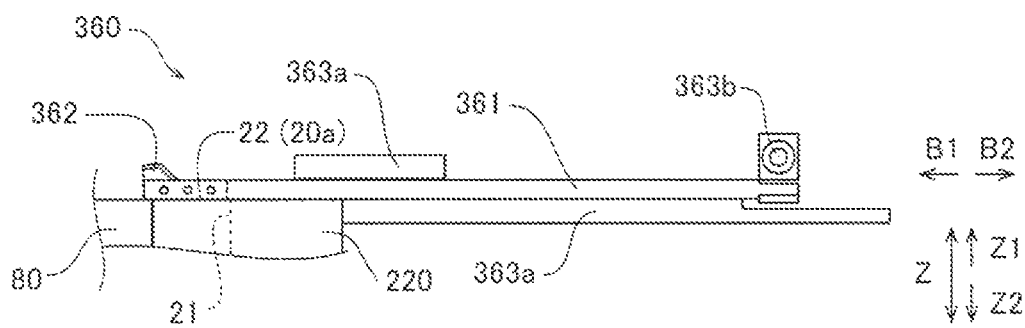
FIG. 54 is a diagram illustrating a structure of the movement restricting jig (which is in a non-restricting state) according to the second embodiment as viewed in the circumferential direction.

Specifically, each movement restricting jig 360 includes: a rod portion 361 that rotates around a rotation axis C2 (which extends in the radial direction) and extends in the radial direction of the stator core 220 (i.e., a direction B); and a restrictor 362 provided on a tip 361a of the rod portion 361 as illustrated in FIG. 53 so as to restrict radial movement of the associated radially outer slot-housed portion 11a. Each movement restricting jig 360 further includes a restricting jig body 363, fastening members 364, and rotation jigs 365 (see FIG. 60).

Each movement restricting jig 360 is structured such that rotation of the rod portion 361 changes the state of the movement restricting jig 360 between the non-restricting state where the restrictor 362 protrudes outward in the axial direction of the stator core 220 (i.e., in the direction Z1 in FIGS. 54 and 55) and the restricting state where the restrictor 362 protrudes to a first circumferential side (i.e., in the direction A2 in FIGS. 52 and 53).

Figure 57:
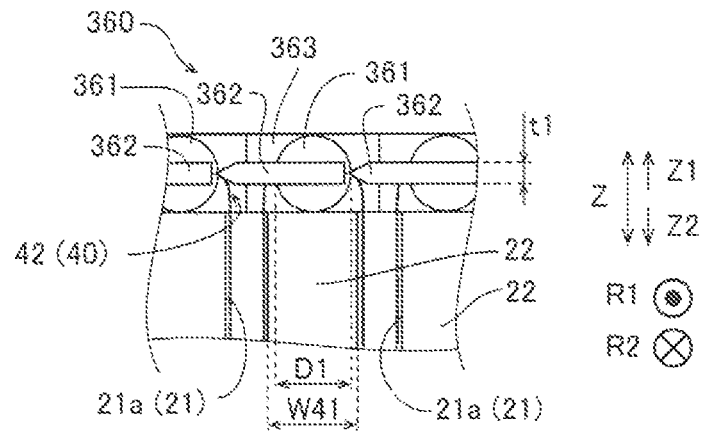
FIG. 57 is a diagram illustrating an arrangement of the movement restricting jigs (which are in the restricting state) according to the second embodiment as viewed from a radially inward side.
Figure 58:
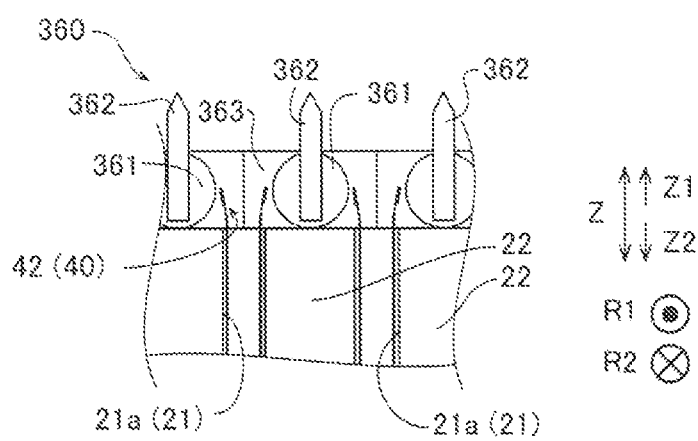
FIG. 58 is a diagram illustrating an arrangement of the movement restricting jigs (which are in the non-restricting state) according to the second embodiment as viewed from the radially inward side.

As illustrated in FIGS. 57 and 58, each rod portion 361 is formed into a columnar or cylindrical shape extending in the radial direction of the stator core 220. A diameter D1 of each rod portion 361 is equal to or smaller than a width W41 of each tooth 22 in the circumferential direction.

Figure 56:
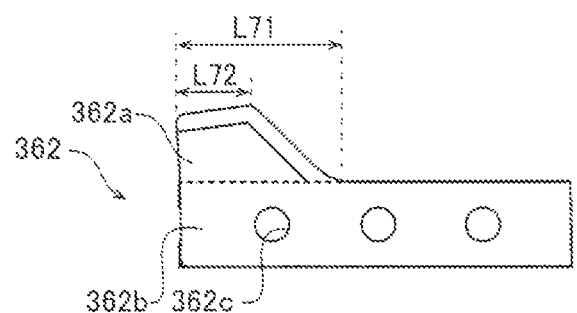
FIG. 56 is a diagram illustrating a structure of a restrictor of the movement restricting jig according to the second embodiment.

Each restrictor 362 is tapered in the direction of protrusion. A thickness t1 of each restrictor 362 (i.e., the thickness of the thickest portion of each restrictor 362) is smaller than the diameter D1 of each rod portion 361. As illustrated in FIG. 56, each restrictor 362 is formed into a flat plate shape. A length L71 of a boundary region (indicated by the dotted line in FIG. 56) between the restrictor 362 and the rod portion 361 in the radial direction is longer than a length L72 of a peripheral tip of the restrictor 362 in the radial direction. As used herein, the term "boundary region" refers to a boundary between a first portion 362a that is a portion of the restrictor 362 protruding from the rod portion 361 (i.e., an exposed portion of the restrictor 362) and a second portion 362b that is a portion of the restrictor 362 disposed inside the rod portion 361.

Each restrictor 362 is provided with a plurality of fastening holes 362c. The fastening members 364 (see FIG. 53) are fastened to the fastening holes 362c through the rod portion 361, thus fixing the rod portion 361 and the restrictor 362 to each other.

Each restricting jig body 363 includes a guide 363a, a rotator 363b, and rollers 363c. The guide 363a is structured to retain the rod portion 361 on both sides in the circumferential direction and on both sides in the axial direction such that the rod portion 361 is rotatable. Each restricting jig body 363 is structured such that the rod portion 361 is movable relative to the restricting jig body 363 in the radial direction of the stator core 220 by a driving device (not illustrated). The guide 363a has the function of guiding rotational and radial movement of the rod portion 361. Each restricting jig body 363 is structured to be radially movable relative to the stator core 220 by a driving device (not illustrated).

Figure 59A:
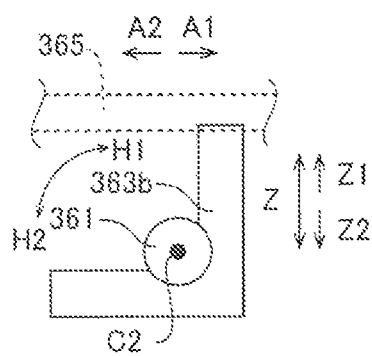
FIG. 59A is the diagram of the rotor rotated in a direction H2.
Figure 59B:
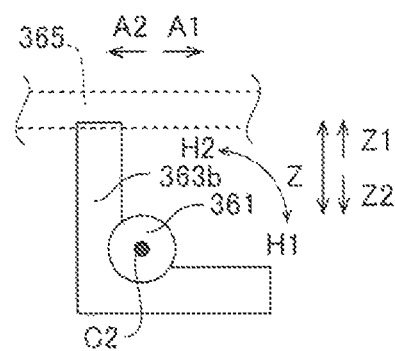
FIG. 59B is the diagram of the rotor rotated in a direction H1.

As illustrated in FIGS. 59A and 59B, each rotator 363b is substantially L-shaped as viewed in the radial direction. The rotators 363b are connected to the rotation jigs 365. Each rotator 363b is structured such that the orientation of each rotator 363b changes (rotates) in conjunction with rotation of the rotation jigs 365 (i.e., rotation of the rotation jigs 365 in the circumferential direction of the stator core 220). Each rotator 363b is fixed to the associated rod portion 361. Rotation of each rotator 363b in a direction H1 thus causes the associated rod portion 361 to rotate in conjunction therewith in the direction H1. Upon rotation of the rotation jigs 365 in the direction A1, each rod portion 361 rotates in the direction H1 (i.e., changes from the state illustrated in FIG. 59A to the state illustrated in FIG. 59B). Upon rotation of the rotation jigs 365 in the direction A2, each rod portion 361 rotates in a direction H2 (i.e., changes from the state illustrated in FIG. 59B to the state illustrated in FIG. 59A).

Figure 55:
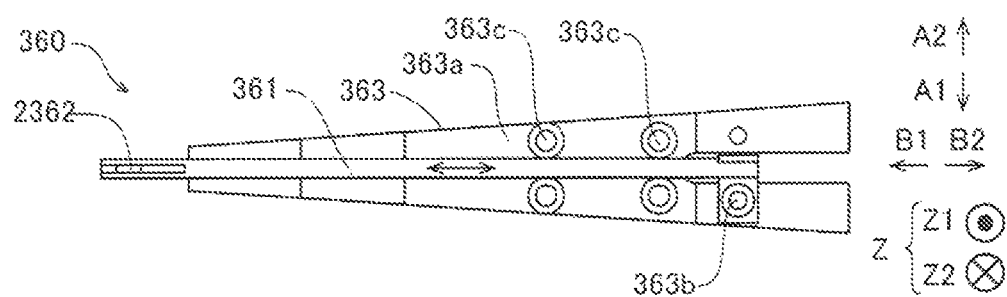
FIG. 55 is a diagram illustrating a structure of the movement restricting jig (which is in the non-restricting state) according to the second embodiment as viewed in the axial direction.

As illustrated in FIGS. 53 and 55, the rollers 363c are in contact with the rod portion 361. The rollers 363c are structured such that rotation of the rollers 363c causes the rod portion 361 to move (slide) in the radial direction.

Figure 60:
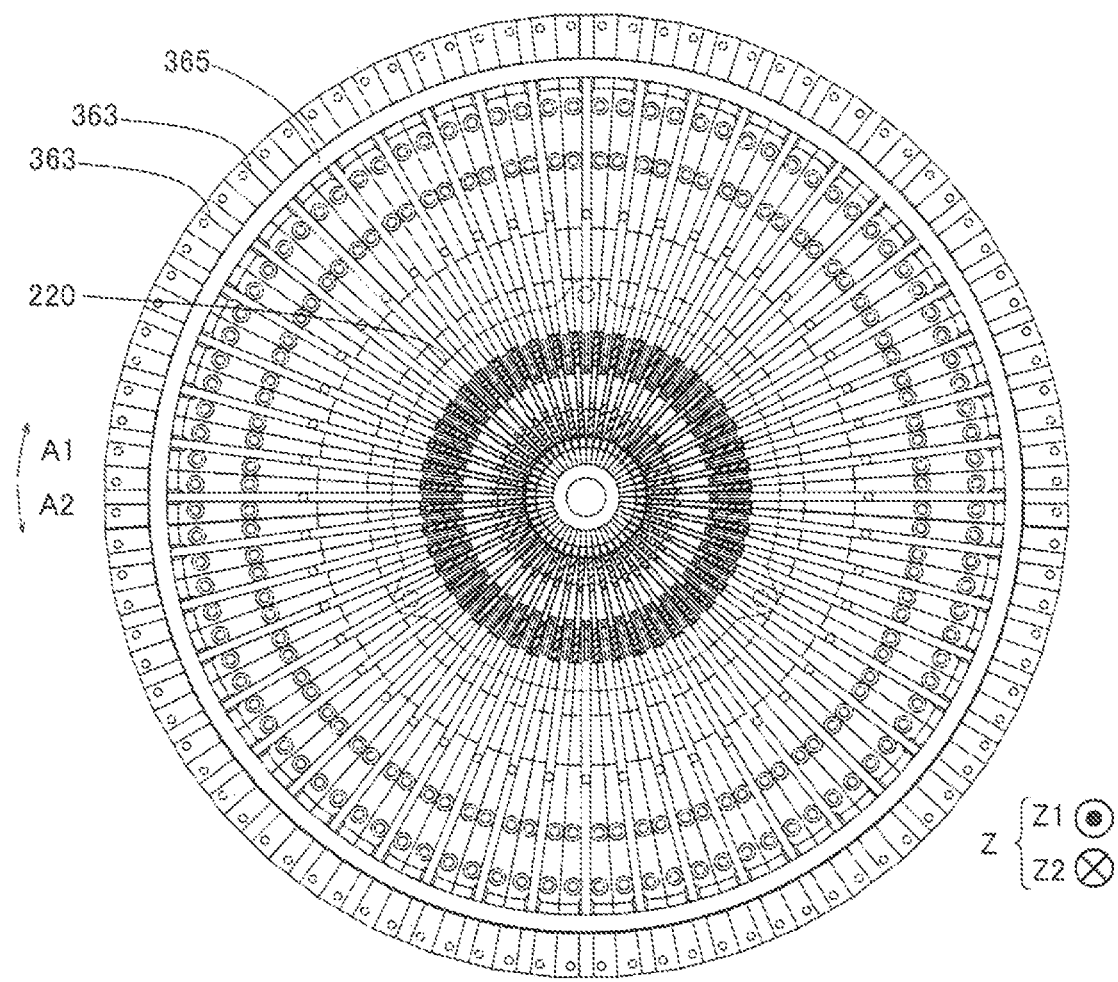
FIG. 60 is a diagram illustrating a structure of a rotation jig for the movement restricting jigs according to the second embodiment as viewed in the axial direction.

As illustrated in FIG. 60, the restricting jig bodies 363 are disposed annularly and adjacent to each other in the circumferential direction as viewed in the axial direction. The restricting jig bodies 363 are each provided for an associated one of the teeth 22 of the stator core 220. Thus, when each movement restricting jig 360 is in the restricting state, each restrictor 362 is located close to or in contact with the rod portion 361 disposed in the restricting jig body 363 adjacent to the restrictor 362 in the circumferential direction.

The rotation jigs 365 are each formed into an annular shape as viewed in the direction Z2. The rotation jigs 365 are each disposed on an associated one of first and second axial sides of the stator core 220. The rotation jigs 365 are structured to be rotated around the central axis C1 by a driving device (not illustrated). Rotation of the rotation jigs 365 is transmitted to all the rotators 363b disposed on the first axial side of the stator core 220. This rotates each rotator 363b around the rotation axis C2, so that all the rod portions 361 disposed on the first axial side of the stator core 220 rotate in unison.

The coil deformer 80 is structured to deform the coils 10 by moving the coil guide jigs 81 relative to the stator core 220 in the circumferential direction of the stator core 220, with the state of each movement restricting jig 360 changed from the non-restricting state to the restricting state upon rotation of each movement restricting jig 360.

The coil deformer 80 is structured such that the radially inner slot-housed portions 11b of the coils 10 deformed by the coil deformer 80 are inserted into the slots 21 located circumferentially away from the slots 21 in which the radially outer slot-housed portions 11a are placed, with the state of each movement restricting jig 360 changed from the restricting state to the non-restricting state upon rotation of each movement restricting jig 360.

Stator Manufacturing Method

Figure 61:
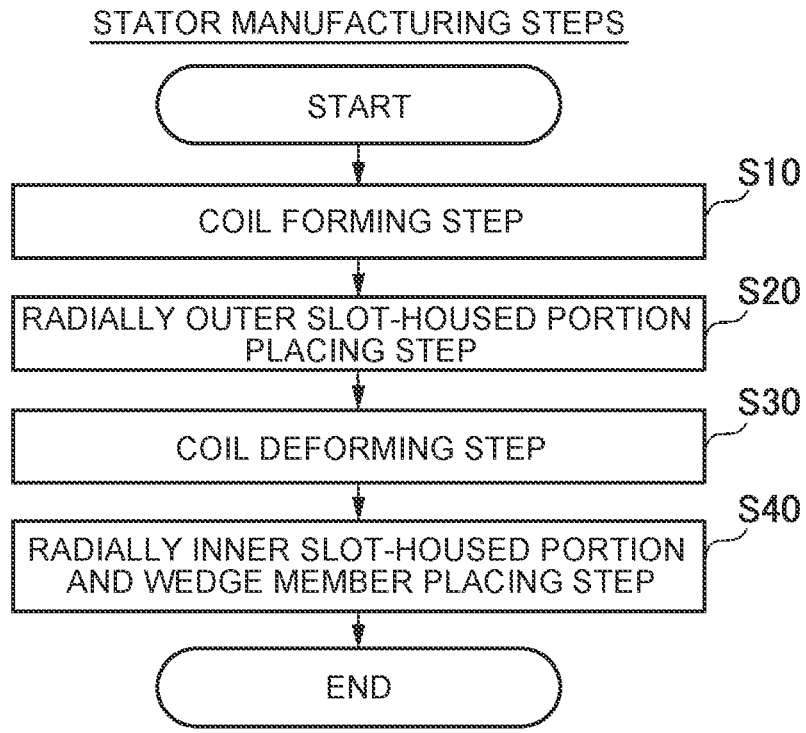
FIG. 61 is a flow chart illustrating steps for manufacturing the stator according to the second embodiment.
Figure 62:
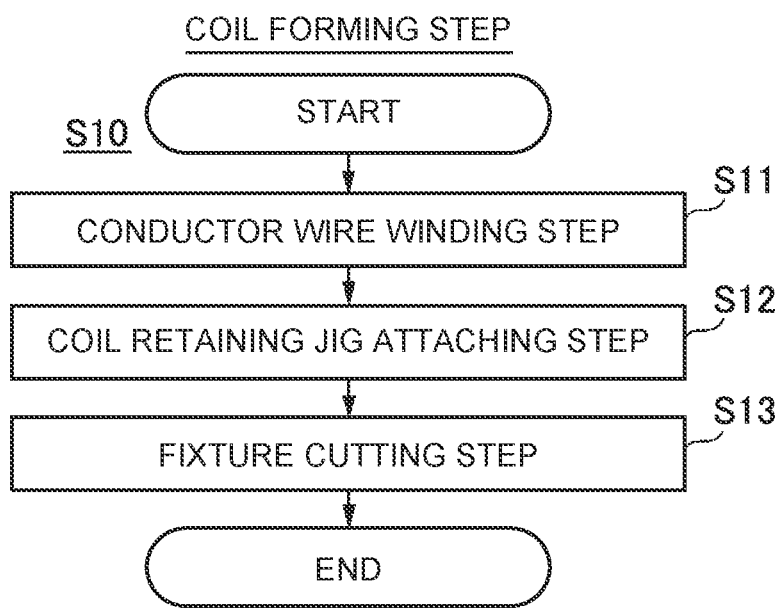
FIG. 62 is a flow chart illustrating a coil forming step according to the second embodiment.

A method (steps) for manufacturing the stator 200 according to the present embodiment will be described blow. FIG. 61 is a flow chart illustrating manufacturing steps for the stator 200. FIGS. 62 and 65 are flow charts illustrating in detail steps included in the manufacturing steps.

Coil Forming Step

Step S10 involves forming the coils 10. Specifically, step S10 involves performing steps S11, S12, and S13 as illustrated in FIG. 62. Step S10 is an example of an "insulating sheet preparing step" in the claims.

Step S11 involves winding the conductor wire 10a around the winding core 211 so as to form the coil 10. Specifically, the conductor wire 10a is wound around a spool (which is provided by the winding core 311 and the two side plates 312) twice or more as illustrated in FIGS. 27 and 28. The insulating sheet 230 includes the fixtures 35 which are located in the direction F1 relative to the winding core 311 and through which the folded portions 31 are fixed to each other. With the insulating sheet 230 attached to the spool, the conductor wire 10a is wound around the winding core 311. This forms the coil 10 having the insulating sheet 230 attached thereto. The winding core 311 and the side plates 312 are retained by the winding core retaining jigs 313.

Before step S11 is performed, the folded portions 31 are fixed to each other through the fixtures 35 using, for example, an adhesive. The insulating sheet preparing step (i.e., step S10) according to the second embodiment includes the step of fixing the folded portions 31 to each other such that the folded portions 31 of each insulating sheet 230 will not be spread out.

Step S12 involves attaching each coil retaining jig 320 to an associated one of the coils 10. Each coil retaining jig 320 retains the associated coil 10 so as to restrict deformation of at least a portion of the coil 10. Specifically, step S12 involves retaining each coil 10 such that each coil 10 is sandwiched between the plate members 321 and 322 from both sides in the circumferential direction of the stator core 220, thus attaching each coil retaining jig 320 (which restricts deformation of the associated coil 10 in the circumferential direction of the stator core 220) to the associated coil 10.

Specifically, at least one of the plate members 321 and 322 is rotated around the rotation shaft 323b of the connector 323 such that the plate members 321 and 322 are opened as illustrated in FIGS. 32A and 32B. In this state, the coil 10 is placed on the coil retaining jig 320. As illustrated in FIG. 30, the coil 10 is placed in the coil retaining jig 320 such that the winding inner side opening of the coil 10 overlaps with the openings 321c and 322c of the coil retaining jig 320 in the direction F.

At least one of the plate members 321 and 322 is then rotated around the rotation shaft 323b of the connector 323 so as to close the plate members 321 and 322. The coil 10 is thus retained such that the coil 10 is sandwiched between the plate members 321 and 322. Accordingly, the first portion 321a of the plate member 321 and the first portion 322a of the plate member 322 restrict deformation of the coil 10 that results in expansion in the circumferential direction (i.e., the direction F). The second portion 321b of the plate member 321 and the second portion 3222b of the plate member 322 restrict deformation of the coil 10 that results in expansion in the radial direction (i.e., the direction G).

As illustrated in FIG. 32A, the coil 10 is placed on the coil retaining jig 320, with the coil 10 retained by the winding core retaining jigs 313 (which retain the winding core 311 provided on the winding inner side of the coil 10) through the openings 321c and 322c. In other words, the winding core retaining jigs 313 will not be removed from the coil 10 between the time when the coil 10 is wound in step S11 and the time when the coil retaining jig 320 is attached to the coil 10. This makes it possible to prevent deformation of the coil 10 from the time when the coil 10 is wound.

With the coil retaining jig 320 attached to the coil 10, the winding core retaining jigs 313 are removed in the direction E1 or in the direction F through the openings 321c and 322c. The side plates 312 are removed in the direction E1 from between the coil 10 and the plate members 321 and 322. The winding core 311 is removed in the direction F through the openings 321c and 322c.

As illustrated in FIG. 30, the coil retaining jig 320 is attached to the coil 10 such that the insulating sheet 230 including the fixtures 35 is sandwiched between the coil 10 and the coil retaining jig 320 (the plate member 322).

As illustrated in FIGS. 66A to 66C, step S13 involves cutting off the fixtures 35 of the insulating sheet 230. The fixtures 35 are cut off by the fixture cutting device 340, with the coil retaining jig 320 attached to the coil 10. Specifically, the receivers 344 of the fixture cutting device 340 are first disposed in the direction F2 relative to the coil 10 having the coil retaining jig 320 attached thereto as illustrated in FIG. 66A.

As illustrated in FIG. 66B, the cutters 341, the coil protectors 342, the clamps 343, and the chip discharger 345 are moved toward the coil 10 (which has the coil retaining jig 320 attached thereto) in the direction F2 until the clamps 343 abut against the receivers 544 such that the vicinity of the boundary region 35a between one of the fixtures 35 and the first coil end portion insulator 32a (which is located in the direction E1) is sandwiched between one of the clamps 343 and the associated receiver 344 and the vicinity of the boundary region 35a between the other fixture 35 and the second coil end portion insulator 32b (which is located in the direction E2) is sandwiched between the other clamp 343 and the associated receiver 344. As illustrated in FIG. 38, the coil protectors 342 are disposed on the winding inner side of the coil 10 and in the openings 321c and 322c of the plate members 321 and 322 of the coil retaining jig 320. FIGS. 66A and 66B illustrate an example where the coil protectors 342 move together with the cutters 341, the clamps 343, and the chip discharger 345. The preferred embodiment, however, is not limited to this example. The coil protectors 342 may move independently of the cutters 341, the clamps 343, and the chip discharger 345.

As illustrated in FIG. 66C, with the clamps 343 in abutment with the receivers 344 through the first and second coil end portion insulators 32a and 32b, the chip discharger 345 and the cutters 341 move together relative to the clamps 343 and the coil protectors 342 in the direction F2. The cutters 341 pass through the boundary regions 35a between the fixtures 35 and the first and second coil end portion insulators 32a and 32b of the insulating sheet 230 so as to cut the boundary regions 35a, thus cutting off the fixtures 35 from the insulating sheet 230. The fixtures 35 that have been cut off (i.e., chips) are pushed out in the direction F2 by the chip discharger 345 and thus discharged from the vicinity of the coil 10. With the coil retaining jig 320 attached to the coil 10, the coil 10 is then removed from the fixture cutting device 340. In other words, step S13 according to the second embodiment is the step of passing the cutters 341 through the boundary regions 35a between the folded portions 31 and the fixtures 35 in a direction perpendicular to the fixtures 35 (i.e., in the direction F) so as to cut off the fixtures 35, thus unfixing the folded portions 31.

The process then goes to step S20. In the second embodiment, the step (S24) of placing insulating sheets (230), which will be described below, is the step of placing the insulating sheets 230 together with the coils 10, with the insulating sheets 230 attached to the coils 10 and with the insulating sheets 230 and the coils 10 retained by the coil retaining jigs 320.

Radially Outer Slot-Housed Portion Placing Step

Step S20 involves placing the radially outer slot-housed portions 11a in the slots 21 (in the radially outer portions 21c thereof). Specifically, step S20 involves performing steps S21 to S26 as illustrated in FIG. 63.

Step S21 involves placing the stator core 220 such that the stator core 220 is located radially outward of the coil guide jigs 81 of the coil deformer 80. Specifically, the stator core 220 is placed in the direction Z1 relative to the coil guide jigs 81, with the upper coupler 83 (see FIG. 39) removed from the coil guide jigs 81, and the stator core 220 is then moved in the direction Z2 relative to the coil guide jigs 81, thus combining the stator core 220 with the coil guide jigs 81 as illustrated in FIG. 67.

As illustrated in FIG. 2, step S22 involves placing each slot insulating sheet 40 in an associated one of the slots 21. In one example, the slot insulating sheets 40 are placed in the direction Z1 relative to the stator core 20, and the slot insulating sheets 40 are then moved in the direction Z2 relative to the stator core 20, thus inserting the slot insulating sheets 40 into the slots 21. Specifically, step S22 involves placing the slot insulating sheets 40 in the slots 21 such that the slot insulators 41 of the slot insulating sheets 40 are placed inside the slots 21 and the collars 42 of the slot insulating sheets 40 protrude outward from the end face 20a of the teeth 22 in the axial direction (see FIG. 58).

Figure 67:
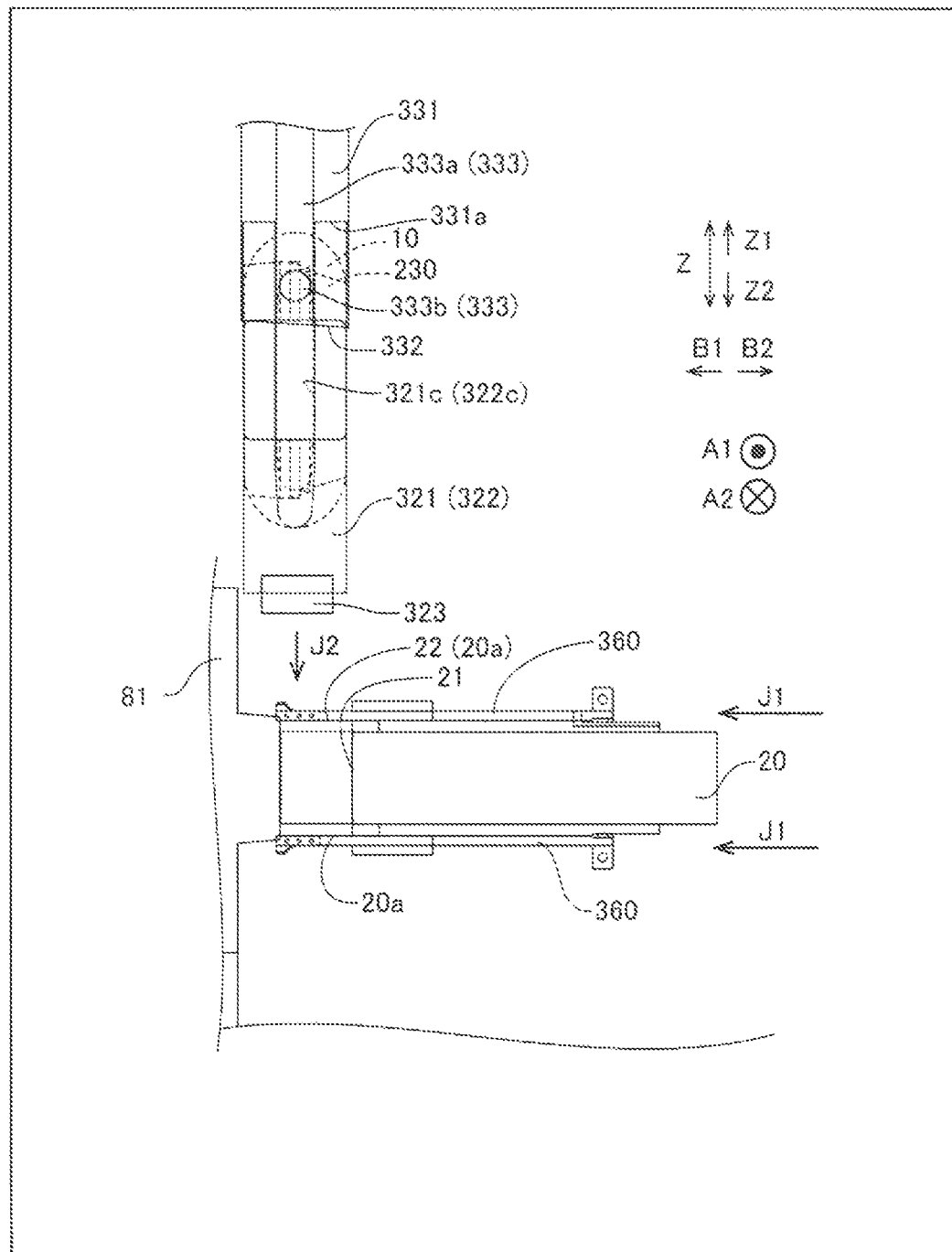
FIG. 67 is a diagram illustrating a step of placing coils in the slots and between the coil guide jigs in the second embodiment.

As illustrated in FIG. 67, step S23 involves placing the movement restricting jigs 360 on both sides of the stator core 220 in the axial direction. Specifically, the movement restricting jigs 360 are placed radially outward of the stator core 220, and then the movement restricting jigs 360 are moved radially inward (i.e., in a direction J1 in FIG. 67), thus placing the movement restricting jigs 360 on the end faces 20a of the stator core 220 facing in the axial direction. As illustrated in FIG. 60, each movement restricting jig 360 is placed on the end face 20a of an associated one of the teeth 22 defined in the stator core 220.

Specifically, the movement restricting jigs 360 in the non-restricting state are placed on the end faces 20a of the teeth 22 facing in the axial direction of the stator core 220 as illustrated in FIG. 58. In other words, the movement restricting jigs 360 in the non-restricting state where the restrictors 362 protrude outward of the stator core 220 in the axial direction are placed on the end faces 20a of the teeth 22. In one example, the movement restricting jigs 360 whose restrictors 362 are in the non-restricting state are moved from the radially outward side of the stator core 220 to the radially inward side of the stator core 220. The movement restricting jigs 360 are placed such that the rod portions 361 of the movement restricting jigs 360 are adjacent to the collars 42 of the slot insulating sheets 40 in the circumferential direction.

Step S24 involves placing the radially outer slot-housed portions 11a of the coils 10 (which have the coil retaining jigs 320 attached thereto) in the slots 21, and placing the radially inner slot-housed portions 11b of the coils 10 (which have the coil retaining jigs 320 attached thereto) in the coil deformer 80 (between the coil guide jigs 81). Specifically, as illustrated in FIG. 67, the coils 10 having the coil retaining jigs 320 attached thereto are moved in a direction J2 (i.e., the direction Z2) relative to the stator core 220, and the radially outer slot-housed portions 11a are thus placed in the slots 21 in such a manner that the connectors 323 (which are ends of the coil retaining jigs 320 facing in the direction Z2) are inserted into the slots 21 first. Step S24 is an example of a "step of placing an insulating sheet in a stator core" and an example of a "step of placing a first slot-housed portion in a first slot" in the claims.

Specifically, the coil retaining jigs 320 are pressed in the direction Z2 by the jig pressing members 331, so that the coils 10 having the coil retaining jigs 320 attached thereto are inserted into the slots 21 and the clearances CL1 of the coil deformer 80. To be more specific, the radially inner slot-housed portions 11b are placed between the coil guide jigs 81 (in the clearances CL1) such that the radially inner slot-housed portions 11b are located radially inward of the radially inwardly facing openings 21a of the slots 21 (the radially inner portions 21b) and radially face the openings 21a of the slots 21 (the radially inner portions 21b).

Each pressing position restricting member 332 that moves together with the associated jig pressing member 331 comes into contact with the end face 20a of the stator core 220 facing in the axial direction, thus restricting movement of each jig pressing member 331 in the direction Z2. This not only restricts the axial positions of the radially outer slot-housed portions 11a in the slots 21 but also restricts the axial positions of the radially inner slot-housed portions 11b in the coil guide jigs 81.

Figure 68:
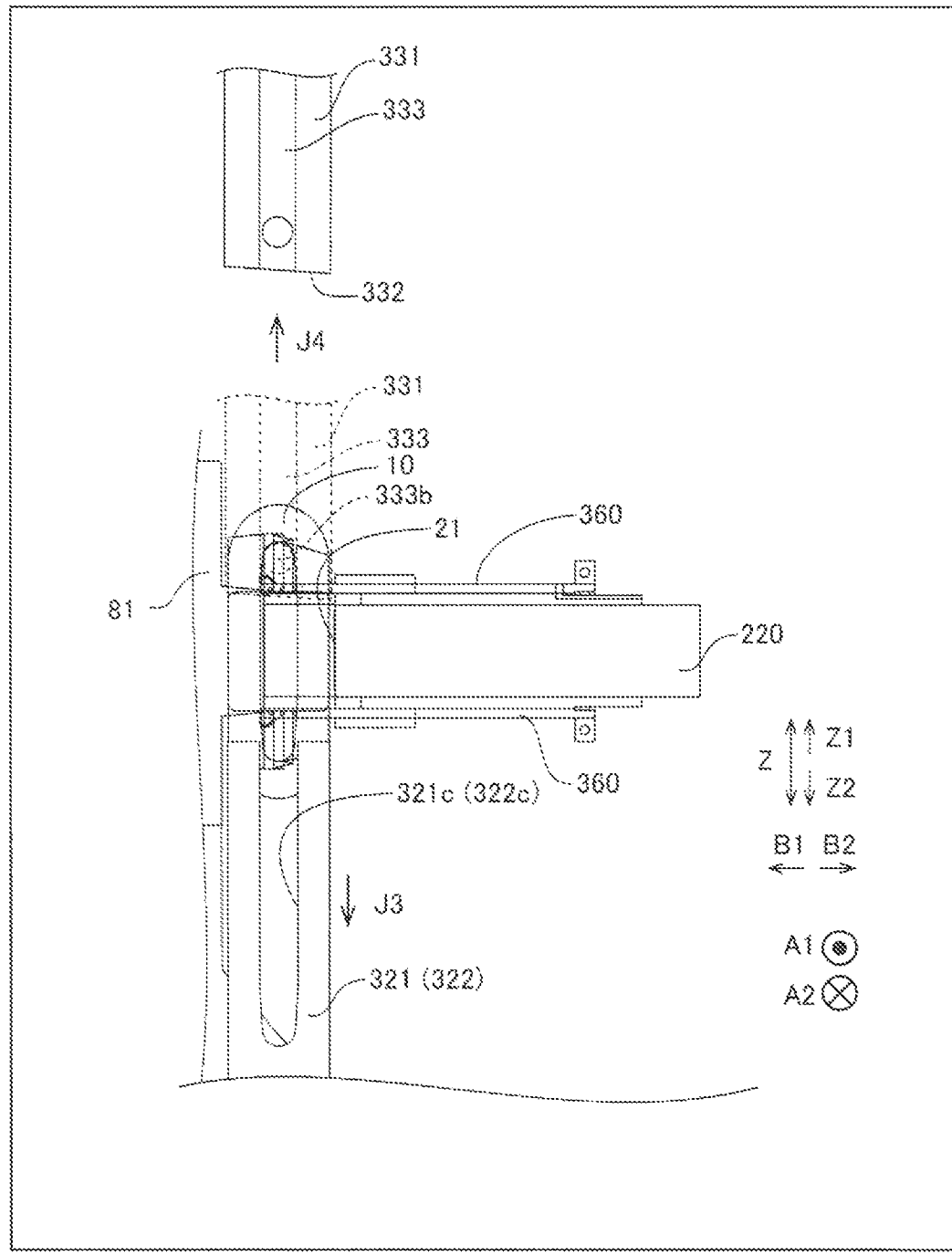
FIG. 68 is a diagram illustrating a step of removing the coil retaining jigs from the coils in the second embodiment.

Step S25 involves removing the coil retaining jigs 320 from the coils 10. Specifically, the winding inner side of each coil 10 is retained by the associated coil position fixing jig 333 such that the axial position of each coil 10 is fixed as illustrated in FIG. 68. In this state, the coil retaining jigs 320 are moved relative to the coils 10 in a direction J3 (i.e., the direction Z2), thus removing the coil retaining jigs 320 from the coils 10. To be more specific, each coil 10 is retained by the protrusion 333b of the associated coil position fixing jig 333 at a position located in the direction Z2 relative to the openings 321c and 322 as illustrated in FIG. 67. In this state, each coil retaining jig 320 is moved relative to the associated coil 10 in the direction J3, thus removing each coil retaining jig 320 from the associated coil 10 such that the protrusion 333b passes through the openings 321c and 322c in the direction Z.

Step S26 involves removing each coil position fixing jig 333 from the associated coil 10, and removing each jig pressing member 331 and each pressing position restricting member 332 from the associated coil 10. Specifically, each coil position fixing jig 333 is moved in the direction A2, thus removing the protrusion 333b from the winding inner side of the associated coil 10. Moving the jig pressing members 331, the pressing position restricting members 332, and the coil position fixing jigs 333 relative to the coils 10 in a direction J4 (i.e., the direction Z1) removes the jig pressing members 331, the pressing position restricting members 332, and the coil position fixing jigs 333 from the coils 10.

Coil Deforming Step

Step S30 involves performing the step of deforming the coils 10. Specifically, step S30 involves performing steps S31 to S33 as illustrated in FIG. 64.

Figure 69:
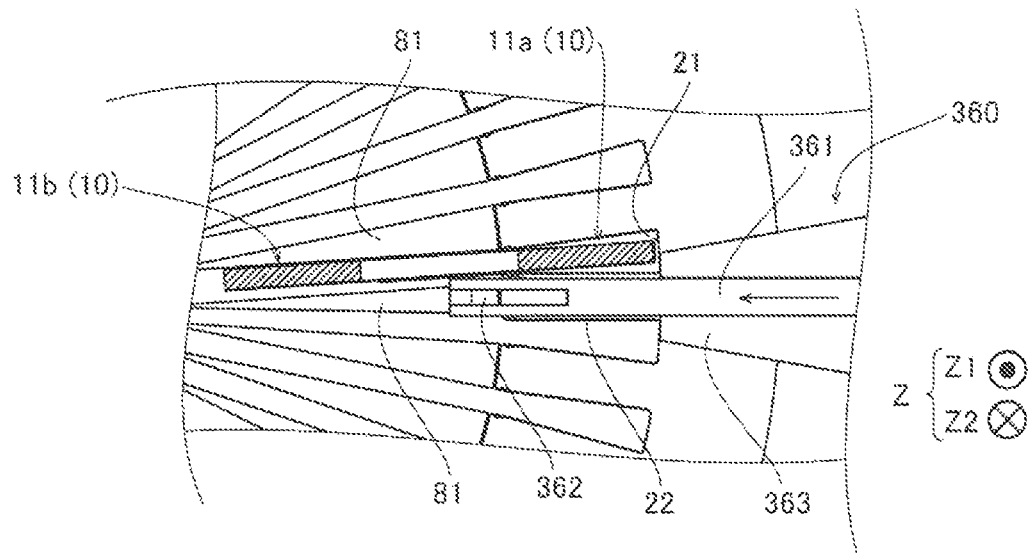
FIG. 69 is a diagram illustrating a step of placing each movement restricting jig on an associated one of teeth in the second embodiment.
Figure 70:
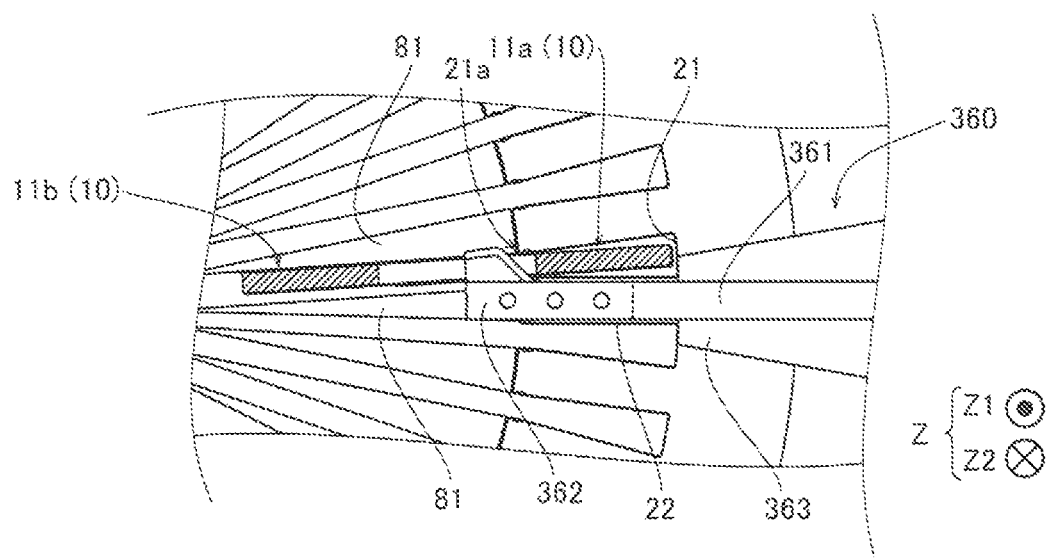
FIG. 70 is a diagram illustrating how the movement restricting jig changes from the non-restricting state to the restricting state in the second embodiment.
Figure 71:
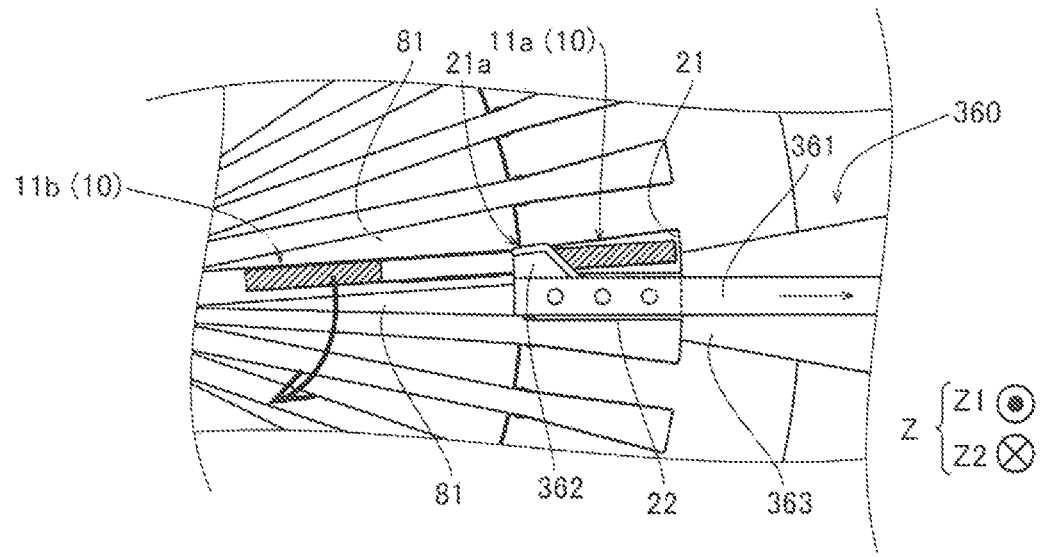
FIG. 71 is a diagram illustrating how radially inward movement of the radially outer slot-housed portion is restricted by the movement restricting jig in the second embodiment.
Figure 72:
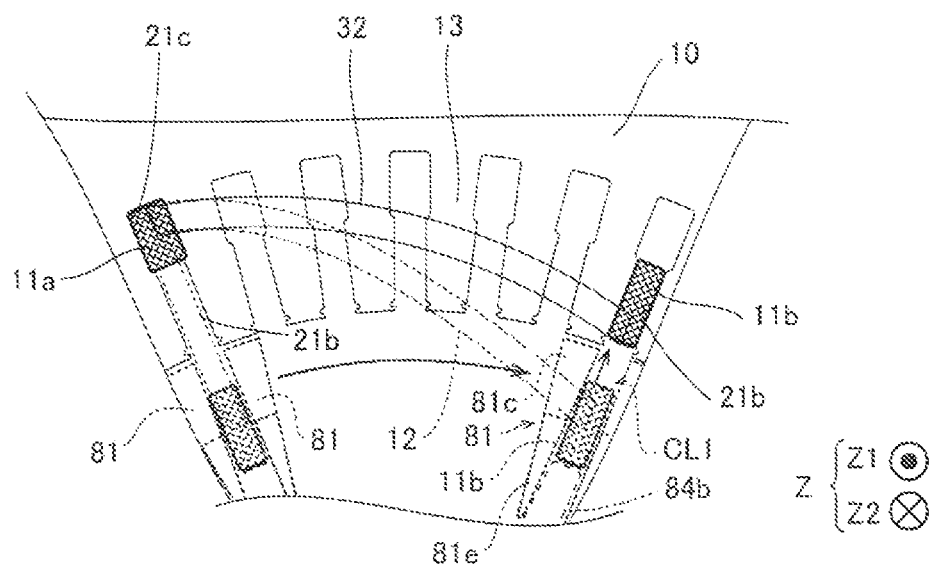
FIG. 72 is a diagram illustrating the coil deforming step and coil inserting step according to the second embodiment.
Figure 73:
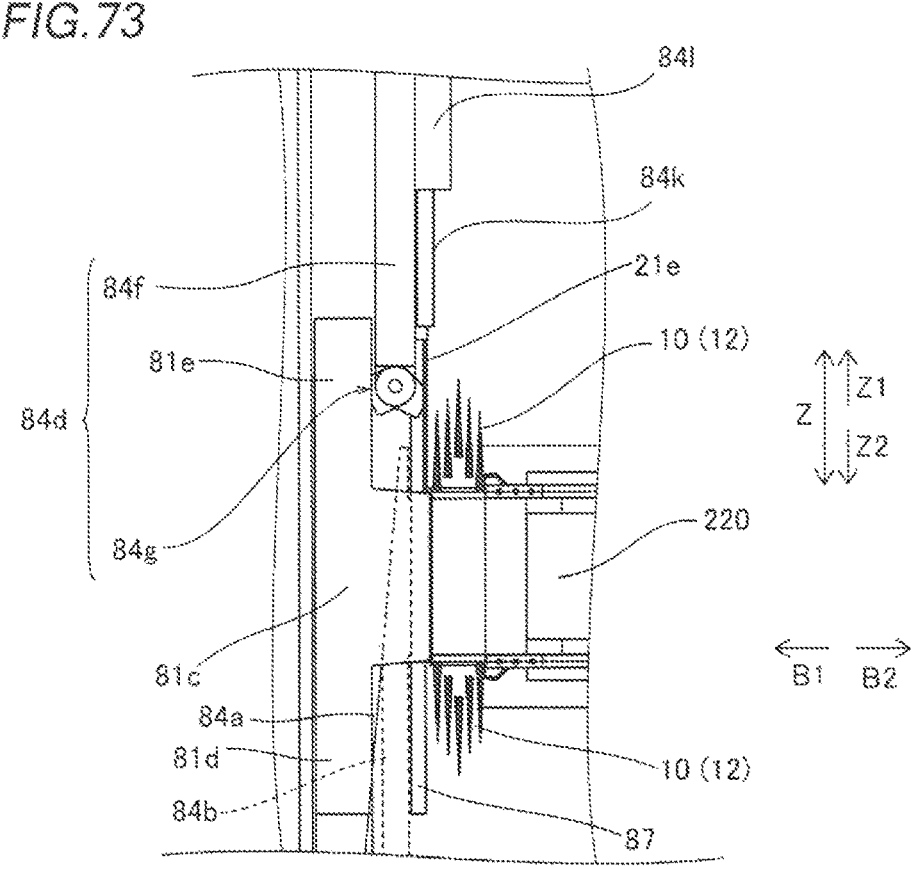
FIG. 73 is a side view of the stator manufacturing apparatus, with each radially inner slot-housed portion pressed through the associated wedge retaining member in the course of the stator manufacturing method according to the second embodiment.
Figure 74:
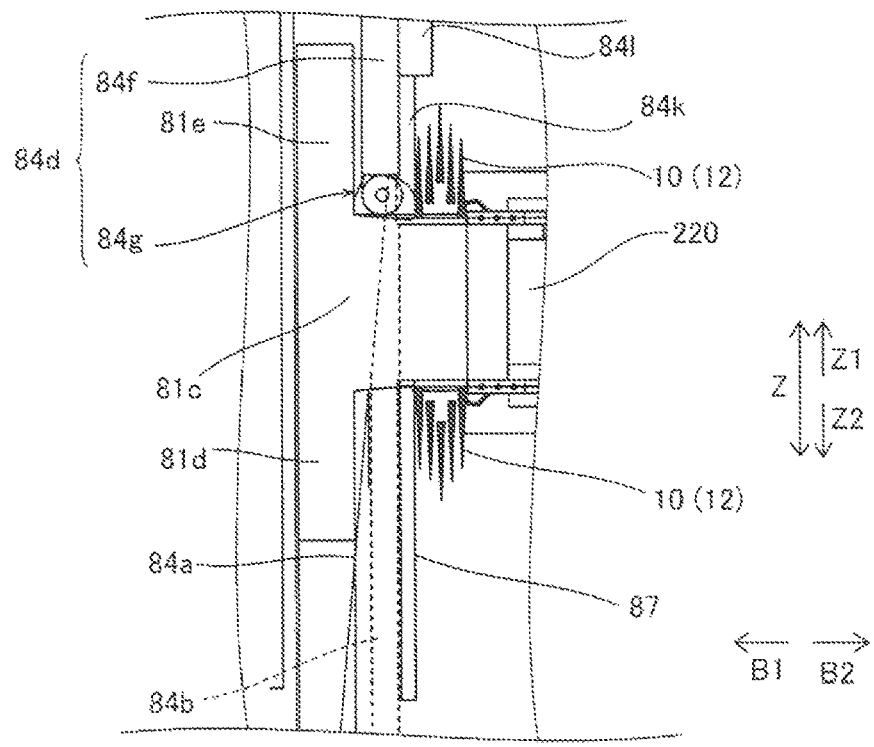
FIG. 74 is a cross-sectional view of the stator manufacturing apparatus, with each wedge retaining member pressed and moved by an associated wedge driver in the course of the stator manufacturing method according to the second embodiment.

Step S31 involves changing the state of each of the movement restricting jigs 360 from the non-restricting state (see FIG. 52) to the restricting state (see FIGS. 70 and 71). This restricts radially inward movement of the radially outer slot-housed portions 11a. Although one of the coils 10 and one of the movement restricting jigs 360 are illustrated in FIGS. 69 and 70 for the sake of simplicity of description, the coils 10 are each placed in an associated one of the slots 21, and the movement restricting jigs 360 are each placed on an associated one of the teeth 22.

Specifically, as illustrated in FIG. 70, each movement restricting jig 360 is first moved such that each movement restricting jig 360 is located radially inward of the opening 21a of the associated slot 21, and then each rod portion 361 is rotated. This changes the state of each restrictor 362 from a state where each restrictor 362 protrudes axially outward (i.e., in the direction Z1) to a state where each restrictor 362 protrudes in the direction A2.

As illustrated in FIG. 71, the rod portion 361 of each movement restricting jig 360 whose restrictor 362 protrudes in the direction A2 is moved radially outward, so that each restrictor 362 is placed to face the associated opening 21a. This closes a radially inward portion of each slot 21. Radially inward movement of each radially outer slot-housed portion 11a thus causes each radially outer slot-housed portion 11a to abut against the associated restrictor 362.

The movement restricting jigs 360, each provided on an associated one of the teeth 22, are rotated in unison by the rotation jigs 365 and thus changed from the non-restricting state to the restricting state. In other words, each movement restricting jig 360 is rotated around the rotation axis C2 in the direction H2 in conjunction with the rotation of the rotation jigs 365 in the direction A2 as illustrated in FIGS. 59A and 59B. As illustrated in FIG. 57, each of the movement restricting jigs 360 is thus placed to face the opening 21a of the associated slot 21 adjacent, on the first circumferential side, to the tooth 22 on which the movement restricting jig 360 is placed. Accordingly, each of the movement restricting jigs 360 restricts radial movement of the radially outer slot-housed portion 11a in the associated slot 21 adjacent to the movement restricting jig 360 in the direction A2.

Step S32 involves attaching the upper coupler 83 (see FIG. 39) to the upper ends 81f (see FIG. 40) of the coil guide jigs 81. Specifically, the upper ends 81f of the coil guide jigs 81 are fitted to the recesses 83a (see FIG. 42) circumferentially defined in the upper coupler 83 (the flange member 83b). The shaft 86 is fitted to the through hole 83h (see FIG. 42) of the cap member 53c and the through hole 83g (see FIG. 42) of the flange member 83b such that the rotative driving force is transmittable. Before the shaft 86 is fitted to the through hole 83h and the through hole 83g, the cap member 83c is fastened to the flange member 83b with, for example, screw members.

The projections 86b (see FIG. 44A) provided on the circumferential surface 86a of the shaft 86 are brought into engagement with the recesses 83i (see FIG. 44B) defined in the circumferential surface 83j of the through hole 83h of the cap member 83c and the recesses 83k (see FIG. 43) defined in the circumferential surface 83l of the through hole 83g of the flange member 83b. In this state, the shaft 86 is fitted to the through hole 83h and the through hole 83g.

Then, step S33 involves rotating the lower rotative driving device 82 (see FIG. 40), with the radially inner slot-housed portions 11b placed in the clearances CL1 and the radially outer slot-housed portions 11a placed in the slots 21. This rotates the lower coupler 85 (see FIG. 40) attached to the lower rotative driving device 82. Because the recesses 85d (see FIG. 46) defined in the circumferential surface 85c of the through hole 85a of the lower coupler 85 are in engagement with the projections 86b (see FIG. 44A) on the shaft 86, the rotation of the lower coupler 85 transmits the rotative driving force of the lower rotative driving device 82 to the shaft 86 through the lower coupler 85. The rotative driving force transmitted to the shaft 86 through the lower coupler 85 is thus transmitted to the upper coupler 83 through the shaft 86. Step S33 is an example of a "step of moving a second slot-housed portion to a circumferential position adjacent to a second slot different from a first slot, thus forming a coil" in the claims.

Accordingly, upon rotation of the upper coupler 83 resulting from the rotation of the lower rotative driving device 82, each of the coil guide jigs receives, on its ends facing in the central axis direction, the rotative driving force. This rotates each of the coil guide jigs 81. Each radially inner slot-housed portion 11*b* placed in the associated clearance CL1 between the coil guide jigs 81 is moved in the circumferential direction (see FIG. 72), resulting in deformation of the coils 10. The distance between each radially outer slot-housed portion 11*a* and the associated radially inner slot-housed portion 11*b* will thus be greater than that before deformation. Consequently, the folded portions 31 of each insulating sheet 230 will be unfolded (see FIGS. 7B and 7C).

Radially Inner Slot-Housed Portion and Wedge Member Placing Step

Then, step S40 involves placing the radially inner slot-housed portions 11*b* and the wedge members 21*e*. Specifically, step S40 involves performing steps S41 to S46 illustrated in FIG. 65.

First, step S41 involves rotating each rod portion 361, thus changing the state of each restrictor 362 from the restricting state to the non-restricting state as illustrated in FIG. 58. As illustrated in FIG. 40, the movement restricting jigs 360 are moved to positions radially outward of the slots 21 (the teeth 22), so that the movement restricting jigs 360 are located away from the teeth 22. In other words, the movement restricting jigs 360 (the rod portions 361) are moved in a direction R2, with the restrictors 362 protruding in the direction Z1.

Step S42 involves detaching the upper coupler 83 (see FIG. 39) from the upper ends 81*f* of the coil guide jigs 81. In this step, the lower coupler 85 and the shaft 86 remain undetached.

Then, step S43 involves inserting the insert 84*a* (see FIG. 40) into the stator core 220 from the upper ends 81*f* of the coil guide jigs 81 (i.e., from the direction Z1). In this step, the insert 84*a* is inserted into the stator core 220 while the shaft 86 is inserted through the insertion hole 84*c* of the insert 84*a*. Step S43 is an example of a "step of moving a second slot-housed portion radially outward so as to place the second slot-housed portion in a second slot different from a first slot included in slots" in the claims.

Insertion of the insert 84*a* causes the blades 284 of the insert 84*a* (see FIG. 40) to press the pressers 84*b* (see FIG. 40) from the radially inward side to the radially outward side and move the pressers 84*b* radially outward. Accordingly, the radially inner slot-housed portions 11*b* placed radially outward of the pressers 84*b* are pressed from the radially inward side to the radially outward side by the pressers 84*b*. Each radially inner slot-housed portion 11*b* is thus moved such that each radially inner slot-housed portion 11*b* is inserted, from the radially inward side, into the slot 21 located circumferentially away from the slot 21 in which the associated radially outer slot-housed portion 11*a* is placed (see FIG. 72).

In the course of this process, each wedge retaining member 87 (see, for example, FIG. 41) is moved toward the slot 21 located radially outward thereof while being sandwiched between the associated presser 84*b* and the associated radially inner slot-housed portion 11*b*. Specifically, moving each presser 84*b* toward the slot 21 located radially outward thereof transmits the pressing force of each presser 84*b* to the associated radially inner slot-housed portion 11*b* through the associated wedge retaining member 87. The radially inner slot-housed portions 11*b* are thus pushed into the slots 21 from the radially inward side to the radially outward side.

To be more specific, each radially inner slot-housed portion 11*b* is pressed from the radially inward side to the radially outward side by the portion 87*d* of the associated wedge retaining member 87 (which is a portion of the wedge retaining member 87 other than the portion 87*c* that retains the wedge member 21*e*). In other words, the radially inner slot-housed portions 11*b* are pressed through the wedge retaining members 87, with the wedge members 21*e* protruding upward (i.e., in the direction Z1) from the stator core 220 in the central axis direction (see FIG. 73).

Then, step S44 involves moving the toggle mechanisms 84*d* and the sleeve 84*m* (see FIG. 40) in the central axis direction (i.e., in the direction Z2) independently of the insert 84*a* and the wedge drivers 84*k*. A pair of the second portions 84*i* of each toggle 84*g* abuts against the associated guide body 81*c*. This rotates each pair of second portions 84*i* (see FIG. 50) located between the plate-shaped portion 84*f* and the associated guide body 81*c*, such that the second portions 84*i* open in the radial direction. Accordingly, the coil end portions 12 protruding from the stator core 220 in the direction Z1 are pressed from the radially inward side to the radially outward side by one of each pair of second portions 84*i*.

Then, step S45 involves, with the coil end portions 12 pressed by the toggle mechanisms 84*d*, sliding the wedge drivers 84*k* and the sleeve 841 (see FIG. 40) in the central axis direction (i.e., in the direction Z2) independently of the insert 84*a* and the toggle mechanisms 84*d*. With the lower ends of the wedge drivers 84*k* in abutment with the upper ends of the wedge retaining members 87, the wedge drivers 84*k* are moved, so that the wedge drivers 84*k* press the wedge retaining members 87 from above (i.e., from the direction Z1). This moves the wedge retaining members 87 downward, i.e., in the direction Z2 (see FIG. 74).

In this step, each wedge retaining member 87 passes through the associated clearance CL1 between the coil guide jigs 81 and moves downward (i.e., in the direction Z2) while being guided by the coil guide jigs 81. As a result of the movement of each wedge retaining member 87, the wedge member 21*e* retained by each wedge retaining member 87 is inserted, from above (i.e., from the direction Z1), into the associated opening 21*a*, i.e., the associated groove 21*d* (see FIG. 24). In this step, the wedge retaining members 87 are moved, with the radially inner slot-housed portions 11*b* pressed through the wedge retaining members 87.

Figure 75:
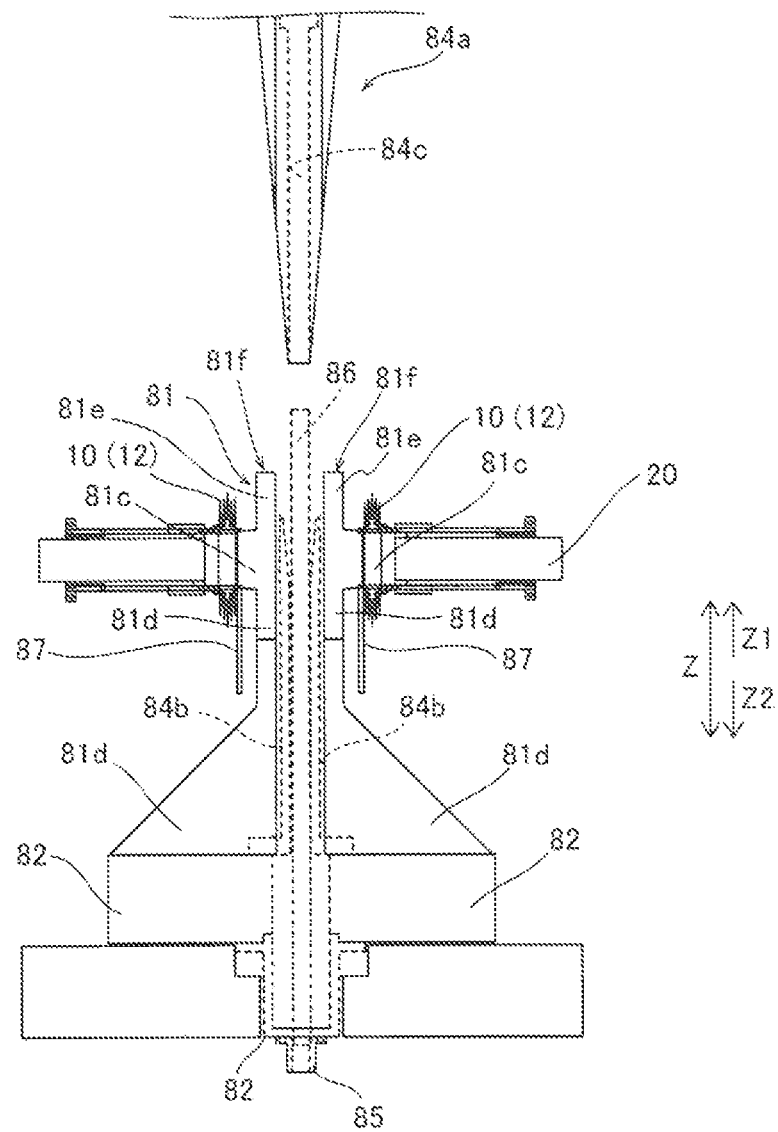
FIG. 75 is a side view of the stator manufacturing apparatus, with the insert removed from an inner side of a stator core in the course of the stator manufacturing method according to the second embodiment.

Step S46 involves pulling out the insert 84*a* upward, i.e., in the direction Z1 (see FIG. 75). Pulling out the insert 84*a* upward (i.e., in the direction Z1) causes the pressers 84*b* to stop pressing the radially inner slot-housed portions 11*b* through the wedge retaining members 87. The wedge retaining members 87 are then pulled out downward. Subsequently, each jig is removed from the stator 200, thus completing the stator 200. Then, the rotor 101 is placed radially inward of the stator 200 so as to manufacture the rotary electric machine 102.

Effects of Manufacturing Methods According to Above Embodiments

The manufacturing methods according to the above embodiments are able to achieve effects described below.

In the first and second embodiments, the manufacturing methods include, after the step (S5, S24) of placing the first slot-housed portions (11a), the step (S8, S43) that involves moving the second slot-housed portion (11b) of each pair of slot-housed portions (11) radially outward while unfolding the insulating sheets (30, 230) in the direction intersecting the direction of extension of the folded portions (31) of the insulating sheets (30, 230), thus placing the second slot-housed portions (11b). This makes it possible to move the second slot-housed portions (11b) radially outward while unfolding the folded portions (31). Thus, when each coil is not only a double layer lap-wound coil but also a distributed-wound coil, the manufacturing methods enable a reduction in load (tensile load) applied to the insulating sheets (30, 230) during placement of the slot-housed portions (11) in the slots (21). The manufacturing methods are able to continuously perform the step of increasing the distance between each pair of slot-housed portions (11), which is the coil forming step, and the step of placing each pair of slot-housed portions (11) in the associated slots (21). This makes it possible to simplify the steps for manufacturing the stator (100, 200) while allowing the insulating sheets (30, 230) to have sufficient mechanical strength. Consequently, the manufacturing methods enable the insulating sheets (30, 230) to have sufficient mechanical strength so as to provide insulation between the coils (10) while simplifying the steps for manufacturing the stator (100, 200).

In the first and second embodiments, the manufacturing methods further include, after the step (S3, S24) of placing the insulating sheets (30, 230) and before the step (S8, S43) of placing the second slot-housed portions (11b), the step (S7, S33) that involves increasing the distance between each pair of slot-housed portions (11) while unfolding the insulating sheets (30, 230) in the direction intersecting the direction of extension of the folded portions (31) of the insulating sheets (30, 230) so as to move the second slot-housed portion (11b) of each pair of slot-housed portions (11) to a circumferential position adjacent to the second slot (21) different from the first slot (21) included in the slots (21), thus forming the coils (10). Thus, the manufacturing methods make it possible to move the second slot-housed portions (11b) to circumferential positions adjacent to the second slots (21) different from the first slots (21) while unfolding the folded portions (31). Accordingly, the manufacturing methods enable a reduction in load (tensile load) applied to the insulating sheets (30, 230) not only when the second slot-housed portions (11b) are moved radially outward but also when the second slot-housed portions (11b) are moved in the circumferential direction. Consequently, the manufacturing methods reliably enable the insulating sheets (30, 230) to have sufficient mechanical strength so as to reliably provide insulation between the coils (10) while simplifying the steps for manufacturing the stator (100, 200).

In the first and second embodiments, the insulating sheets (30, 230) each include: the first coil end portion insulator (32a) to be placed on a first side along the central axis (C1); the second coil end portion insulator (32b) to be placed on a second side along the central axis (C1); and a pair of the connections (33) connecting the first coil end portion insulator (32a) to the second coil end portion insulator (32b). The step (S8, 43) of placing the second slot-housed portions (11b) is the step (S8, S43) that involves placing a first connection of each pair of connections (33) between the associated first slot-housed portion (11a) and the inner surface (23a) of the stator core (20, 220) that defines the bottom of the associated first slot (21) on a first radial side, placing a second connection of each pair of connections (33) between the associated second slot-housed portion (11b) and the radial pressing jig (70, 84) that presses the second slot-housed portion (11b) from a second radial side to the first radial side, and then radially moving, in this state, each second slot-housed portion (11b) by the associated radial pressing jig (70, 84), thus placing each second slot-housed portion (11b). Thus, the first connection of each pair of connections (33) is retained between the associated slot-housed portion (11) and the inner surface (23a) of the stator core (20, 220), and the second connection of each pair of connections (33) is retained between the associated slot-housed portion (11) and the radial pressing jig (70, 81). This enables the folded portions (31) to unfold while following the relative movement of each pair of slot-housed portions (11) without providing components that are separate from the insulating sheets (30, 230) and fix the insulating sheets (30, 230) to the slot-housed portions (11). Each second connection (33) is allowed to function as a member to protect (cushion) the associated second slot-housed portion (11b) against the radial pressing jig (70, 81). This makes it possible to prevent the second slot-housed portions (11b) from developing, for example, flaws when the second slot-housed portions (11b) are pressed by the radial pressing jigs (70, 81).

In the first embodiment, the step (S3) of placing the insulating sheets (30) involves placing the insulating sheets (30) in the stator core (20) before the step (S5) of placing the first slot-housed portions (11a). Placing the coils (10) in the slots (21), with the insulating sheets (30) attached to the surfaces (outer sides) of the coils (10), may cause the insulating sheets (30) and the teeth (22), which define the slots (21), to interfere with each other. To solve such a problem, this embodiment involves placing the insulating sheets (30) in the stator core (20) before placing the coils (10), i.e., the first slot-housed portions (11a), in the slots (21). This makes it possible to prevent the insulating sheets (30) and the teeth (22) from mechanically interfering with each other.

In the first embodiment, the step (S3) of placing the insulating sheets (30) involves placing the insulating sheets (30) in the stator core (20), with the insulating sheets (30) retained by the first retaining jigs (50) placed between the insulating sheets (30) and the teeth (22) that define the first slots (21). Thus, the first retaining jigs (50) are placed between the insulating sheets (30) and the teeth (22), making it possible to facilitate placement of the insulating sheets (30) in the stator core (20) by the first retaining jigs (50) while preventing the insulating sheets (30) and the teeth (22) from mechanically interfering with each other.

In the first embodiment, the step (S3) of placing the insulating sheets (30) involves placing the insulating sheets (30) in the stator core (20), with the insulating sheets (30) retained by the outer jigs (51) and the inner jigs (52). The outer jigs (51) are included in the first retaining jigs (50) and placed between the insulating sheets (30) and the teeth (22). The inner jigs (52) are included in the first retaining jigs (50) and placed inside the first slots (21) such that the inner jigs (52) are located inward of the insulating sheets (30). The insulating sheets (30) are interposed between the outer jigs (51) and the inner jigs (52). Thus, the first embodiment enables placement of the insulating sheets (30) in the stator core (20), with the insulating sheets (30) retained by the first retaining jigs (50), while preventing deformation of the insulating sheets (30) by interposing the insulating sheets (30) between the outer jigs (51) and the inner jigs (52).

In the first embodiment, the step (S5) of placing the first slot-housed portions (11a) involves placing the first slot-housed portions (11a) inside the first slots (21) such that the first slot-housed portions (11a) are located inward of the inner jigs (52), while guiding the first slot-housed portions (11a) by the inner jigs (52). Thus, if the insulating sheets (30) are placed in the stator core (20) in advance, the first slot-housed portions (11a) would be guided by the inner jigs (52). This makes it possible to facilitate placement of the first slot-housed portions (11a) in the slots (21) while preventing the insulating sheets (30) and the first slot-housed portions (11a) from mechanically interfering with each other (rubbing against each other).

In the first embodiment, the manufacturing method further includes the step (S4) of bringing the folded portions (31) into engagement with the end faces (22a) of the teeth (22) facing along the central axis (C1) after the step (S3) of placing the insulating sheets (30) and before the step (S5) of placing the first slot-housed portions (11a). The step (S4) involves removing the outer jigs (51) from between the insulating sheets (30) and the teeth (22) so as to press the folded portions (31) of the insulating sheets (30) out of the first slots (21) by the inner jigs (52), thus bringing the folded portions (31) into engagement with the end faces (22a) of the teeth (22) facing along the central axis (C1). Thus, the folded portions (31) in engagement with the end faces (22a) are able to restrict the positions of the insulating sheets (30) relative to the stator core (20) along the central axis (C1). This makes it possible to prevent the locations of the insulating sheets (30) from deviating from their desired locations along the central axis (C1).

In the first embodiment, the manufacturing method further includes the step of removing the inner jigs (52) from between the insulating sheets (30) and the first slot-housed portions (11a) after the step (S5) of placing the first slot-housed portions (11a) and before the step (S8) of placing the second slot-housed portions (11b). Thus, the inner jigs (52) used for manufacture of one stator (100) are usable for manufacture of the other stator (100). Accordingly, the first embodiment will not complicate facilities for manufacturing the stators (100).

In the second embodiment, the step (S24) of placing the insulating sheets (230) involves placing the insulating sheets (230) together with the coils (10), with the insulating sheets (230) attached to the coils (10). The step (S10) of preparing the insulating sheets (230) includes the step of fixing the folded portions (31) to each other such that the folded portions (31) of the insulating sheets (230) will not be spread out. Thus, fixing the folded portions (31) to each other such that the folded portions (31) of the insulating sheets (230) will not be spread out makes it possible to keep the overall length (dimension) of the folded portions (31) constant in a direction intersecting (perpendicular to) the direction of extension of the folded portions (31) of the insulating sheets (230). Accordingly, when the insulating sheets (230) are attached to the coils (10), the length of each insulating sheet (230) is easily adjustable to the length of each coil (10) in the direction intersecting (perpendicular to) the direction of extension of the folded portions (31) of the insulating sheets (230), making it possible to simplify the step (S10) of preparing the insulating sheets (230).

In the second embodiment, the step of fixing the folded portions (31) to each other involves fixing the folded portions (31) to each other by fixing protruded regions (34) protruded from the folded portions (31) to each other. Thus, because the protruded regions (34) are protruded from the folded portions (31), the protruded regions (34) are easily fixable to each other, and the protruded regions (34) are easily cut off when the folded portions (31) are unfixed in the subsequent step.

In the second embodiment, the step (24) of placing the insulating sheets (230) involves placing the insulating sheets (230) together with the coils (10), with the insulating sheets (230) attached to the coils (10) and with the insulating sheets (230) and the coils (10) retained by the coil retaining jigs (320). The step (S10) of preparing the insulating sheets (230) further includes the step (S13) of unfixing the folded portions (31) by cutting off the protruded regions (34), with the insulating sheets (230) and the coils (10) retained by the coil retaining jigs (320), before the step (S24) of placing the insulating sheets (230). Thus, the protruded regions (34) are cut off, with the insulating sheets (230) and the coils (10) retained by the coil retaining jigs (320). This makes it possible to prevent the folded portions (31) from unfolding before the folded portions (31) are unfixed and the insulating sheets (230) are placed.

In the second embodiment, the step (S13) of unfixing the folded portions (31) involves, with the insulating sheets (230) and the coils (10) retained by the coil retaining jigs (320), passing the cutting jigs (341) through the boundary regions (34c) between the folded portions and the protruded regions (34) in a direction intersecting the protruded regions (34) so as to cut off the protruded regions (34), thus unfixing the folded portions (31). Thus, passing the cutting jigs (341) through the boundary regions (34c) between the folded portions and the protruded regions (34) makes it possible to easily cut off the protruded regions (34) protruding from the folded portions (31). Accordingly, the second embodiment makes it possible to simplify the step (S13) of unfixing the folded portions (31), enabling simplification of the stator manufacturing steps.

In the first and second embodiments, the step (S7, S33) of forming the coils (10) involves, with the insulating sheets (30, 230) placed on the first circumferential side of the coil end portions (12), pressing the second slot-housed portions (11b) from a second circumferential side to the first circumferential side by the circumferential pressing jig (60, 81) so as to move the second slot-housed portions (11b) to circumferential positions adjacent to the second slots (21) while unfolding the folded portions (31), thus forming the coils (10). Thus, the insulating sheets (30, 230) placed on the first circumferential side will not mechanically interfere with the circumferential pressing jig (60, 81) placed on the second circumferential side. Accordingly, the folded portions (31) of the insulating sheets (30, 230) will not be prevented from unfolding.

In the first and second embodiments, the stator further includes the slot insulating sheets (40) placed in the slots (21) such that the slot insulating sheets (40) are each located between an associated pair of the slot-housed portions (11) and the teeth (22) that define the slots (21). The manufacturing methods further include the step of placing the slot insulating sheets (40) in the slots (21) before the step (S3, S24) of placing the insulating sheets (30, 230). If the slot insulating sheets (40) are placed after the step of placing the insulating sheets (30, 230) in the slots (21) and the step of placing the first slot-housed portions (11a) in the slots (21), clearances between the slot-housed portions (11) and the teeth (22) will be small, making it difficult to place the slot insulating sheets (40). To solve such a problem, these embodiments involve placing the slot insulating sheets (40) in the slots (21) before the step (S3, S24) of placing the insulating sheets (30, 230). This facilitates placement of the slot insulating sheets (40) in the slots (21).

Effects of Apparatuses According to Above Embodiments

The apparatuses according to the above embodiments are able to achieve effects described below.

In the above-described arrangements, the second embodiment makes it possible to provide the apparatus for manufacturing the stator (100, 200) which enables the insulating sheets (30, 230) to have sufficient mechanical strength so as to provide insulation between the coils (10) while simplifying the steps for manufacturing the stator (100, 200).

Effects of Arrangements According to Above Embodiments

The arrangements according to the above embodiments are able to achieve effects described below.

In the above-described arrangements, the first and second embodiments make it possible to provide the stator (100, 200) that enables the insulating sheets (30, 230) to have sufficient mechanical strength so as to provide insulation between the coils (10) while simplifying the steps for manufacturing the stator (100, 200).

In the first and second embodiments, the folded portions (31) are formed to extend in parallel with each other along the central axis (C1). This arrangement makes it possible to prevent the coil end portion insulators (32) from unfolding along the central axis (C1) and deforming such that the coil end portion insulators (32) curve along the central axis (C1) when the folded portions (31) are unfolded. In other words, this arrangement makes it possible to prevent the insulating sheets (30, 230) from being deformed in a direction different from that in which the coils (10) are deformed. Accordingly, this arrangement allows the folded portions (31) of the insulating sheets (30) to unfold as the distance between each pair of slot-housed portions (11) increases (from D1 to D2), and enables prevention of deformation of the insulating sheets (30, 230) from desired shapes.

In the first and second embodiments, the first slot-housed portion (11*a*) included in each pair of slot-housed portions (11) is disposed on the first radial side in the associated first slot (21) included in the slots (21), and the second slot-housed portion (11*b*) included in each pair of slot-housed portions (11) is disposed on the second radial side in the associated second slot (21) included in the slots (21) and different from the first slot (21). This arrangement enables a reduction in load (tensile load) applied to the insulating sheets (30, 230) not only when the second slot-housed portions (11*b*) are moved radially outward but also when the second slot-housed portions (11*b*) are moved in the circumferential direction. Consequently, when each coil (10) is not only a double layer lap-wound coil but also a distributed-wound coil, the second slot-housed portions (11*b*) reliably enable the insulating sheets (30, 230) to have sufficient mechanical strength so as to reliably provide insulation between the coils (10) while simplifying the steps for manufacturing the stator (100, 200).

In the first and second embodiments, the insulating sheets (30, 230) each include: the first coil end portion insulator (32*a*) disposed on the first side along the central axis (C1); the second coil end portion insulator (32*b*) disposed on the second side along the central axis (C1); and the connection (33) connecting the first coil end portion insulator (32*a*) with the second coil end portion insulator (32*b*). One of the connections (33) is disposed between the first radial side slot-housed portion (11*a*) of an associated pair of the slot-housed portions (11) and the inner surface (23*a*) of the stator core (20, 220) that defines the bottom of the associated slot (21) on the first radial side. In this arrangement, the one of the connections (33) is sandwiched (retained) between the associated first slot-housed portion (11*a*) and the inner surface (23*a*) of the stator core (20, 220), so that the relative positions of the one of the connections (33) and the associated first slot-housed portion (11*a*) are fixable. This eliminates the need to provide components that are separate from the insulating sheets (30, 230) and fix the insulating sheets (30, 230) to the first slot-housed portions (11*a*), making it possible to prevent the stator (100, 200) from being complicated in structure. If the distance between each pair of slot-housed portions (11) is increased (from D1 to D2) during manufacture of the stator (100, 200), the one of the connections (33) would be retained by the associated first slot-housed portion (11*a*) and the inner surface (23*a*). The folded portions (31) of the coil end portion insulators (32) are thus allowed to easily unfold while following the relative movement of each pair of slot-housed portions (11). Providing the connections (33) connecting the first coil end portion insulators (32*a*) with the second coil end portion insulators (32*b*) eliminates the need to provide components to retain the first coil end portion insulators (32*a*) and the second coil end portion insulators (32*b*) separately on the coil end portions (12). Accordingly, this arrangement makes it possible to prevent the insulating sheets (30, 230) from being complicated in structure.

In the first and second embodiments, the slots (21) are each provided with the opening (21*a*) located on the second radial side. Each connection (33) includes: the first connection (33*a*) disposed between the first radial side slot-housed portion (11*a*) and the inner surface (23*a*) of the stator core (20, 220); and the second connection (33*b*) disposed between the associated opening (21*a*) and the second radial side slot-housed portion (11*b*) of an associated pair of the slot-housed portions (11). In this arrangement, each second connection (33*b*) is allowed to function as a protecting member (a cushioning member) when each slot-housed portion (11*b*) is pressed to the associated opening (21*a*) by the radial pressing jig (70, 84) during manufacture of the stator (100, 200). Accordingly, this arrangement makes it possible to prevent the slot-housed portions (11*b*) from developing, for example, flaws when each second radial side slot-housed portion (11*b*) is pressed by the radial pressing jig (70, 84). Each first connection (33*a*) and each second connection (33*b*) fix the relative positions of the associated insulating sheet (30, 230) and an associated pair of the slot-housed portions (11). Consequently, each first connection (33*a*) and each second connection (33*b*) are allowed to follow the relative movement of an associated pair of the slot-housed portions (11), thus enabling the folded portions (31) to unfold easily.

The first and second embodiments involve providing a plurality of the insulating sheets (30, 230). The coil end portion insulator (32) of each of the insulating sheets (30) is disposed on the first radial side of the coil end portion (12) of an associated one of the coils (10). In this arrangement, the coil end portion insulators (32) are disposed on the first radial side. Thus, if the slot-housed portions (11*b*) located on the second radial side are pressed from the second radial side to the first radial side by the circumferential pressing jig (60, 81) and the radial pressing jig (70, 84) during manufacture of the stator (100, 200), the circumferential pressing jig (60, 81) and the radial pressing jig (70, 84) would be prevented from mechanically interfering with the coil end portion insulators (32). Accordingly, this arrangement makes it possible to prevent the coil end portion insulators (32) from being damaged, thus making it possible to more reliably provide insulation between the coil end portions (12).

In the first and second embodiments, each coil (10) is provided by winding the conductor (10*a*) twice or more. Each coil (10) or each insulating sheet (30, 230) is provided with the binder (10*b*) that binds the conductor wound twice or more. In this arrangement, the shape of each coil (10)

would be maintained by the binder (10b) if each coil (10) is provided by winding the conductor (10a) twice or more.

Variations

The embodiments disclosed herein should be considered as not limitative but illustrative in all respects. The scope of the preferred embodiment is defined not by the description of the foregoing embodiments but by the claims and encompasses all modifications (and variations) within the meaning and scope equivalent to the claims.

In the first and second embodiments, all the folded portions are unfolded as illustrated in FIG. 6 by way of example. The preferred embodiment, however, is not limited to this example. Alternatively, only one or some of the folded portions may be unfolded.

In the first and second embodiments, the folded portions are folded back such that the folded portions are substantially S-shaped by way of example. The preferred embodiment, however, is not limited to this example. In one example, the folded portions may be bent portions bent twice or more in a zigzag manner in the circumferential direction without being folded back.

In the first and second embodiments, the folded portions (folding lines) are parallel to each other in the central axis direction by way of example. The preferred embodiment, however, is not limited to this example. Although the folded portions (folding lines) are preferably parallel to each other in the central axis direction, the folded portions (folding lines) may be formed such that the folded portions (folding lines) have, for example, an inclination angle of less than 45 degrees with respect to the central axis direction.

In the first and second embodiments, the coil end portion insulators and the connections are integral with each other by way of example. The preferred embodiment, however, is not limited to this example. If an increase in the number of components presents no problem, the coil end portion insulators and the connections may be separate from each other. In one variation, the insulating sheets may be provided with no connections. The insulating sheet according to this variation is an insulating sheet 430 illustrated in FIG. 76. The insulating sheet 430 includes a coil end portion insulator 432 and binders 410b continuous with the coil end portion insulator 432. The binders 410b are wound around a coil end portion (not illustrated) of a coil, thus binding a conductor wire of the coil and fixing the insulating sheet 430 to the coil end portion. The insulating sheet 430 is also provided with the folded portions 31 (the folding lines 31a).

In the first and second embodiments, the coil end portion insulators are placed only on the first radial side of the coil end portions. The preferred embodiment, however, is not limited to this example. Alternatively, the coil end portion insulators may be placed on both radial sides of the coil end portions.

In the first and second embodiments, each coil is provided by winding a round wire twice or more by way of example. The preferred embodiment, however, is not limited to this example. Each coil may be provided, for example, by winding (forming) a rectangular wire.

In the first and second embodiments, the first and second slot-housed portions of the same phase are placed in the same slot by way of example. The preferred embodiment, however, is not limited to this example. The first and second slot-housed portions of different phases, for example, may be placed in the same slot.

Figure 76:
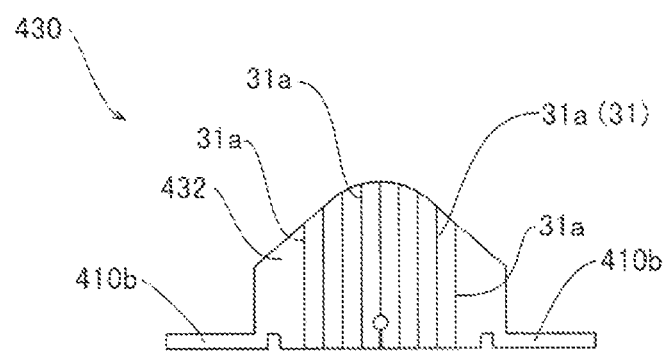
FIG. 76 is a diagram illustrating a structure of an insulating sheet according to a variation of the first embodiment of the preferred embodiment.

In the first and second embodiments, the coils are provided with the binders by way of example. The preferred embodiment, however, is not limited to this example. In one variation, the binders 410b may be integral with, for example, the insulating sheet 430 (the coil end portion insulator 432) as illustrated in FIG. 76.

In the first embodiment, the coils are placed inward of the inner jigs after removal of the outer jigs by way of example. The preferred embodiment, however, is not limited to this example. Both of the inner and outer jigs may be removed from the stator core after the coils are placed inward of the inner jigs.

In the first and second embodiments, the slot insulating sheets are provided in the stator by way of example. The preferred embodiment, however, is not limited to this example. No slot insulating sheets may be provided in the stator, for example, when the coils have relatively thick insulating coatings such that sufficient insulation is providable between the coils and the stator core.

The second embodiment involves, by way of example, cutting off the protruded regions by passing the cutting jigs through the boundary regions between the folded portions and the protruded regions in the direction intersecting the protruded regions, with the insulating sheets and the coils retained by the retaining jigs. The preferred embodiment, however, is not limited to this example. Alternatively, the protruded regions may be cut off by any other method.

In the second embodiment, the manufacturing method includes, by way of example, the step of fixing the folded portions to each other by fixing the protruded regions protruding from the folded portions to each other. The preferred embodiment, however, is not limited to this example. Alternatively, the step of fixing the folded portions to each other may be omitted.

In the second embodiment, the manufacturing method includes, by way of example, the step of placing the second slot-housed portions while unfolding the insulating sheets in the direction intersecting the direction of extension of the folded portions of the insulating sheets after the step of placing the first slot-housed portions. The preferred embodiment, however, is not limited to this example. The manufacturing method may include, for example, the step of placing the second slot-housed portions while unfolding the insulating sheets in the direction intersecting the direction of extension of the folded portions of the insulating sheets simultaneously with the step of placing the first slot-housed portions. This would enable the insulating sheets to have sufficient mechanical strength so as to provide insulation between the coils if each coil is a single layer lap-wound coil including a pair of slot-housed portions to be substantially simultaneously inserted into different slots.

DESCRIPTION OF THE REFERENCE NUMERALS 10 coil
10a conductor wire (conductor)
10b, 210b binder
11 slot-housed portion
11a first slot-housed portion (first radial side slot-housed portion)
11b second slot-housed portion (second radial side slot-housed portion)
12 coil end portion
20, 220 stator core
20a end face (end face of stator core)
21 slot
22 teeth
22a end face (end faces of teeth)
23a inner surface
30, 230, 430 insulating sheet 31 folded portion
32, 432 coil end portion insulator
32a first coil end portion insulator
32b second coil end portion insulator
33 connection
33a first connection
33b second connection
35 fixture (protruded region)
35a boundary region (between folded portion and protruded region)
40 slot insulating sheet
50 first retaining jig
51 outer jig
52 inner jig
60 circumferential pressing jig
61a bottom
70 radial pressing jig
81 coil guide jig (circumferential pressing jig)
84 coil pressing device (radial pressing jig)
100, 200 stator
320 coil retaining jig (second retaining jig)
341 cutter (cutting jig)

The invention claimed is:

1. A method for manufacturing a stator including
a stator core including a plurality of slots,
a plurality of coils each including
  a pair of slot-housed portions housed in the slots, and
  a coil end portion connected to the pair of slot-housed portions and protruded from an end face of the stator core in a central axis direction of the stator core, and
an insulating sheet,
the method comprising:
an insulating sheet preparing step involving preparing the insulating sheet including a plurality of folded portions extending in the central axis direction;
an insulating sheet placing step involving, after the insulating sheet preparing step, placing the insulating sheet in the slots of the stator core;
a first slot-housed portion placing step involving placing a first slot-housed portion of each pair of the slot-housed portions in a first slot included in the slots; and
a second slot-housed portion placing step involving, simultaneously with or after the first slot-housed portion placing step, moving a second slot-housed portion of each pair of the slot-housed portions radially outward while unfolding the insulating sheet in a radially outward direction, intersecting a direction of extension of the folded portions of the insulating sheet, thus placing each second slot-housed portion in a second slot included in the slots and different from the first slot.

2. The stator manufacturing method according to claim 1, further comprising a coil forming step involving, after the insulating sheet placing step and before the second slot-housed portion placing step, increasing a distance between each pair of the slot-housed portions while unfolding the insulating sheet in the radially outward direction, intersecting the direction of extension of the folded portions of the insulating sheets so as to move the second slot-housed portion of each pair of the slot-housed portions to a circumferential position corresponding to the second slot included in the slots and different from the first slot, thus forming the coils.

3. The stator manufacturing method according to claim 2, wherein
the insulating sheet includes
  a first coil end portion insulator to be placed on a first side in the central axis direction,
  a second coil end portion insulator to be placed on a second side in the central axis direction, and
  a pair of connections connecting the first coil end portion insulator with the second coil end portion insulator, and
the second slot-housed portion placing step involves placing one of each pair of the connections between the associated first slot-housed portion and an inner surface of the stator core that defines a bottom of the associated first slot on a first radial side, placing the other one of each pair of the connections between the associated second slot-housed portion and a radial pressing jig that presses the associated second slot-housed portion from a second radial side to the first radial side, and radially moving, in this state, each second slot-housed portion by the radial pressing jig, thus placing each second slot-housed portion.

4. The stator manufacturing method according to claim 3, wherein the insulating sheet placing step involves placing the insulating sheet in the stator core before the first slot-housed portion placing step.

5. The stator manufacturing method according to claim 4, wherein the insulating sheet placing step involves placing the insulating sheet in the stator core, with the insulating sheet retained by a first retaining jig placed between the insulating sheet and teeth that define the first slots.

6. The stator manufacturing method according to claim 5, wherein the insulating sheet placing step involves placing the insulating sheet in the stator core, with the insulating sheet retained by an outer jig and an inner jig, the outer jig being included in the first retaining jig and placed between the insulating sheet and the teeth, the inner jig being included in the first retaining jig and placed inside the associated first slot such that the inner jig is located inward of the insulating sheet, the insulating sheet being interposed between the outer jig and the inner jig.

7. The stator manufacturing method according to claim 2, wherein the insulating sheet placing step involves placing the insulating sheet in the stator core before the first slot-housed portion placing step.

8. The stator manufacturing method according to claim 2, wherein
the insulating sheet placing step involves placing the insulating sheet together with the coil, with the insulating sheet attached to the coil, and
the insulating sheet preparing step includes a step of fixing the folded portions to each other such that the folded portions of the insulating sheet will not be spread out.

9. The stator manufacturing method according to claim 2, wherein
the coil forming step involves, with the insulating sheet placed on a first circumferential side of the coil end portion, pressing each second slot-housed portion from a second circumferential side to the first circumferential side by a circumferential pressing jig so as to move each second slot-housed portion to a circumferential position adjacent to the second slot while unfolding the folded portions, thus forming the coils.

10. The stator manufacturing method according to claim 1, wherein
the stator further includes a slot insulating sheet placed in the slots such that the slot insulating sheet is located between each pair of the slot-housed portions and teeth that define the slots, and the method further comprises a step of placing the slot insulating sheet in the slots before the insulating sheet placing step.

11. The stator manufacturing method according to claim 2, wherein
    the stator further includes a slot insulating sheet placed in the slots such that the slot insulating sheet is located between each pair of the slot-housed portions and teeth that define the slots, and
    the method further comprises a step of placing the slot insulating sheet in the slots before the insulating sheet placing step.

* * * * *